United States Patent
Kim

(10) Patent No.: US 12,332,425 B2
(45) Date of Patent: Jun. 17, 2025

(54) LENS CURVATURE VARIATION APPARATUS

(71) Applicant: LG INNOTEK CO., LTD., Seoul (KR)

(72) Inventor: Chang Wook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 735 days.

(21) Appl. No.: 17/753,967

(22) PCT Filed: Sep. 17, 2020

(86) PCT No.: PCT/KR2020/012588
§ 371 (c)(1),
(2) Date: Mar. 18, 2022

(87) PCT Pub. No.: WO2021/054750
PCT Pub. Date: Mar. 25, 2021

(65) Prior Publication Data
US 2022/0334375 A1    Oct. 20, 2022

(30) Foreign Application Priority Data

Sep. 18, 2019 (KR) .......................... 10-2019-0114937

(51) Int. Cl.
*G02B 26/00* (2006.01)
*G02B 3/14* (2006.01)

(52) U.S. Cl.
CPC ............. *G02B 26/004* (2013.01); *G02B 3/14* (2013.01)

(58) Field of Classification Search
CPC ........ G02B 26/004; G02B 3/14; G01C 19/00; G01D 5/24
See application file for complete search history.

(56) References Cited

U.S. PATENT DOCUMENTS 7,612,948 B2    11/2009  Immink et al.
10,097,742 B1   10/2018  Moon et al.
(Continued)

FOREIGN PATENT DOCUMENTS

JP    2007-531048 A    11/2007
KR    10-1821189 B1     1/2018
(Continued)

OTHER PUBLICATIONS

Office Action dated Oct. 23, 2024 in Korean Application No. 10-2019-0114937.
(Continued)

*Primary Examiner* — Wen Huang
(74) *Attorney, Agent, or Firm* — Saliwanchik, Lloyd & Eisenschenk

(57) ABSTRACT

A lens curvature variation apparatus according to an embodiment includes: a liquid lens including a common electrode and a plurality of individual electrodes; a lens driver configured to apply a voltage to the common electrode and the plurality of individual electrodes; a sensor unit configured to sense an interface of the liquid lens; an AD converter configured to convert an analog signal corresponding to the interface output from the sensor unit into a digital signal; and a controller configured to control the lens driver based on a signal output from the AD converter, wherein the plurality of individual electrodes includes a first group and a second group each including two or more individual electrodes, wherein the sensor unit includes a first sensor unit connected to a first individual electrode among individual electrodes of the first group; and a second sensor unit connected to a second individual electrode among individual electrodes of the second group; and wherein the controller includes a controller for controlling the lens driver to adjust the voltage applied to each of the individual electrodes (Continued)

included in the first group and the second group based on the signal output from the AD converter.

20 Claims, 33 Drawing Sheets

(56) References Cited

U.S. PATENT DOCUMENTS

| | | |
|---|---|---|
| 11,378,795 B2 | 7/2022 | Song et al. |
| 2019/0109536 A1 | 4/2019 | Lee |
| 2019/0244574 A1 | 8/2019 | Schultz et al. |
| 2020/0096678 A1 | 3/2020 | Kaminski et al. |
| 2020/0386983 A1 | 12/2020 | Song et al. |

FOREIGN PATENT DOCUMENTS

| | | |
|---|---|---|
| KR | 10-2019-0068277 A | 6/2019 |
| WO | 2018/187578 A2 | 10/2018 |

OTHER PUBLICATIONS

International Search Report dated Jan. 5, 2021 in International Application No. PCT/KR2020/012588.

FIG. 1
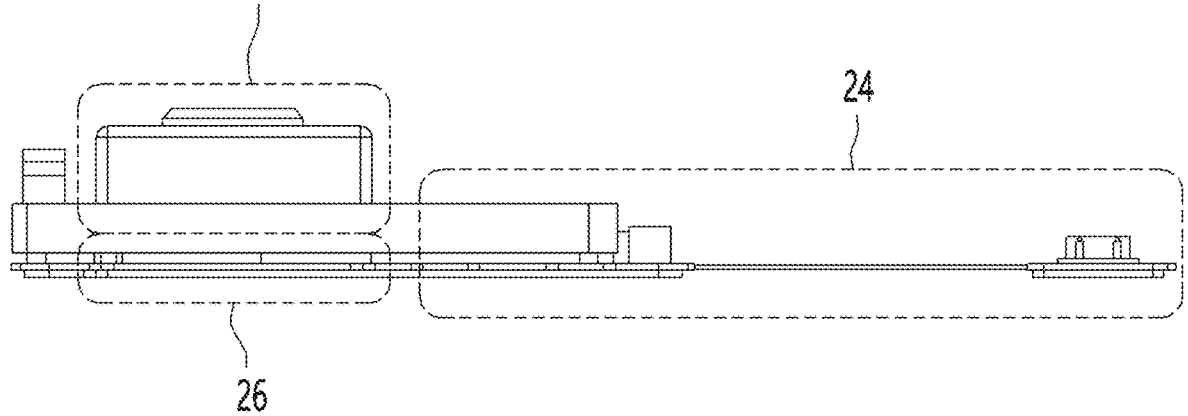
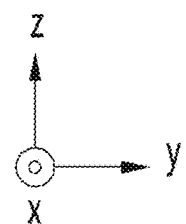

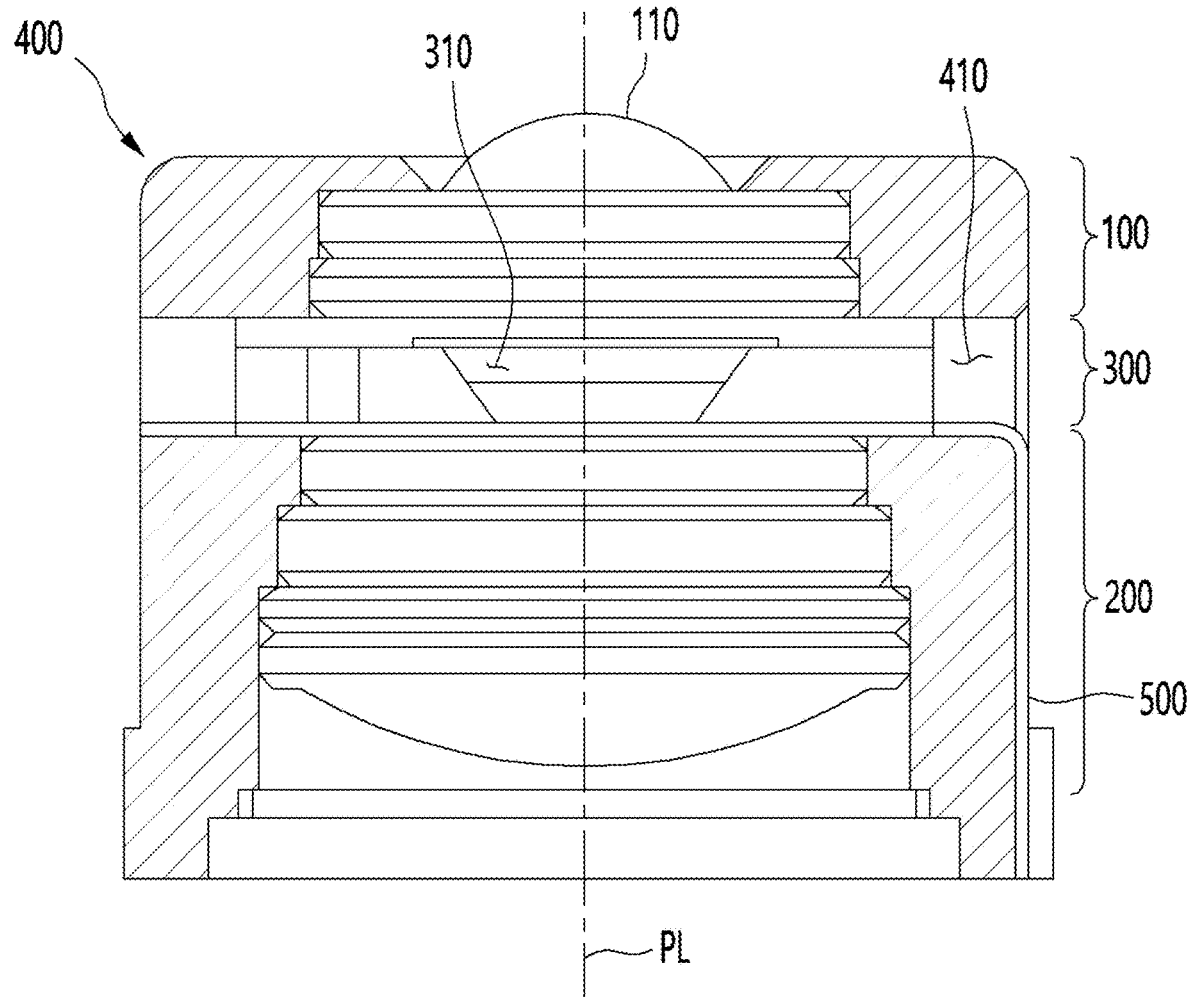

FIG. 3A
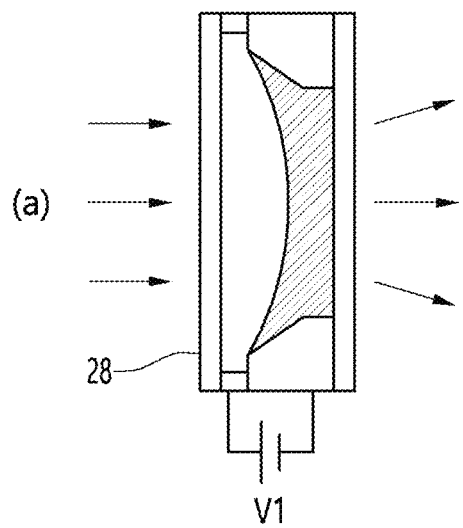
(a)
V1
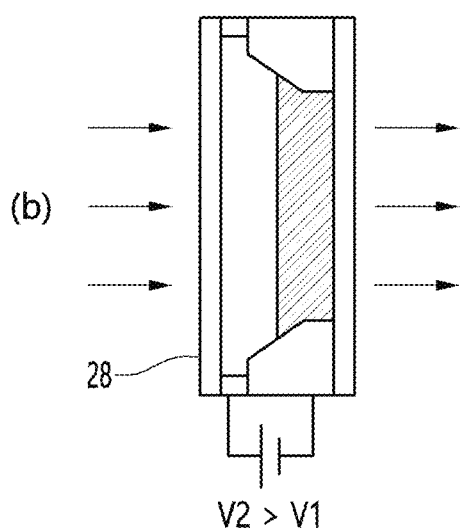
(b)
V2 > V1
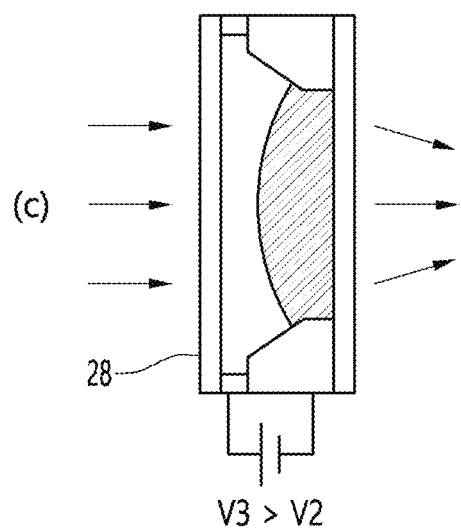
(c)
V3 > V2

(a)  (b)

FIG. 25
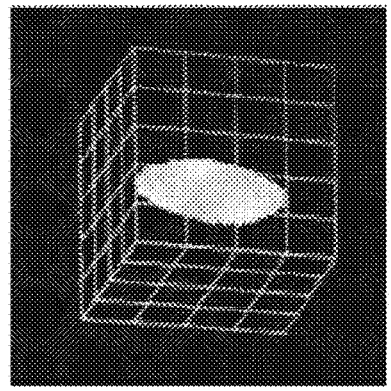
(a)
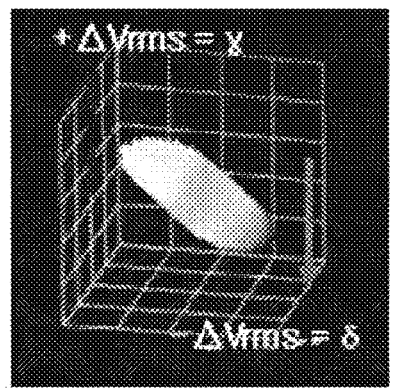
$|\gamma| = |\delta|$
(b)
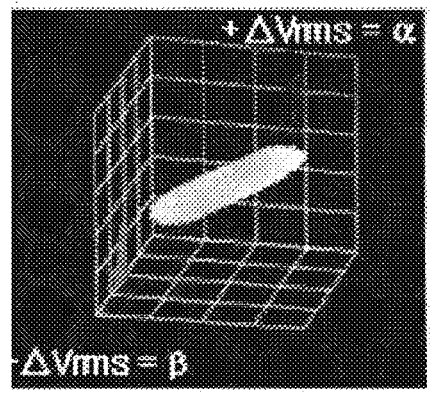
$|\alpha| = |\beta|$
(c)

FIG. 26A
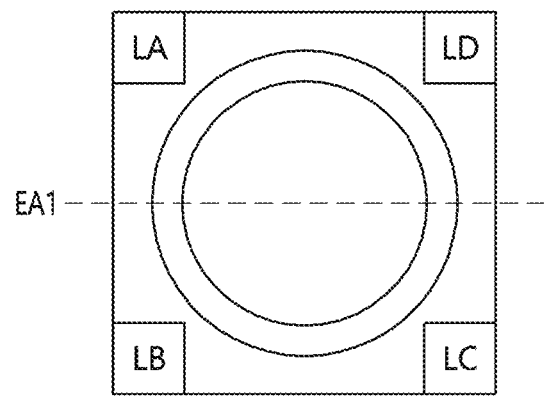
(a)
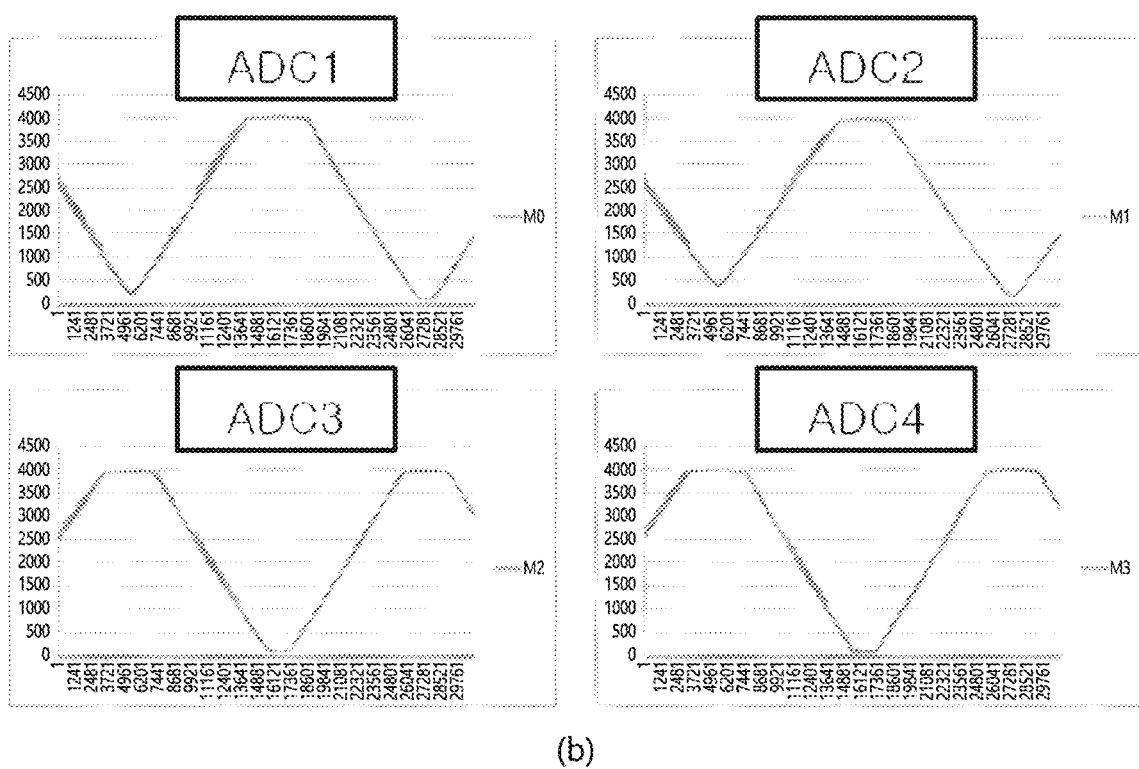
(b)

FIG. 26B
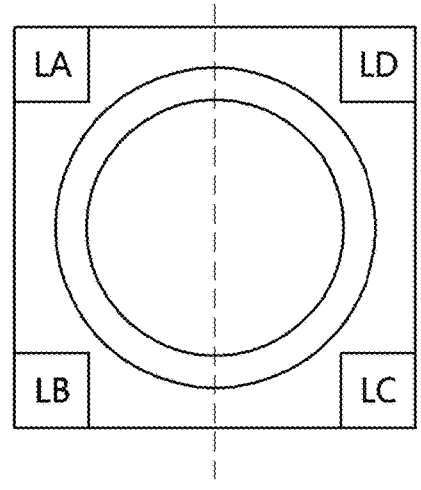
(a)
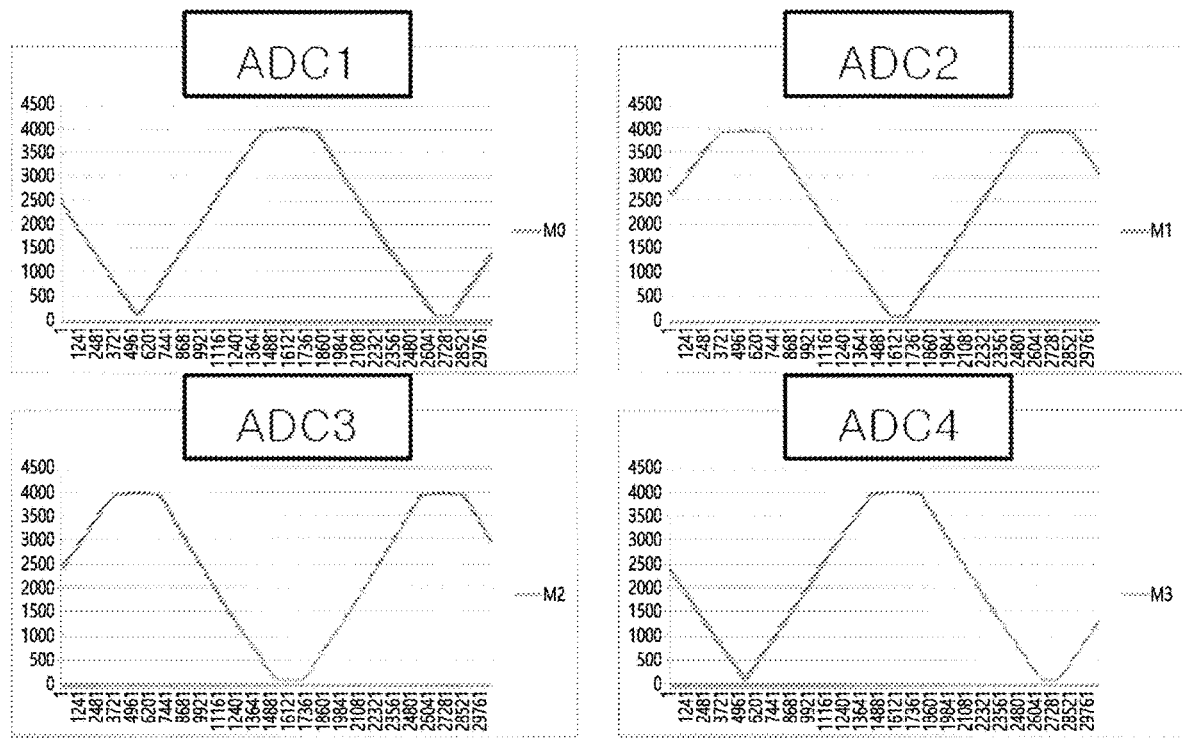
(b)

FIG. 26C
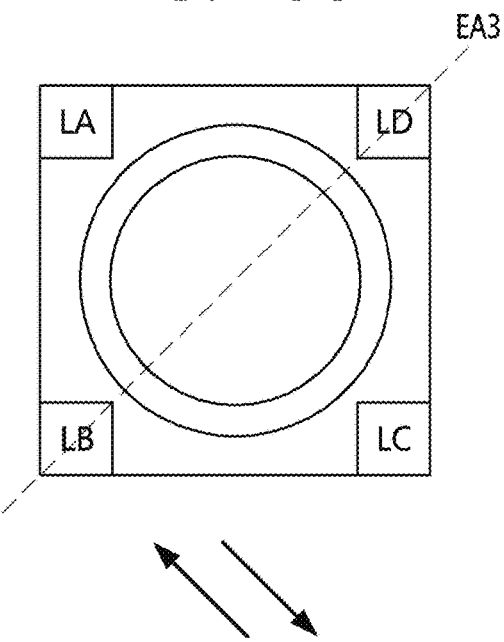
(a)
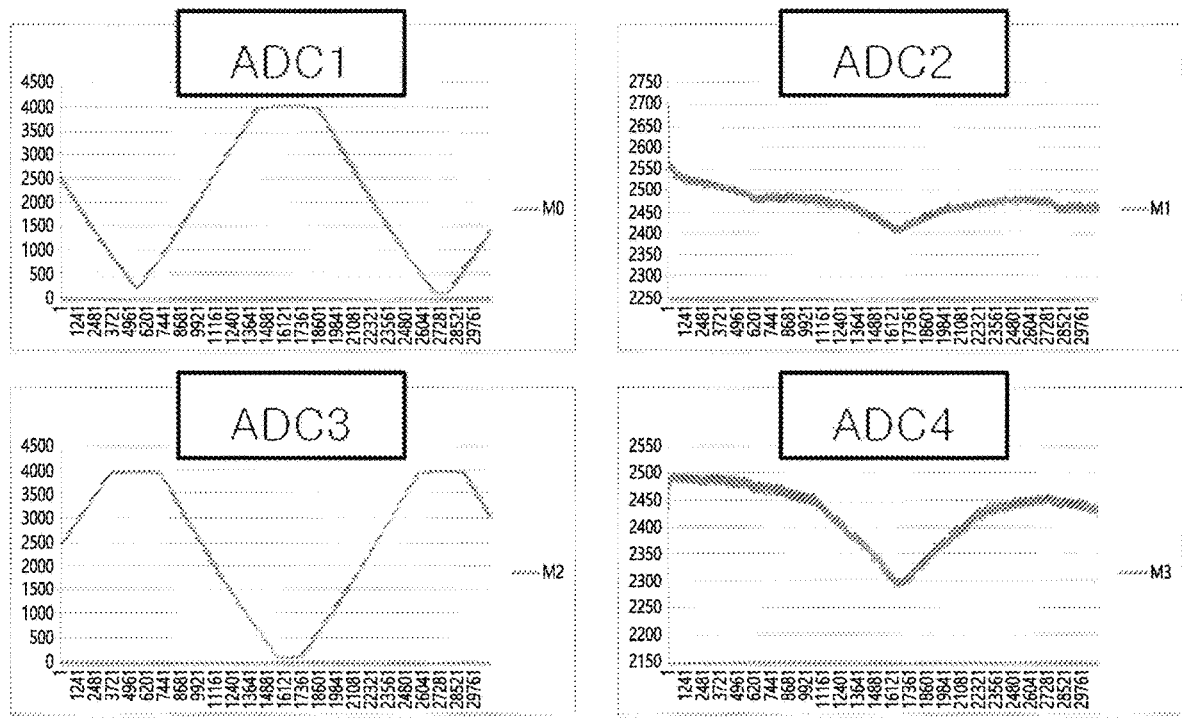
(b)

FIG. 26D
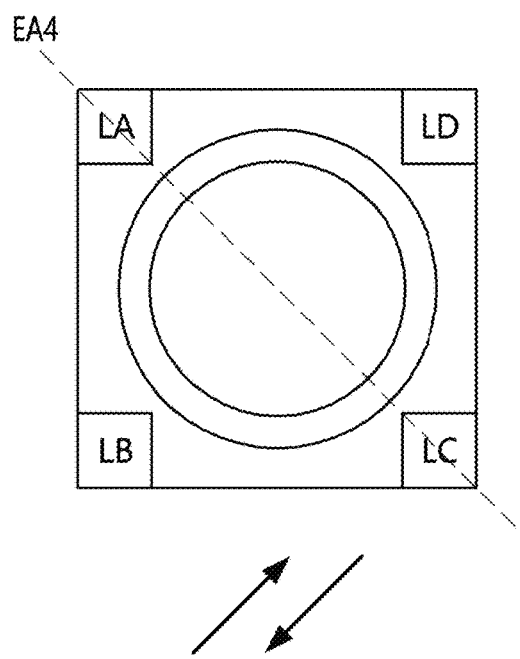
(a)
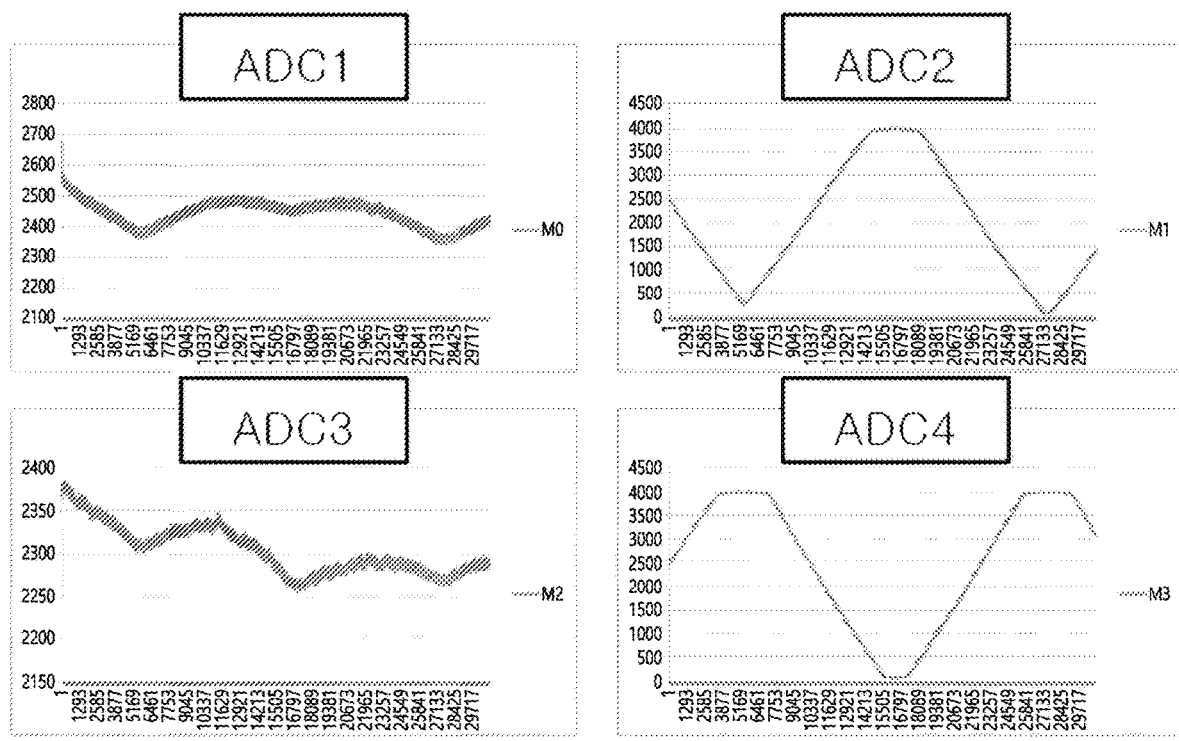
(b)

LENS CURVATURE VARIATION APPARATUS

CROSS-REFERENCE TO RELATED APPLICATIONS

This application is the U.S. national stage application of International Patent Application No. PCT/KR2020/012588, filed Sep. 17, 2020, which claims the benefit under 35 U.S.C. § 119 of Korean Application No. 10-2019-0114937, filed Sep. 18, 2019, the disclosures of each of which are incorporated herein by reference in their entirety.

TECHNICAL FIELD

An embodiment relates to a liquid lens control circuit, a camera module, and a liquid lens control method. More specifically, the embodiment relates to a liquid lens control circuit, a camera module, and a liquid lens control method for controlling a liquid lens capable of adjusting a focal length by using an electric signal.

BACKGROUND ART

Users of portable devices desire optical devices having a high resolution, a small size, various photographing functions (e.g., optical zooming function (zoom-in/zoom-out), auto-focusing (AF) function, a camera-shake correction or an optical image stabilizer (OIS) function, or the like). Although such photographing functions may be implemented by combining several lenses and directly moving the lenses, the size of the optical devices may be increased when the number of lenses is increased. The AF and camera-shake correction functions are performed by moving or tilting several lens modules, which are fixed to a lens holder to be aligned with an optical axis, along the optical axis or in a direction perpendicular to the optical axis, and a separate lens-driving device is used to drive the lens modules. However, the lens-driving device has high power consumption, and a cover glass should be separately added to a camera module in order to protect the lens-driving device, and thus the overall thickness of the lens-driving device is increased. Therefore, research has been conducted on a liquid lens that electrically adjusts a curvature of an interface between two types of liquids to perform the AF and camera-shake correction functions.

DISCLOSURE

Technical Problem

An embodiment is to provide a liquid lens control circuit, a camera module, and a liquid lens control method that may recognize movement of an interface of a liquid lens more accurately and control the interface of the liquid lens more accurately in response to an applied electric signal by providing a feedback circuit capable of recognizing a state of the interface included in the liquid lens through a change of a capacitance in a camera device including the liquid lens capable of adjusting a focal length by using an electric signal.

In addition, the embodiment is to provide a liquid lens control circuit, a camera module, and a liquid lens control method that may control a performance and operation of a liquid lens more accurately by directly recognizing a movement and shape of an interface through a change of a capacitance of the interface without converting the movement and shape of the interface of the liquid lens of which focal length may be adjusted into an optical signal image that passes through the interface.

In addition, the embodiment is to provide a liquid lens control circuit, a camera module, and a liquid lens control method that are more efficient to correct a lens distortion at a lens assembly including a liquid lens and a solid lens or to control the lens assembly because the movement and shape of the interface in the liquid lens may be recognized.

In addition, the embodiment is to provide a liquid lens control circuit, a camera module, and a liquid lens control method that are designed to minimize the size of the liquid lens control circuit for recognizing the movement and shape of the interface within the liquid lens.

In addition, the embodiment is to provide a liquid lens control circuit, a camera module, and a liquid lens control method that are possible to calculate the capacitance of each individual electrode with the minimum number of sensing circuits and ADC using the symmetrical relationship between the effective voltage applied to each electrode and an ADC sensing value based on a vibration axis of the gyro data.

Technical Solution

A lens curvature variation apparatus according to an embodiment includes: a liquid lens including a common electrode and a plurality of individual electrodes; a lens driver configured to apply a voltage to the common electrode and the plurality of individual electrodes; a sensor unit configured to sense an interface of the liquid lens; an AD converter configured to convert an analog signal corresponding to the interface output from the sensor unit into a digital signal; and a controller configured to control the lens driver based on a signal output from the AD converter, wherein the plurality of individual electrodes includes a first group and a second group each including two or more individual electrodes, wherein the sensor unit includes a first sensor unit connected to a first individual electrode among individual electrodes of the first group; and a second sensor unit connected to a second individual electrode among individual electrodes of the second group; and wherein the controller includes a controller for controlling the lens driver to adjust the voltage applied to each of the individual electrodes included in the first group and the second group based on the signal output from the AD converter.

In addition, the AD converter includes a first AD converter connected to the first sensor unit and outputting a first digital signal; and a second AD converter connected to the second sensor unit and outputting a second digital signal.

In addition, the lens curvature variation apparatus further comprises a multiplexer (MUX) connected to the first and second sensor units and sequentially outputting analog signals output from each of the first and second sensor units; and wherein the AD converter is connected to the first sensor unit through the multiplexer and outputs a first digital signal, and connected to the second sensor unit through the multiplexer to output a second digital signal.

In addition, the controller is configured to obtain a third digital signal corresponding to a third individual electrode included in the first group by using the first digital signal, and obtain a fourth digital signal corresponding to a fourth individual electrode included in the second group by using the second digital signal.

In addition, the first digital signal is symmetrical with the third digital signal; and the second digital signal is symmetrical with the fourth digital signal.

In addition, the controller is configured to calculate a vibration angle using a gyro data obtained through a gyro sensor, and separate the plurality of individual electrodes from each other having a mutually symmetrical relationship based on the calculated vibration angle.

In addition, the sensor unit is configured to sense a capacitance corresponding to a size or change of an area of a boundary region between an insulating layer on the plurality of individual electrodes in the liquid lens and a conductive liquid.

In addition, the sensor unit is configured to sense a capacitance corresponding to some of the individual electrode among the plurality of individual electrodes; and wherein the controller is configured to sense a capacitance corresponding to the remaining individual electrode by using the capacitance corresponding to some individual electrode obtained through the sensor unit.

Advantageous Effects

According to an embodiment of the present invention, it is possible to vary a curvature of a lens quickly and accurately by including a liquid lens having a variable curvature based on an applied electric signal, a lens driver driving a liquid, a sensor sensing a capacitance of the liquid lens, and a controller controlling the lens driver so that the curvature of the lens is varied based on the sensed capacitance of the liquid lens.

In particular, in the embodiment, it is possible to vary the curvature of the liquid lens quickly and accurately by sensing the capacitance of the liquid lens and feeding it back, and changing a driving voltage applied to the liquid lens so that the curvature of the liquid lens is varied.

Meanwhile, it is possible to vary the curvature of the lens quickly and accurately by including an equalizer that calculates a curvature error based on a calculated curvature and a target curvature, and a pulse width variable controller that generates and outputs a pulse width signal based on the calculated curvature error.

Meanwhile, the sensor according to the embodiment may sense the capacitance of the liquid lens quickly and accurately by sensing the capacitance of the liquid lens during a turn-on period of a switching element.

In addition, in the embodiment, it is possible to sense the curvature of the liquid lens accurately by generating a separate sensing pulse signal for sensing the capacitance of the liquid lens, and using the sensing pulse so as to sense the capacitance.

In addition, in the embodiment, the supply of the sensing pulse and the capacitance sensing operation are performed during a period in which a ground voltage is applied to both a first electrode and a second electrode, and accordingly, sensing noise generated by the switching operation of the lens driver may be removed, and the accuracy of the sensed capacitance may be improved.

In addition, in the embodiment, it is possible to solve an operation error of the liquid lens caused by the sensing pulse by supplying an offset pulse corresponding to the sensing pulse.

In addition, in the embodiment, a number of AD converters required for sensing of a capacitance for each individual electrode may be reduced by using a MUX. Accordingly, in the embodiment, an area of a circuit may be reduced due to a decrease in the number of AD converters, and accordingly, a yield due to reduction in a chip size may be improved, and a unit cost of a camera module may be reduced. In addition, in the embodiment, it is possible to solve a performance variation of the AD converter that occurs when the AD converter is used for each individual electrode, and accordingly, it is possible to sense the capacitance accurately under the same condition for each individual electrode.

In addition, in the embodiment, the driving voltage applied to each individual electrode is controlled by using the gyro data output from the gyro sensor as a control factor when the OIS is driven. In this case, during OIS correction, the effective voltage (Vrms) applied to each electrode based on the vibration axis and the ADC sensing value have a symmetrical relationship. Accordingly, in the embodiment, the capacitance of all individual electrodes can be calculated with a sensing circuit of ½ compared to the number of individual electrodes. According to this, the liquid lens control circuit in the embodiment can secure SFR (Spatial Frequency Response) and OIS suppression ratio for OIS control using only ½ of the existing ADC sensing circuit. Further, in this embodiment, since the ADC sensing circuit is reduced by 50% compared to the prior art, the chip size can also be drastically reduced, and thus the overall chip size can be reduced by about 20% compared to the prior art.

DESCRIPTION OF DRAWINGS

FIG. 1 shows an example of a camera device.

FIG. 2 shows an example of a lens assembly included in the camera device.

FIGS. 3A and 3B are views for describing a driving method of a liquid lens.

FIG. 25 is a view for explaining an effective voltage applied to individual electrodes during OIS correction.

FIG. 26A is a view showing a symmetric relationship between ADC values in an up-down vibration state.

FIG. 26B is a view showing a symmetric relationship between ADC values in a left-right vibration state.

FIG. 26C is a view showing a symmetric relationship between ADC values in an up right-down left vibration state.

FIG. 26D is a view showing a symmetrical relationship of ADC values in an up left-down right vibration state.

DETAILED DESCRIPTION OF THE EMBODIMENTS

Figure 3B:
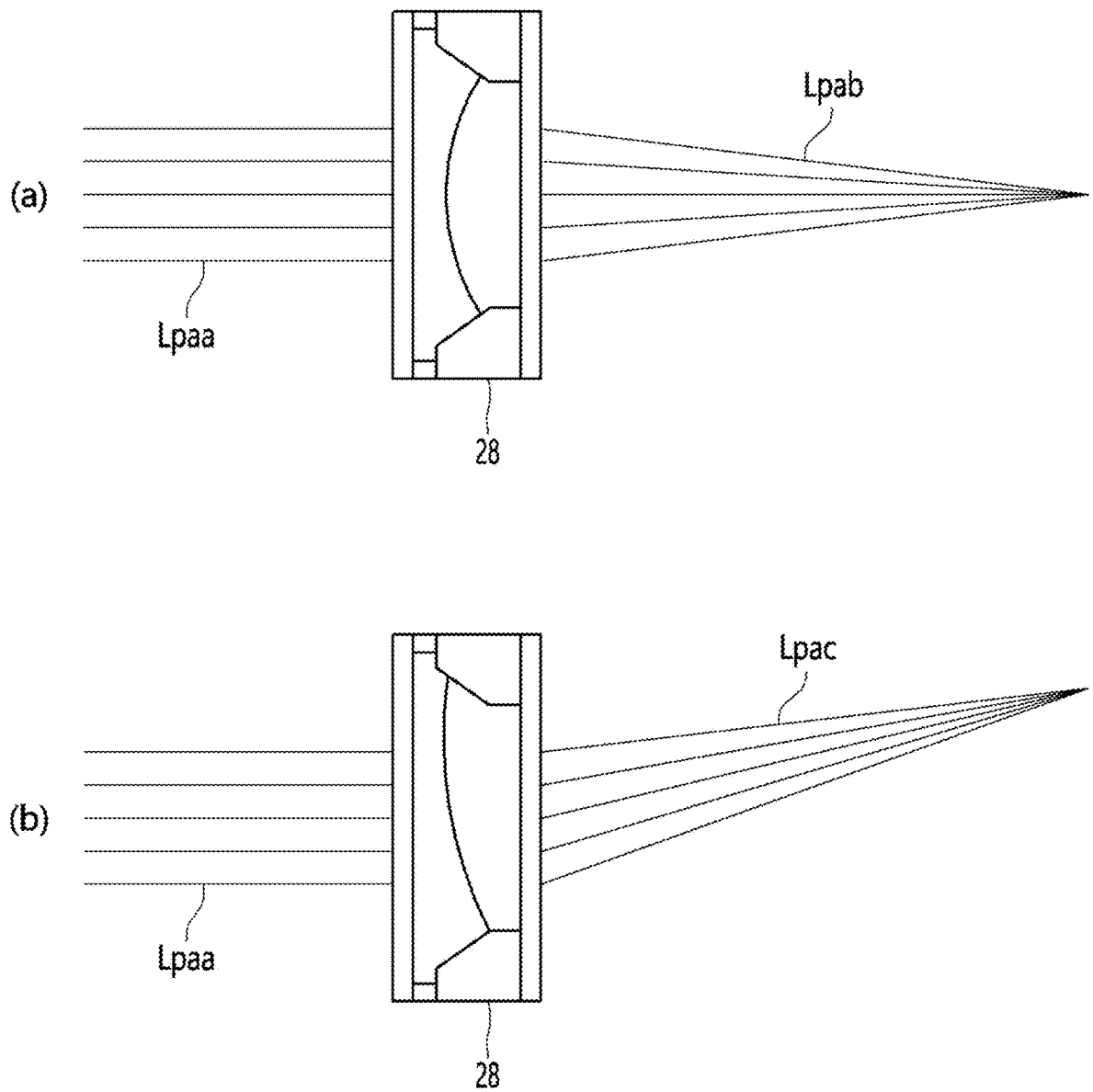

Hereinafter, embodiments will be described in detail with reference to the accompanying drawings. While the embodiments may have various modifications and may have various forms, specific embodiments are illustrated in the drawings and described in detail in the specification. However, there is no intent to limit the embodiment to the particular forms disclosed, and it should be understood as including all modifications, equivalents and alternatives that fall within the spirit and scope of the embodiment.

Although the terms "first," "second," etc. may be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

FIG. 1 shows an example of a camera device. As shown in the drawing, a camera module may include a lens assembly 22 and a image sensor. At least one solid lens may be disposed on an upper portion or a lower portion of the lens assembly 22. The lens assembly 22 may include a liquid lens of which focal length is adjusted according to a voltage applied thereto. The camera module may include the lens assembly 22 including a first lens of which focal length is adjusted according to a driving voltage applied between a common terminal and a plurality of individual terminals, a control circuit 24 for supplying a driving voltage to the first lens, and an image sensor 26 that is aligned with the lens assembly 22, converts light transferred through the lens assembly 22 into electrical signals, and is disposed at the lower portion of the lens assembly 22.

Referring to FIG. 1, the camera module may include the circuit 24, 26, and the lens assembly 22 including a plurality of lenses, which are formed on a single printed circuit board (PCB), but it is merely one example and the scope of the disclosure is not limited thereto. A configuration of the control circuit 24 may be designed differently according to specifications required in the camera module. In particular, when reducing a magnitude of a voltage applied to a liquid lens 28, the control circuit 24 may be implemented in a single chip. Thus, a size of the camera module mounted on a portable device may be further reduced.

Referring to FIG. 2, as shown in the drawing, the lens assembly 22 may include a first lens unit 100, a second lens unit 200, a liquid lens unit 300, a lens holder 400, and a connecting unit 500. The connection unit 500 may electrically connect an image sensor and a liquid lens to each other, and may include a substrate, a wire, an electrical line, or the like, which will be described later. The illustrated structure of the lens assembly 22 is merely one example, and the structure of the lens assembly 22 may be changed according to specifications required in the camera module. For example, the liquid lens unit 300 is located between the first lens unit 100 and the second lens unit 200. However, in another example, the liquid lens unit 300 may be located above (in front of) the first lens unit 100, and one of the first lens unit 100 and the second lens unit 200 may be omitted. The configuration of the control circuit 24 may be designed differently according to specifications required in the camera device. In particular, when reducing a magnitude of a voltage applied to the lens assembly 22, the control circuit 24 may be implemented in a single chip. Thus, a size of the camera device mounted on a portable device may be further reduced.

FIG. 2 shows an example of a lens assembly 22 included in the camera device.

As shown in the drawing, the lens assembly 22 may include a first lens unit 100, a second lens unit 200, a liquid lens unit 300, a lens holder 400, and a connecting unit 500. The connection unit 500 may electrically connect an image sensor and a liquid lens to each other, and may include a substrate, a wire, an electrical line, or the like, which will be described later. The illustrated structure of the lens assembly 22 is merely one example, and the structure of the lens assembly 22 may be changed according to specifications required in the camera module. For example, the liquid lens unit 300 is located between the first lens unit 100 and the second lens unit 200. However, in another example, the liquid lens unit 300 may be located above (in front of) the first lens unit 100, and one of the first lens unit 100 and the second lens unit 200 may be omitted.

Referring to FIG. 2, the first lens unit 100 is disposed in front of the lens assembly 22, and is a part in which light is incident from the outside of the lens assembly 22. The first lens unit 100 may include at least one lens, or two or more lenses may be aligned with respect to a central axis (PL) to form an optical system.

The first lens unit 100 and the second lens unit 200 may be mounted on the lens holder 400. In this case, a through-hole may be formed at the lens holder 400, and the first lens unit 100 and the second lens unit 200 may be disposed in the through-hole. In addition, the liquid lens unit 300 may be inserted into a space between the first lens unit 100 and the second lens unit 200, which are disposed in the lens holder 400.

Meanwhile, the first lens unit 100 may include a solid lens 110. The solid lens 110 may protrude outside the lens holder 400 to be exposed to the outside. When the solid lens 110 is exposed to the outside, a surface of the lens may be damaged. When the surface of the lens is damaged, quality of an image photographed by the camera module may be deteriorated. In order to inhibit or suppress the surface damage of the solid lens 110, a cover glass may be disposed, a coating layer may be formed, or a method of using a wear resistant material for inhibiting the surface damage of the solid lens 100 may be applied.

The second lens unit 200 may be disposed behind the first lens unit 100 and the liquid lens unit 300, and light incident on the first lens unit 100 from the outside may pass through the liquid lens unit 300 to be incident on the second lens unit 200. The second lens unit 200 may be spaced apart from the first lens unit 100 to be disposed in the through-hole formed in the lens holder 400.

Meanwhile, the second lens unit 200 may include at least one lens, and when two or more lenses are included, the second lens unit 200 may be aligned with respect to the central axis (PL) to form an optical system.

The liquid lens unit 300 may be disposed between the first lens unit 100 and the second lens unit 200, and may be inserted into an insertion opening 410 in the lens holder 400. The insertion opening 410 may be formed by opening a portion of a side surface of the lens holder 400. That is, the liquid lens may be disposed to be inserted through the insertion opening 410 in the side surface of the lens holder 400. The liquid lens unit 300 may also be aligned with respect to the center axis PL like the first lens unit 100 and the second lens unit 200.

The liquid lens unit 300 may include a lens region 310. The lens region 310 is a region through which light passed through the first lens unit 100 is transmitted, and at least a part thereof may contain a liquid. For example, the lens region 310 may include two types of liquids, i.e., a conductive liquid and a non-conductive liquid together, and the conductive liquid and the non-conductive liquid may form a boundary surface without being mixed with each other. The boundary surface between the conductive liquid and the non-conductive liquid may be deformed by a driving voltage applied through the connection unit 500 to change a curvature of an interface of the liquid lens 28 or a focal length of the liquid lens. When the deformation of the boundary surface or the change of the curvature is controlled, the liquid lens unit 300 and the camera module including the same may perform an auto-focusing function, a camera-shake correction function, and the like.

FIGS. 3A and 3B are views for describing a driving method of a liquid lens.

First, (a) of FIG. 3A illustrates that a first voltage V1 is applied to the liquid lens 28 so that the liquid lens operates like a concave lens.

Next, (b) of FIG. 3A illustrates that a second voltage V2 larger than the first voltage V1 is applied to the liquid lens 28 so that the liquid lens does not change a traveling direction of light.

Next, (c) of FIG. 3A illustrates that a third voltage V3 larger than the second voltage V2 is applied to the liquid lens 28 so that the liquid lens operates like a convex lens.

Meanwhile, FIG. 3A illustrates that a curvature or a diopter of the liquid lens is changed depending on a level of the applied voltage, but the embodiment is not limited thereto, and the curvature or the diopter of the liquid lens may be changed depending on a pulse width of an applied pulse.

Next, (a) of FIG. 3B illustrates that the interfaces in the liquid lens 28 have the same curvature so that the liquid lens operates like a convex lens.

That is, according to (a) of FIG. 3B, incident light Lpaa is concentrated and corresponding output light Lpab is output.

Next, (b) of FIG. 3B illustrates that the traveling direction of light is changed upward as an interface in the liquid lens 28 has an asymmetric curved surface.

That is, according to (b) of FIG. 3B, the incident light Lpaa is concentrated upward, and corresponding output light Lpac is output.

Figure 4:
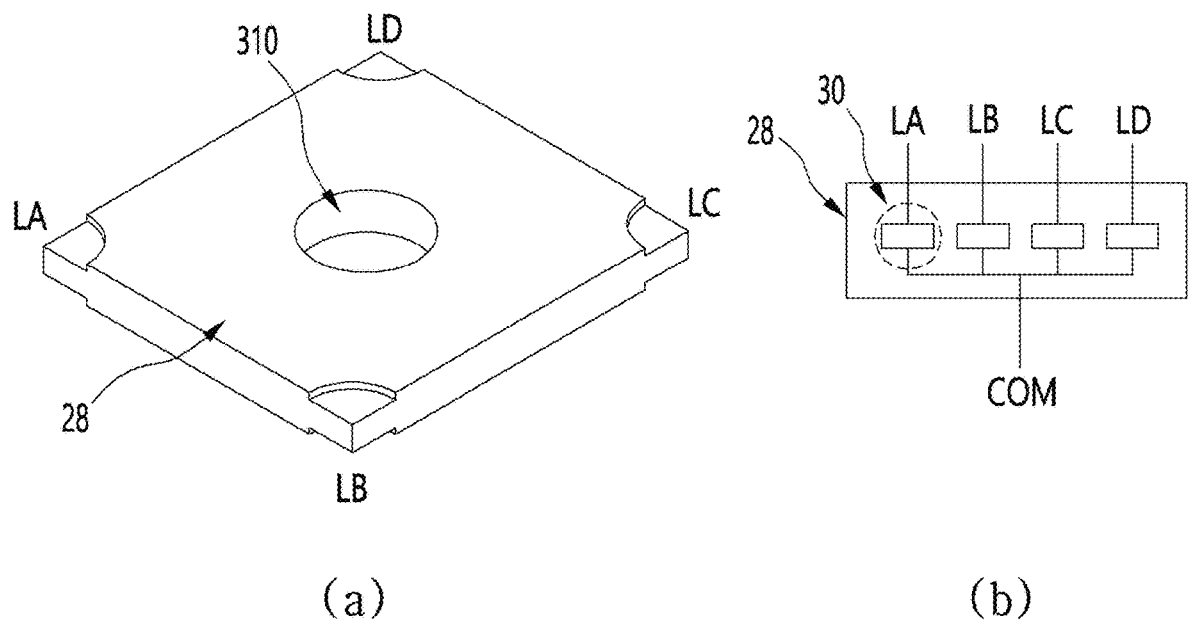
FIG. 4 shows a liquid lens of which focal length is adjusted according to a driving voltage.

FIG. 4 shows a liquid lens of which focal length is adjusted according to a driving voltage. Specifically, (a) shows the liquid lens 28 included in the lens assembly 22 (see FIG. 2), and (b) shows an equivalent circuit of the liquid lens 28.

First, referring to (a) of FIG. 4, the liquid lens 28 of which focal length is adjusted according to the driving voltage may be applied with a voltage via individual terminals LA, LB, LC, and LD disposed in four different directions with the same distance. The individual terminals may be disposed with the same distance with respect to the central axis of the liquid lens, and may include four individual terminals. The four individual terminals may be disposed at four corners of the liquid lens, respectively. When the voltage is applied via the individual terminals L1, L2, L3, and L4, a boundary surface between a conductive liquid and a non-conductive liquid disposed in the lens region 310 may be deformed by the driving voltage which is generated by interaction between the applied voltage and a voltage applied to a common terminal COM described later.

In addition, referring to (b) of FIG. 4, the lens 28 is applied with an operating voltage from different individual terminals LA, LB, LC, and LD at one side thereof, and the other side of the lens 28 may be described as a plurality of capacitors 30 connected to the common terminal COM. Here, the plurality of capacitors 30 included in the equivalent circuit may have a small capacitance of about several tens to 200 pico-farads (pF) or less. The electrodes of the liquid lens described above may also be referred to as terminals, electrode sectors, or sub-electrodes in this disclosure.

Figure 5A:
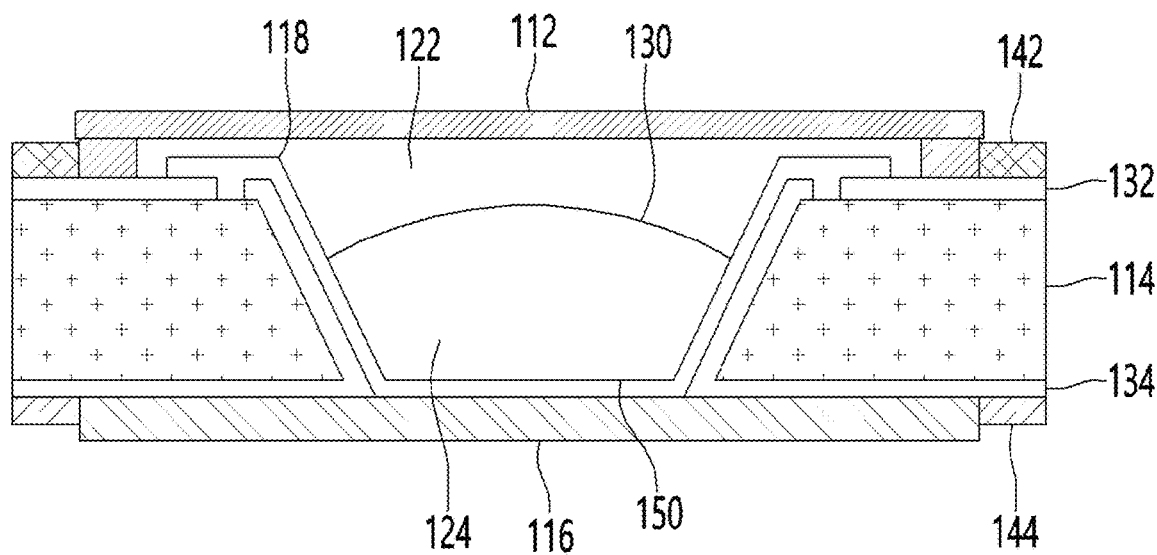
FIGS. 5A and 5B show a structure of a liquid lens.
Figure 5B:
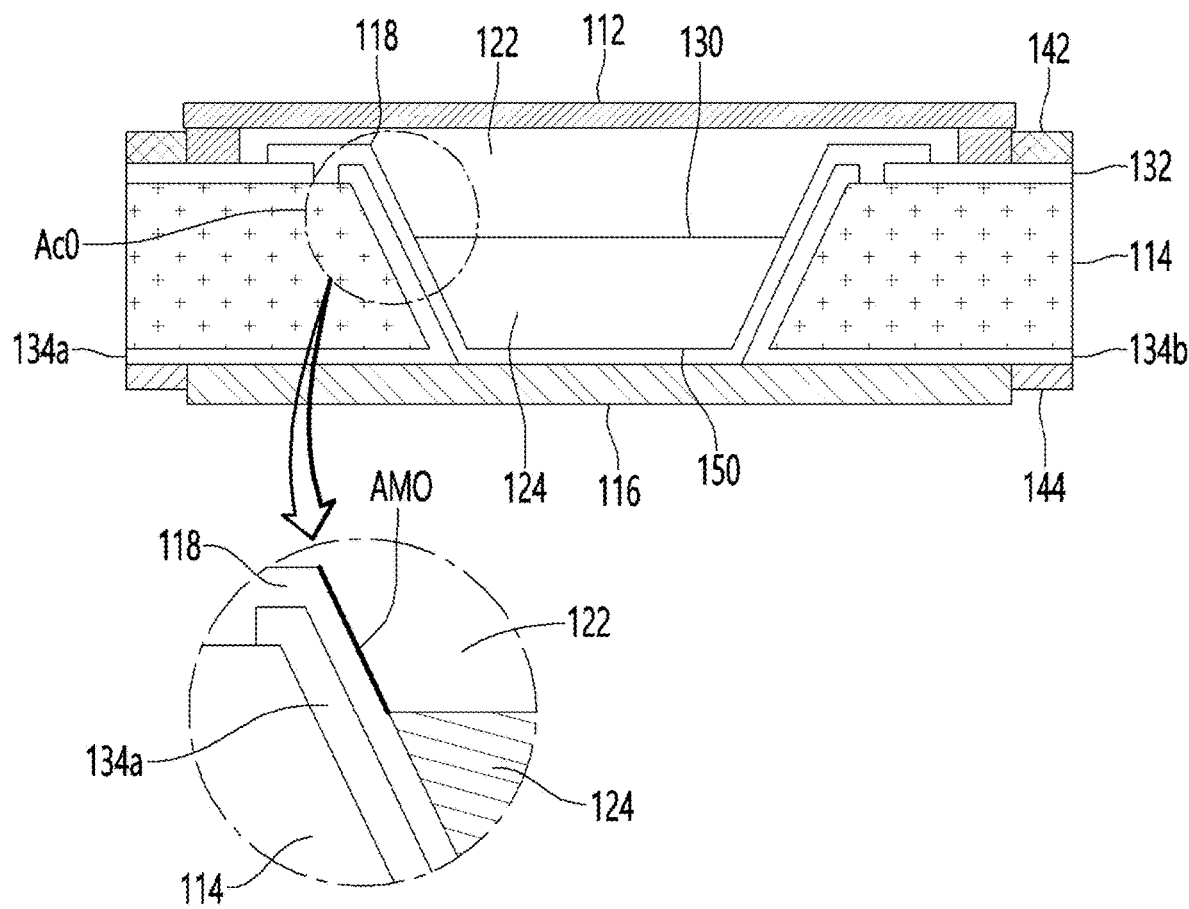

FIGS. 5A and 5B show a structure of a liquid lens.

As shown in FIG. 5A, the liquid lens 28 may include liquids, a first plate, and electrodes. Liquids 122 and 124 accommodated in the liquid lens 28 may include a conductive liquid and a non-conductive liquid. A first plate 114 may include a cavity 150 or a hole in which the conductive liquid and the non-conductive liquid are disposed. The cavity 150 may have an inclined surface. Electrodes 132 and 134 may be disposed on the first plate 114, and may be disposed above the first plate 114 or below the first plate 114.

The liquid lens 28 may further include a second plate 112, which may be disposed above (below) the electrodes 132 and 134. In addition, the liquid lens 28 may further include a third plate 116, which may be disposed below (above) the electrodes 132 and 134.

As shown in the drawing, one embodiment of the liquid lens 28 may include an interface 130 formed by different first and second liquids 122 and 124. In addition, at least one substrate 142 and 144 for supplying a voltage to the liquid lens 28 may be included. A corner of the liquid lens 28 may be thinner than a central portion of the liquid lens 28. The second plate may be disposed on an upper surface of the liquid lens and the third plate may be disposed on a lower surface of the liquid lens, but the second plate or the third plate is not disposed on a part of the upper surface or the lower surface of the corner of the liquid lens, and thus a thickness of the corner of the liquid lens may be thinner than that of the center portion thereof. The electrodes may be exposed from the upper surface or the lower surface of the corner of the liquid lens.

The liquid lens 28 may include two different types of liquids, for example, the first liquid 122 and the second liquid 124, and a curvature and shape of the interface 130 formed by the first and second liquids 122 and 124 may be adjusted by a driving voltage supplied to the liquid lens 28.

In this case, the first liquid 122 may be a conductive liquid. In addition, the second liquid 124 may be a non-conductive liquid.

That is, a plurality of first and second liquids 122 and 124 may be accommodated in a cavity, and may include the first liquid 122 having conductivity and the second liquid (or insulating liquid) 124 having non-conductivity. The first liquid LQ1 and the second liquid LQ2 do not mix with each other, and the interface 130 may be formed at a contact portion between the first and second liquids 122 and 124. For example, the second liquid 124 may be disposed on the first liquid 122, but the embodiment is not limited thereto. For example, unlike the one shown in the drawing, the first liquid 122 may be disposed on the second liquid 124.

In this case, the first liquid 122 and the second liquid 124 may be accommodated in the cavity at different specific gravities.

That is, in case of the liquid lens, a curvature, a position, a shape, and the like of the interface 130 between the first liquid 122 and the second liquid 124 may be changed by using a voltage of the electrode to perform an autofocusing function of a camera. In addition, in the case of the liquid lens, the curvature of the interface is shown asymmetrically with respect to a center of an optical axis by applying asymmetrically the voltage applied to a plurality of electrodes, thereby performing a camera-shake prevention function.

Meanwhile, the driving voltage supplied to the liquid lens 28 may be transmitted via the connection unit 500. The connection unit may include at least one of the first substrate 142 and the second substrate 144. When the connection unit includes the first substrate 142 and the second substrate 144, the second substrate 144 may transmit a voltage to each of a plurality of individual terminals, and the first substrate 142 may transmit a voltage to a common electrode. The number of the plurality of individual terminals may be four, and the second substrate 144 may transmit a voltage to each of the four individual terminals. The voltage supplied via the second substrate 144 and the first substrate 142 may be applied to the plurality of electrodes 134 and 132 disposed at or exposed from each corner of the liquid lens 28.

In addition, the liquid lens 28 may include the third plate 116 and the second plate 112 containing a transparent material and the first plate 114 located between the third plate 116 and the second plate 112 and including an open region having a predetermined inclined surface.

Further, the liquid lens 28 may include the cavity 150, which is defined by the third plate 116, the second plate 112, and the open region of the first plate 114. Here, the cavity 150 may be filled with the first and second liquids 122 and 124 of different types (e.g., the conductive liquid and the non-conductive liquid) as described above, and the interface 130 may be formed between the first and second liquids 122 and 124 of different types.

In addition, at least one of the two liquids 122 and 124 accommodated in the liquid lens 28 may be conductive, and the liquid lens 28 may include the two electrodes 132 and 134 disposed above and below the first plate 114. The first plate 114 may have the inclined surface and may further include an insulating layer 118 disposed on the inclined surface. The conductive liquid may be in contact with the insulating layer 118. Here, the insulating layer 118 may cover one of the two electrodes 132 and 134 (e.g., the individual electrode 134), and may cover or expose a portion of the other electrode (e.g., the common electrode 132) so as to apply electrical energy to the conductive liquid (e.g., 122). Here, the common electrode 132 may include at least one electrode sector (e.g. COM), and the individual electrode 134 may include two or more electrode sectors (e.g., LA, LB, LC, and LD). For example, the individual electrode 134 may include a plurality of electrode sectors, which are sequentially disposed in a clockwise direction with respect to the optical axis. The electrode sectors may be referred to as sub-electrodes or terminals of the liquid lens.

One or a plurality of substrates 142 and 144 for transmitting a voltage may be connected to the two electrodes 132 and 134 included in the liquid lens 28. The focal length of the liquid lens 28 may be adjusted while changing the curvature, bending or inclination of the interface 130 formed in the liquid lens 28 according to the driving voltage.

Referring to FIG. 5B, a first individual electrode LA (134*a*) and a second individual electrode LB (134*b*) among the plurality of individual electrodes LA to LD (134*a* to 134*d*), are formed to be inclined, and it is illustrated that the size decreases from a lower portion to an upper portion.

Meanwhile, unlike FIG. 5B, the plurality of individual electrodes LA to LD (134*a* to 134*d*) may be formed at the upper portion, which is the position of the common electrode 132, and the common electrode 132 may also be formed at the lower portion.

Meanwhile, FIGS. 5A and 5B illustrate four electrodes as the plurality of individual electrodes, but the embodiment is not limited thereto, and two or more various numbers of electrodes may be formed.

Meanwhile, in FIG. 5B, after a pulse-shaped voltage is applied to the common electrode 132, when the pulse-shaped voltage is applied to the first individual electrode LA (134*a*) and the second individual electrode LB (134*b*) after a predetermined time, a potential difference occurs between the common electrode 132 and the first individual electrode LA (134*a*) and the second individual electrode LB (134*b*), and accordingly, a shape of the first liquid 122 having conductivity is changed, and a shape of the interface 130 in the liquid lens 28 is changed in response to the change in the shape of the first liquid 122.

Meanwhile, the present embodiment provides a method for sensing simply and quickly the curvature of the interface 130 formed according to electric signals applied to each of the plurality of individual electrodes LA to LD (134*a* to 134*d*) and the common electrode 132.

To this end, a sensor unit in the present invention senses a size or change of an area of a boundary region Ac0 between the insulating layer 118 on any one individual electrode (e.g., the first individual electrode 134*a*) of the individual electrodes in the liquid lens 28 and the first liquid 122.

FIG. 5B illustrates AM0 as the area of the boundary region Ac0. In particular, it is illustrated that the area of the boundary region Ac0 in contact with the first liquid 122 in the inclined portion of the insulating layer 118 on the first individual electrode 134*a* is AM0.

FIG. 5B illustrates that the interface 130 is not concave or convex, and as an example, is in parallel with the first plate 114 or the like. In this case, the curvature of the interface 130, for example, may be defined as 0.

Meanwhile, as shown in FIG. 5B, a capacitance C may be formed in the boundary region Ac0 in contact with the first liquid 122 in the inclined portion of the insulating layer 118 on the first individual electrode 134*a* according to the following Equation 1.

$$C = \varepsilon \frac{A}{d} \quad \text{[Equation 1]}$$

Here, ε may represent a dielectric constant of the insulating layer 118 that is a dielectric, A may represent an area of the boundary region Ac0, and d may represent a thickness of the insulating layer 118.

Here, assuming that εd is a fixed value, it is possible that the area of the boundary region Ac0 has a great influence on the capacitance C.

That is, the larger the area of the boundary region Ac0, the larger the capacitance C formed in the boundary region Ac0.

Meanwhile, the more the curvature of the interface 130 is changed, the more the area of the boundary region Ac0 is changed, and thus, in the embodiment, the sensor unit may be used to sense the area of the boundary region Ac0, or to sense the capacitance C formed in the boundary region Ac0.

Meanwhile, the capacitance of FIG. 5B may be defined as CAc0.

FIGS. 6A to 6E are views illustrating various curvatures of a liquid lens 28.

Figure 6A:
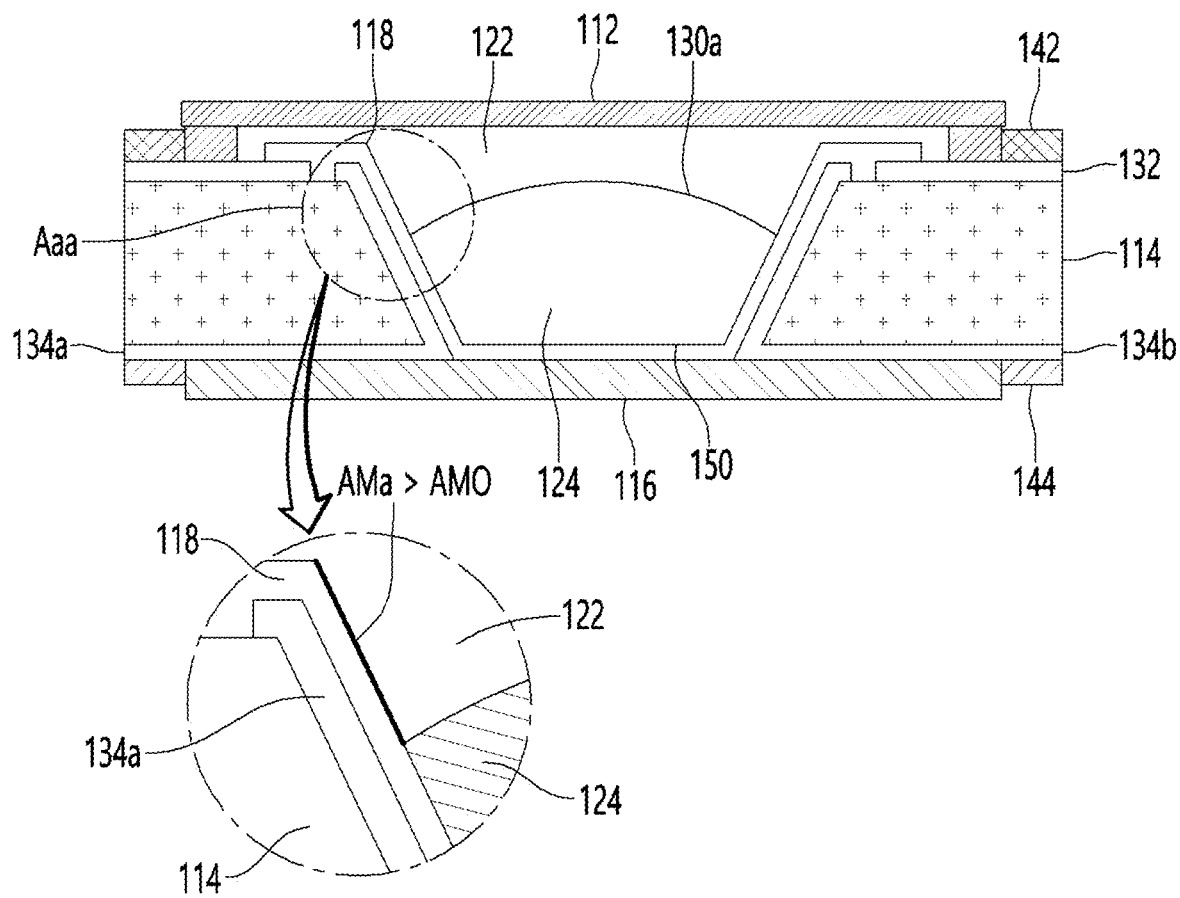
FIGS. 6A to 6E are views illustrating various curvatures of a liquid lens.

First, FIG. 6A illustrates that a first curvature 130*a* is formed at the interface 130 based on the pulse-shaped voltage applied to the plurality of individual electrodes LA to LD (134*a* to 134*d*) and the common electrode 132, respectively.

FIG. 6A illustrates AMa (>AM0) as an area of a boundary region Aaa as the first curvature 130*a* is formed at the interface 130. In particular, it is illustrated that the area of the boundary region Aaa in contact with the first liquid 122 in the inclined portion of the insulating layer 118 on the first individual electrode 134*a* is AMa.

According to the Equation 1, the area of the boundary region Aaa in FIG. 6A is larger than that of FIG. 5B, so that a capacitance of the boundary region Aaa becomes larger. Meanwhile, the capacitance of FIG. 6A may be defined as CAaa, and has a larger value than CAc0 that is the capacitance of FIG. 5B.

At this time, the first curvature 130*a* may be defined as having a positive polarity value. For example, the first curvature 130*a* may be defined as having a +2 level.

Figure 6B:
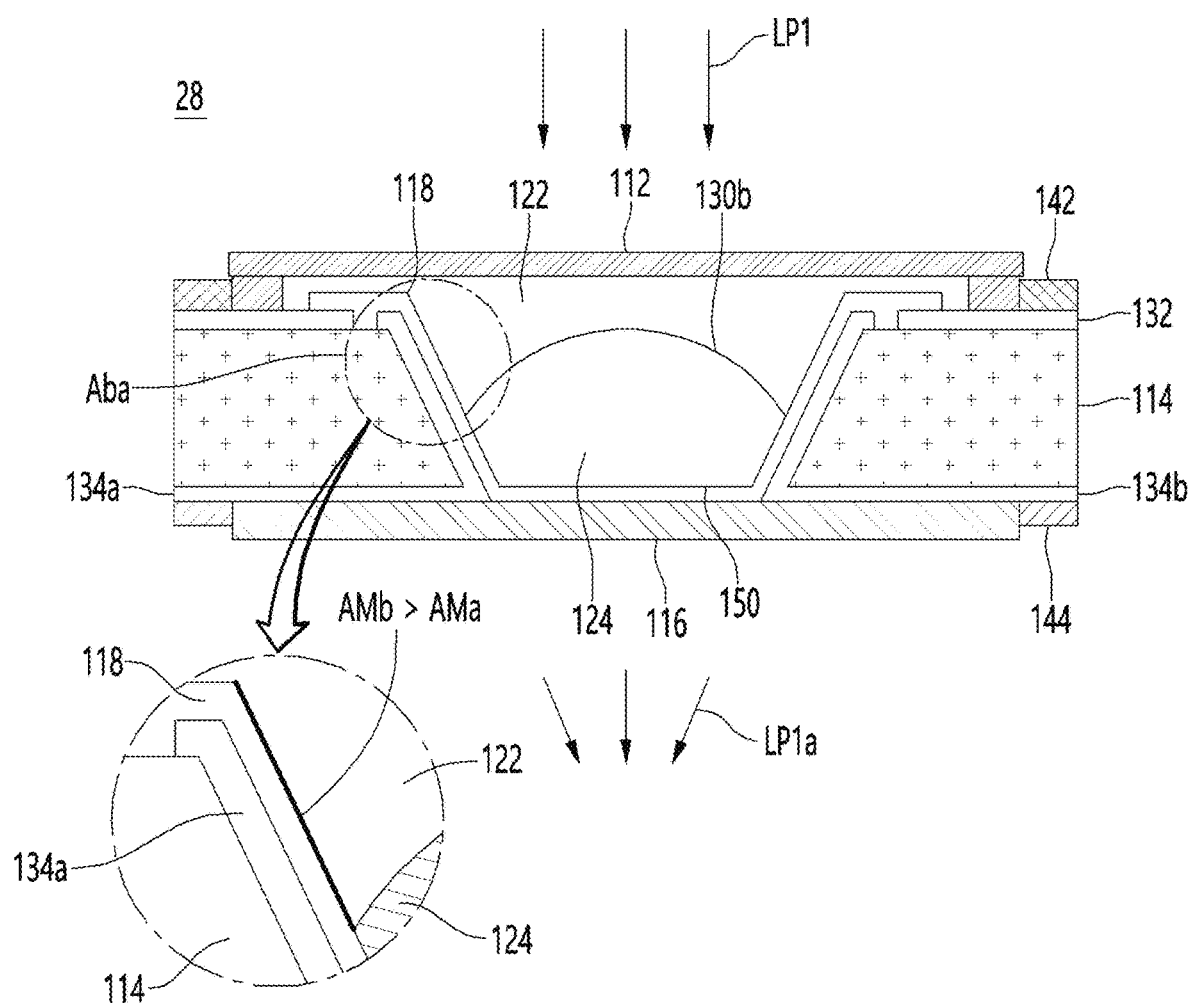

Next, FIG. 6B illustrates that a second curvature 130*b* is formed at the interface 130 based on the pulse-shaped voltage applied to the plurality of individual electrodes LA to LD (134*a* to 134*d*) and the common electrode 132, respectively.

FIG. 6B illustrates AMb (>AMa) as an area of a boundary region Aba as the second curvature 130*b* is formed at the interface 130. In particular, it is illustrated that the area of the boundary region Aba in contact with the first liquid 122 in the inclined portion of the insulating layer 118 on the first individual electrode 134*a* is AMb.

According to Equation 1, the area of the boundary region Aba in FIG. 6B is larger than that of FIG. 6A, so that a capacitance of the boundary region Aba becomes larger. Meanwhile, the capacitance of FIG. 6B may be defined as CAba, and has a larger value than CAaa that is the capacitance of FIG. 6A.

At this time, the second curvature 130*b* may be defined as having a positive polarity value smaller than the first curvature 130*a*. For example, the second curvature 130*b* may be defined as having a +4 level.

Meanwhile, according to FIGS. 6A and 6B, the liquid lens 28 operates as a convex lens, and accordingly, output light LP1*a* in which incident light LP1 is concentrated is output.

Figure 6C:
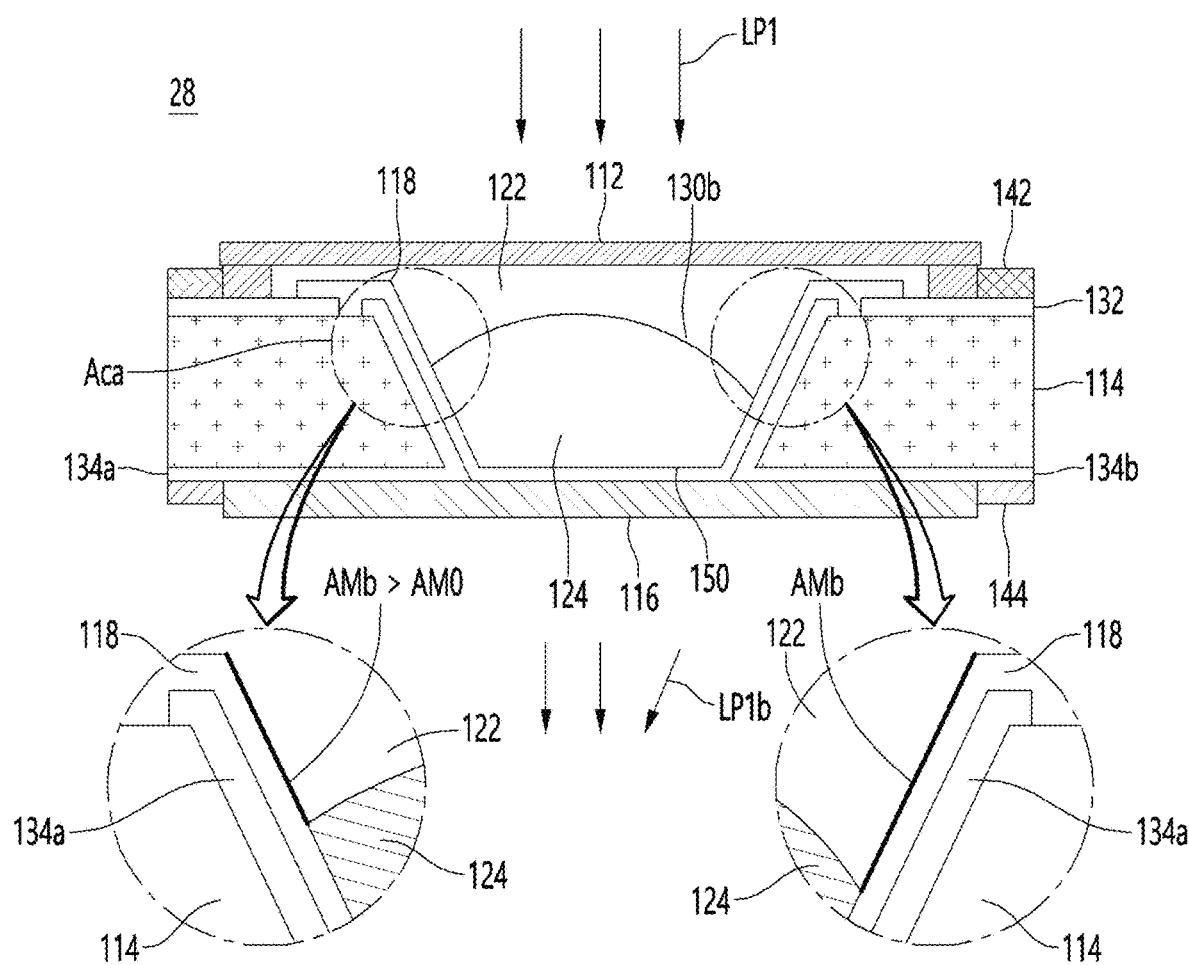

Next, FIG. 6C illustrates that a third curvature 130*c* is formed at the interface 130 based on the pulse-shaped voltage applied to the plurality of individual electrodes LA to LD (134*a* to 134*d*) and the common electrode 132, respectively.

In particular, FIG. 6C illustrates AMa as an area of a left boundary region Aca, and illustrates AMb (>AMa) as an area of a right boundary region Acb.

In particular, it is illustrated that the area of the boundary region Aca in contact with the first liquid 122 in the inclined portion of the insulating layer 118 on the first individual electrode 134*a* is AMa, and the area of the boundary region Acb in contact with the first liquid 122 in the inclined portion of the insulating layer 118 on the second individual electrode 134*b* is AMb.

Accordingly, a capacitance of the left boundary region Aca may be CAaa, and a capacitance of the right boundary region Acb may be Caba.

At this time, the third curvature 130*c* may be defined as having a positive polarity value. For example, the third curvature 130*c* may be defined as having a +3 level.

Meanwhile, according to FIG. 6C, the liquid lens 28 operates as a convex lens, and accordingly, output light LP1*b* in which incident light LP1 is further concentrated on one side is output.

Figure 6D:
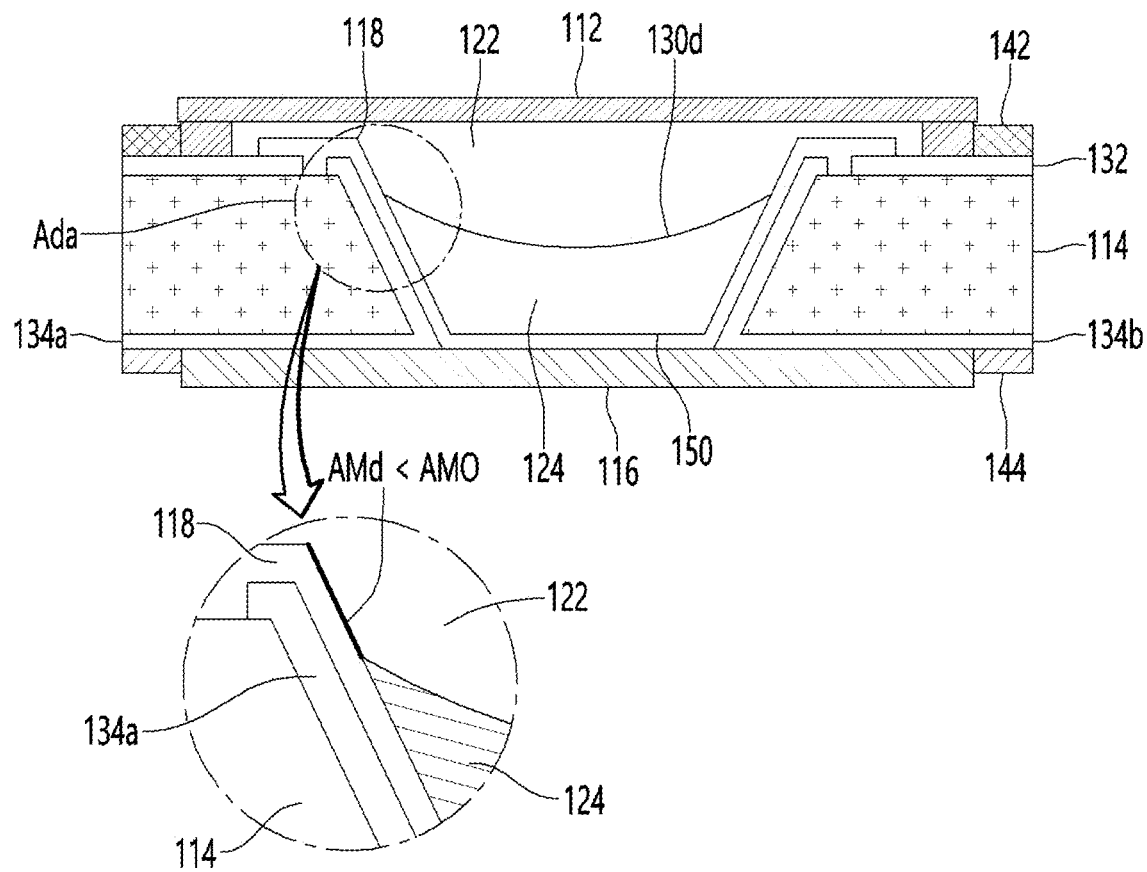

Next, FIG. 6D illustrates that a fourth curvature 130*d* is formed at the interface 130 based on the pulse-shaped voltage applied to the plurality of individual electrodes LA to LD (134*a* to 134*d*) and the common electrode 132, respectively.

FIG. 6D illustrates AMd AM0) as an area of a boundary region Ada as the fourth curvature 130*d* is formed at the interface 130. In particular, it is illustrated that the area of the boundary region Ada in contact with the first liquid 122 in the inclined portion of the insulating layer 118 on the first individual electrode 134*a* is AMd.

According to the Equation 1, the area of the boundary region Ada in FIG. 6D is smaller than that of FIG. 5BC, so that a capacitance of the boundary region Ada becomes smaller. Meanwhile, the capacitance of FIG. 6D may be defined as CAda, and has a smaller value than CAc0 that is the capacitance of FIG. 6C.

At this time, the fourth curvature 130*d* may be defined as having a negative polarity value. For example, the fourth curvature 130*d* may be defined as having a −2 level.

Figure 6E:
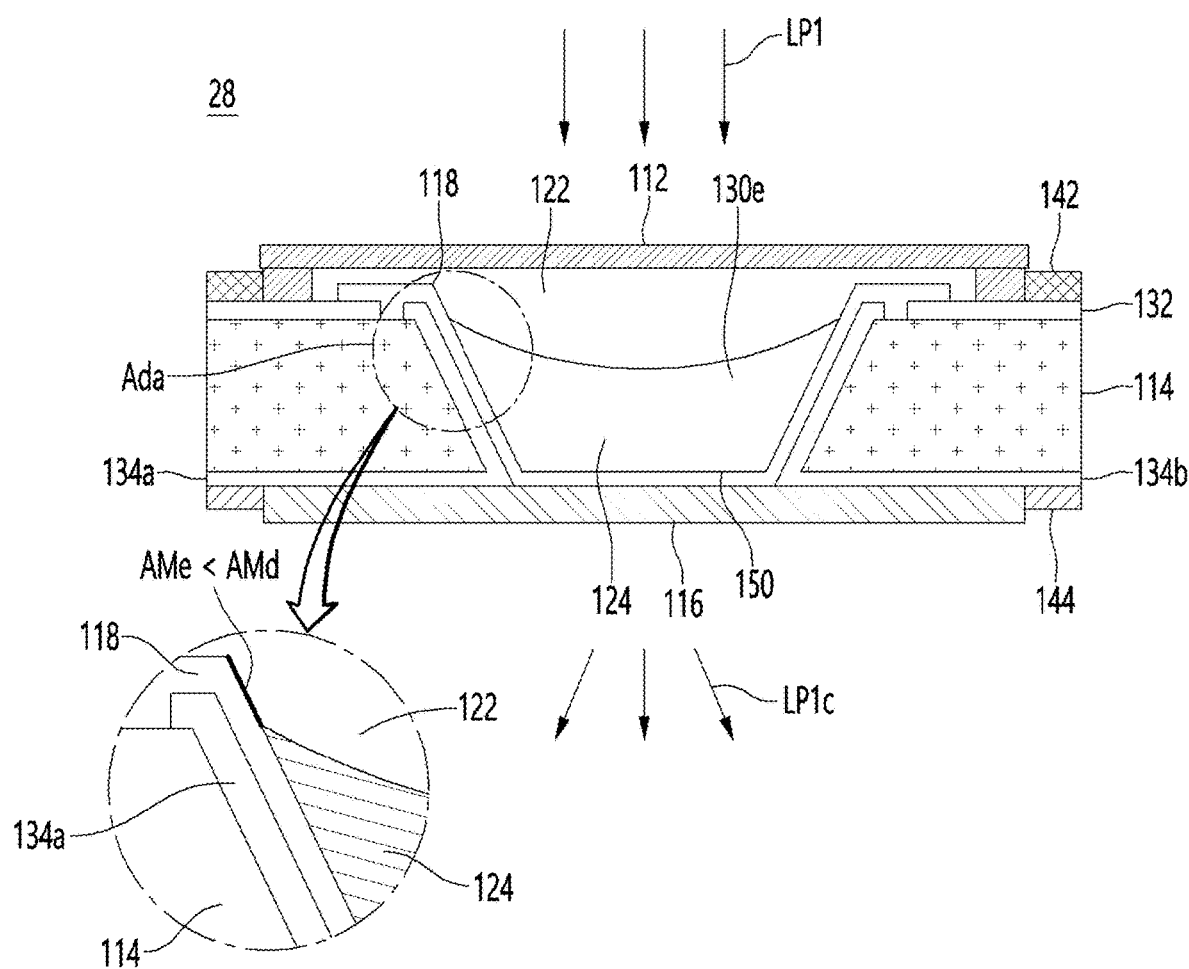

Next, FIG. 6E illustrates that a fifth curvature 130*e* is formed at the interface 130 based on the pulse-shaped voltage applied to the plurality of individual electrodes LA to LD (134a to 134d) and the common electrode 132, respectively.

FIG. 6E illustrates AMe AMd) as an area of a boundary region Aea as the fifth curvature 130e is formed at the interface 130. In particular, it is illustrated that the area of the boundary region Aea in contact with the first liquid 122 in the inclined portion of the insulating layer 118 on the first individual electrode 134a is AMe.

According to the Equation 1, the area of the boundary region Aea in FIG. 6E is smaller than that of FIG. 6D, so that a capacitance of the boundary region Aea becomes smaller. Meanwhile, the capacitance of FIG. 6E may be defined as CAea, and has a smaller value than CAda that is the capacitance of FIG. 6D.

At this time, the fifth curvature 130e may be defined as having a negative polarity value. For example, the fifth curvature 130e may be defined as having a −4 level.

Meanwhile, according to FIGS. 6D and 6E, the liquid lens 28 operates as a concave lens, and accordingly, output light LP1c from which incident light LP1 is diverged is output.

Figure 7:
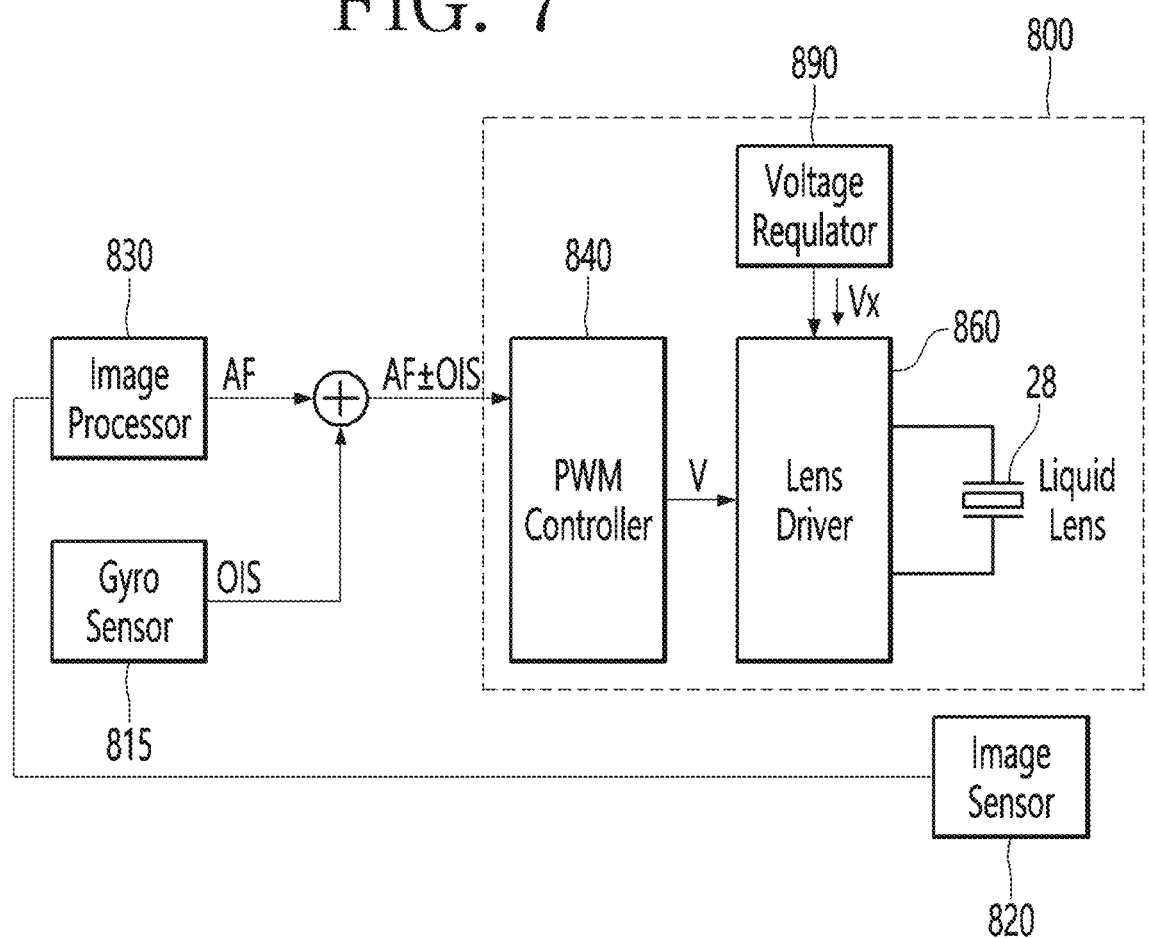
FIG. 7 is an example of an internal block diagram of a camera module according to an embodiment.

FIG. 7 is an example of an internal block diagram of a camera module according to an embodiment.

Referring to the drawing, the camera module of FIG. 7 includes a lens curvature variation apparatus 800, an image sensor 820, an image processor 830, and a gyro sensor 815.

The lens curvature variation apparatus 800 includes a liquid lens 28, a lens driver 860, a pulse width variable controller 840, and a power supply unit 890.

Describing an operation of the lens curvature variation apparatus 800 of FIG. 7, when the pulse width variable controller 840 outputs a pulse width variable signal V in response to a target curvature or a target interface, the lens driver 860 may output a corresponding voltage to a plurality of individual electrodes and a common electrode of the liquid lens 28 by using the pulse width variable signal V and a voltage Vx of the power supply unit 890.

That is, the lens curvature variation apparatus 800 of FIG. 7 operates as an open loop system for varying the curvature of the liquid lens.

According to such a method, there is a disadvantage that the actual curvature of the liquid lens 28 may not be sensed in addition to outputting corresponding voltages to the plurality of individual electrodes and the common electrode of the liquid lens 28 in accordance with the target curvature.

In addition, according to the lens curvature variation apparatus 800 of FIG. 7, when the varying of the curvature of the liquid lens 28 is necessary to inhibit a shake, the curvature is not sensed, and thus there is a disadvantage that accurate varying of the curvature may be difficult.

Accordingly, in this embodiment, as shown in FIG. 7, the lens curvature variation apparatus 800 is not implemented as the open loop system, but is implemented as a closed loop system.

That is, in order to grasp the curvature of the liquid lens 28, the lens curvature variation apparatus 800 senses a capacitance formed on the insulating layer on the electrode inside the liquid in the liquid lens 28 and the boundary region Ac0 in contact with the first liquid 122, feedbacks the sensed capacitance to calculate a difference between the target curvature and the present curvature, and performs a control according to the difference.

Accordingly, the curvature of the liquid lens 28 may be grasped quickly and accurately, and the curvature of the liquid lens 28 may be controlled quickly and accurately so as to correspond to the target curvature. This will be described in more detail with reference to FIG. 8 below.

Figure 8:
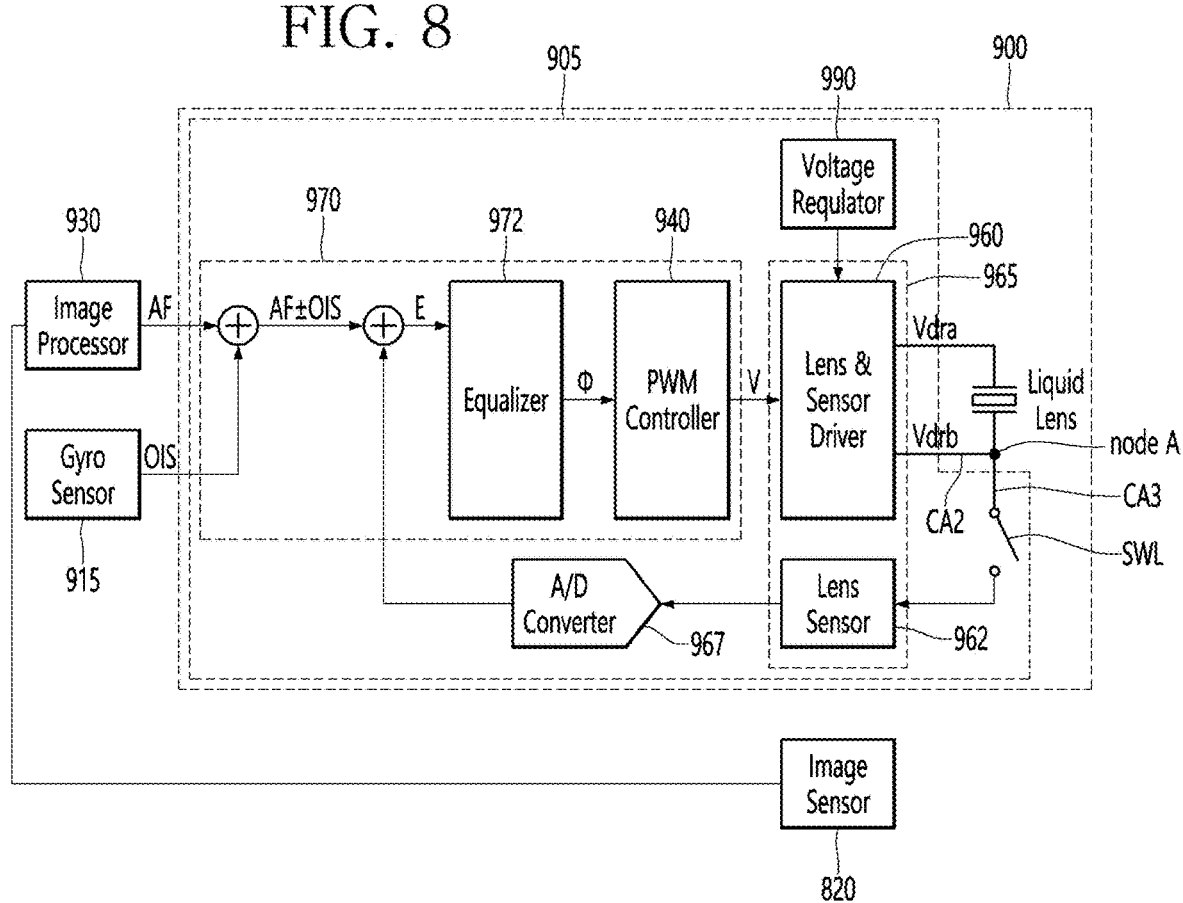
FIG. 8 is an example of an internal block diagram of a camera module according to an embodiment.

FIG. 8 is an example of an internal block diagram of a camera module according to an embodiment.

Referring to the drawing, the camera module according to the embodiment may include a lens curvature variation apparatus 900, an image sensor 820 that converts light from a liquid lens 28 in the lens curvature variation apparatus 900 into an electric signal, and an image processor 930 that performs image processing based on the electric signal from the image sensor 820.

In particular, a camera module 100 of FIG. 8 may further include a gyro sensor 915.

The image processor 930 may output focus information (AF), and the gyro sensor 915 may output shake information (OIS) corresponding to a gyro data.

Accordingly, a controller 970 in the lens curvature variation apparatus 900 may determine a target curvature based on the focus information (AF) and the shake information (OIS). For example, the controller 970 determines a vibration axis based on the shaking information (OIS) and controls the interface of the liquid lens by changing the driving voltage applied to the individual electrodes LA to LD based on the determined vibration axis. That is, the controller 970 may adjust the driving voltage applied to the plurality of individual electrodes LA to LD so that the interface of the liquid lens forms a target interface. In this case, the target interface may correspond to a target curvature of the interface of the liquid lens.

Meanwhile, the lens curvature variation apparatus 900 according to the embodiment may include the lens driver 960 applying an electric signal to the liquid lens 28, a sensor unit 962 for sensing the interface (More clearly, a state of the interface or a curvature of the interface) of the liquid lens 28 formed based on the electric signal, and the controller 970 for controlling the lens driver 960 so as to form the target curvature of the liquid lens 28 based on the sensed interface, wherein the sensor unit 962 may sense a size or change of an area of a boundary region Ac0 between an insulating layer on an electrode in the liquid lens 28 and a first liquid 122. Accordingly, the curvature of the lens may be sensed quickly and accurately.

Meanwhile, the lens curvature variation apparatus 900 according to the embodiment may include the liquid lens 28 of which the interface is variable based on the applied electric signal.

Meanwhile, the lens curvature variation apparatus 900 according to the embodiment may further include a power supply unit 990 and an AD converter 967.

Meanwhile, the lens curvature variation apparatus 900 may further include a plurality of conductive lines CA1 and CA2 for supplying an electric signal from the lens driver 960 to each electrode (common electrode, plurality of electrodes) in the liquid lens 28, and a switching element SWL disposed between any one conductive line CA2 of the plurality of conductive lines and the sensor unit 962.

In the drawing, it is illustrated that the switching element SWL is disposed between the conductive line CA2 for applying a pulse-shaped voltage (or electric signal) to any one of a plurality of individual electrodes in the liquid lens 28 and the sensor unit 962. In this case, a contact point between the conductive line CA2 and one end of the switching element SWL or the liquid lens 28 may be referred to as a node A. Meanwhile, in the embodiment as described above, a capacitance capable of sensing a size or change of the area of the boundary region Ac0 between the insulating layer on the electrode in the liquid lens 28 and the first liquid 122 is sensed for each of the plurality of individual electrodes.

Meanwhile, in the embodiment, in order to sense the curvature of the liquid lens 28, the pulse-shaped voltage (or electric signal) is applied to each electrode (common electrode, plurality of electrodes) in the liquid lens 28 via the plurality of conductive lines CA1 and CA2. Accordingly, the curvature may be formed at the interface 130 as shown in FIGS. 6A to 6E.

For example, the switching element SWL may be turned on during a first period.

At this time, when an electric signal is applied to the electrode in the liquid lens 28 in a state in which the switching element SWL is turned on and is electrically connected to the sensor unit 820, a curvature may be formed in the liquid lens 28, and an electric signal corresponding to the curvature formation may be supplied to the sensor unit 820 via the switching element SWL.

Accordingly, the sensor unit 820 may sense the size or change of the area of the boundary region Ac0 between the insulating layer 118 on the individual electrode in the liquid lens 28 and the first liquid 122, or the capacitance of the boundary region Ac0 based on the electrical signal from the liquid lens 28 during an ON period of the switching element SWL.

Then, the switching element SWL is turned off during a second period, and the electric signal may be continuously applied to the electrode in the liquid lens 28. Accordingly, a curvature may be formed in an interface of a liquid lens.

Then, during a third period, the switching element SWL is turned off, and no voltage may be applied to the electrode in the liquid lens 28, or a low level voltage may be applied thereto.

Then, during a fourth period, the switching element SWL may be turned on.

At this time, when a voltage is applied to the electrode in the liquid lens 28 in a state in which the switching element SWL is turned on and is electrically connected to the sensor unit 820, a curvature may be formed in the liquid lens 28, and an electric signal corresponding to the curvature formation may be supplied to the sensor unit 962 via the switching element SWL.

Meanwhile, when the curvature calculated based on the capacitance sensed during the first period is smaller than the target curvature, in order to reach the target interface or the target curvature, the controller 970 may control such that a pulse width of a pulse width variable control signal supplied to the lens driver 960 is increased.

Accordingly, a time difference between pulses applied to the common electrode 132 and the plurality of individual electrodes respectively may be increased, and thus the curvature formed in the interface 130 may be increased.

During the fourth period, when an electric signal is applied to the electrode in the liquid lens 28 in a state in which the switching element SWL is turned on and is electrically connected to the sensor unit 962, a curvature may be formed in the liquid lens 28, and an electric signal corresponding to the curvature formation may be supplied to the sensor unit 820 via the switching element SWL.

Accordingly, the sensor unit 962 may sense the size or change of the area of the boundary region Ac0 between the insulating layer on the individual electrode in the liquid lens 28 and the first liquid 122, or the capacitance of the boundary region Ac0 based on the electrical signal from the liquid lens 28 during an ON period of the switching element SWL.

Accordingly, the controller 970 may calculate the curvature based on the sensed capacitance, and may determine whether the curvature reaches the target curvature. Meanwhile, when the curvature reaches the target curvature, the controller 970 may control a corresponding voltage to be supplied to the individual electrode and the common electrode.

Accordingly, it is possible to form the curvature of the interface 130 according to the supplied voltage, and to sense directly the curvature of the formed interface. Therefore, it is possible to grasp the curvature of the liquid lens 28 quickly and accurately.

Meanwhile, in the drawing, the lens driver 960 and a sensor driver (not shown) may be formed as a single module.

Meanwhile, in the drawing, the lens driver 960, the sensor unit 962, the controller 970, the power supply unit 990, the AD converter 967, and the switching element SWL may be implemented in a single chip as a system on chip (SOC) 905. That is, in the embodiment, the lens driver 960, the sensor unit 962, the controller 970, the power supply unit 990, the AD converter 967, and the switching element SWL may be referred to as a driver IC for driving the liquid lens.

Meanwhile, as described in FIGS. 5A and 5B, the liquid lens 28 may include the common electrode COM (132), the second liquid 124 on the common electrode COM (132), the first liquid 122 on the second liquid 124, and the plurality of individual electrodes LA to LD (134a to 134d) disposed to be spaced apart from the first liquid 122.

Meanwhile, as described in FIGS. 6A to 6E, the sensor unit 962 may sense the area of the boundary region Ac0 between the insulating layer on the individual electrode in the liquid lens 28 and the first liquid 122, the change of the area, or the capacitance corresponding thereto.

Meanwhile, an analog signal related to the capacitance sensed by the sensor unit 962 may be converted into a digital signal via the AD converter 967 to input to the controller 970.

Meanwhile, as described in FIGS. 6A to 6E, as the curvature of the liquid lens 28 is increased, the area of the boundary region Ac0 is increased, and finally the capacitance of the boundary region Ac0 is increased.

In the embodiment, such characteristics are used to calculate the curvature by using the capacitance sensed at the sensor unit 962.

Meanwhile, the controller 970 may control a level of the voltage applied to the liquid lens 28 to be increased, or may control the pulse width to be increased, in order to increase the curvature of the liquid lens 28.

Meanwhile, as shown in FIG. 6C, when a voltage of a different level or a voltage of a different pulse width is applied to the first individual electrode 134a and the second individual electrode 134b among the plurality of individual electrodes LA to LD (134a to 134d), a first capacitance of a first region Aca of the interface 130 and a second capacitance of a second region Acb of the interface 130 are changed.

Accordingly, the sensor unit 962 may sense the capacitance of each of the first region Aca and the second region Acb of the interface 130. To this end, the sensor unit 962 is connected to the plurality of individual electrodes LA to LD (134a to 134d), respectively, and accordingly, the capacitance of the boundary region between the insulating layer on each individual electrode and the first liquid 122 may be sensed individually.

As described above, it is possible to sense accurately the curvature of the liquid lens by sensing the capacitance of the boundary region of the interface 130 in the liquid lens 28.

That is, it is possible to sense accurately the curvature of the liquid lens by sensing the capacitance of a plurality of boundary regions between the insulating layer on the electrode in the liquid lens 28 and the first liquid 122.

Meanwhile, the controller 970 may calculate the curvature of the liquid lens 28 based on the capacitance sensed at the sensor unit 962.

At this time, the controller 970 may calculate that as the capacitance sensed at the sensor unit 962 is increased, the curvature of the liquid lens 28 is increased.

In addition, the controller 970 may control the liquid lens 28 so as to have a target curvature.

Meanwhile, the controller 970 may calculate the curvature of the liquid lens 28 based on the capacitance sensed at the sensor unit 962, and may output a pulse width variable signal V to the lens driver 960 based on the calculated curvature and the target curvature.

Accordingly, the lens driver 960 may output a corresponding voltage to the plurality of individual electrodes of the plurality of individual electrodes LA to LD (134*a* to 134*d*) and the common electrode 132 by using the pulse width variable signal V and voltages Lv1 and Lv2 of the power supply unit 990.

As described above, it is possible to vary the curvature of the lens quickly and accurately by sensing the capacitance of the liquid lens 28 and feeding it back, and applying an electric signal to the liquid lens 28 so that the curvature of the lens is varied.

Meanwhile, the controller 970 may include an equalizer 972 calculating a curvature error Φ based on the calculated curvature and the target curvature, and a pulse width variable controller 940 that generates and outputs the pulse width variable signal V based on the calculated curvature error Φ.

Accordingly, when the calculated curvature becomes larger than the target curvature, the controller 970 may control so that a duty of the pulse width variable signal V is increased based on the calculated curvature error 1. Accordingly, it is possible to vary the curvature of the liquid lens 28 quickly and accurately.

Meanwhile, the controller 970 may receive the focus information (AF) from the image processor 930 and the shake information (OIS) from the gyro sensor 915, and may determine the target curvature based on the focus information (AF) and the shake information (AF).

At this time, an update cycle of the determined target curvature is preferably longer than that of the calculated curvature based on the sensed capacitance of the liquid lens 28.

As a result, since the update cycle of the calculated curvature is smaller than that of the target curvature, it is possible to quickly vary the curvature of the liquid lens 28 to change it to a desired curvature.

Figure 9:
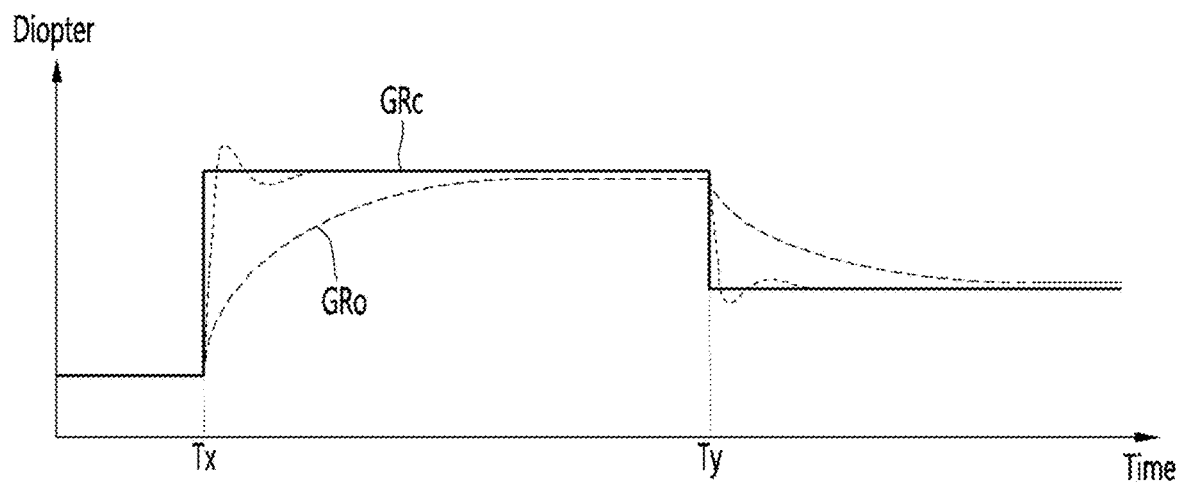
FIG. 9 is a diagram showing a change curve of the curvature of the liquid lens at the lens curvature variation apparatus of FIGS. 7 and 8.

FIG. 9 is a diagram showing a change curve of the curvature of the liquid lens at the lens curvature variation apparatus of FIGS. 7 and 8.

Referring to the drawings, GRo shows the change curve of the curvature of the liquid lens 28 at the lens curvature variation apparatus 800 of FIG. 7, and GRc shows the change curve of the curvature of the liquid lens 28 at the lens curvature variation apparatus 900 of FIG. 8.

In particular, it is illustrated that a voltage for a change toward a target curvature is applied to the liquid lens 28 at a time Tx, respectively, and application of a voltage is stopped at a time Ty.

Comparing the two curves, in case of the lens curvature variation apparatus 800 of FIG. 7 of the open loop system, it may be seen that it is slowly settling to a target diopter, but not exactly, whereas in case of the lens curvature variation apparatus 900 of FIG. 8. of the closed loop system, it may be seen that it is quickly and accurately settling to the target diopter.

Compared to the lens curvature variation apparatus 800 of FIG. 7 of the open loop system, a settling timing may be about 70% faster in the case of the lens curvature variation apparatus 900 of FIG. 8. of the closed loop system.

As a result, when using the lens curvature variation apparatus 900 of FIG. 8 of the closed loop system, it is possible to form the curvature and the diopter quickly and accurately.

Meanwhile, the diopter may correspond to the curvature of the interface 130 described in FIGS. 6A to 6E. Accordingly, it is possible to define that as the curvature of the interface 130 increases, the diopter increases, and as the curvature decreases, the diopter decreases.

For example, as shown in FIGS. 6A to 6B, when the curvature has levels of +2 and +4, the diopter may be defined as having the levels of +2 and +4 corresponding to a convex lens, as shown in FIG. 6B, when the curvature is at 0 level, the diopter may be defined as having 0 level corresponding to a planar lens, and as shown in FIGS. 6D to 6E, when the curvature has levels of −2 and −4, the diopter may be defined as having the levels of −2 and −4 corresponding to a concave lens.

Figure 10:
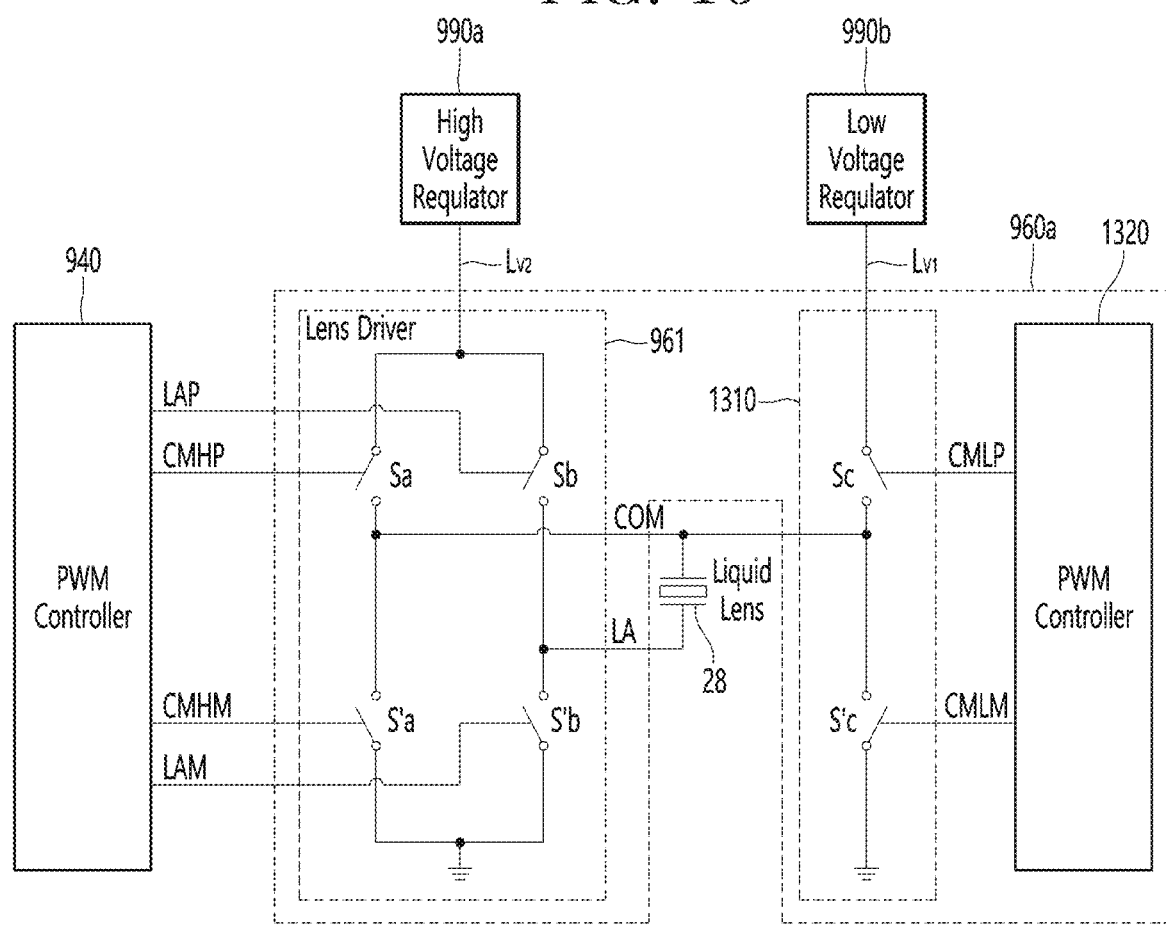
FIG. 10 is an example of an internal circuit diagram of the lens driver in FIG. 8.

FIG. 10 is an example of an internal circuit diagram of the lens driver in FIG. 8.

Referring to the drawing, a lens driver 960*a* of FIG. 10 may include a first driver 961 driving a lens and a second driver 1310 driving a sensor.

Meanwhile, the lens driver 960*a* may further include a pulse width variable controller 1320 that outputs a pulse width variable signal to the second driver 1310.

Meanwhile, the pulse width variable controller 1320 may also be included in the pulse width variable controller 940 of FIG. 8.

The first driver 961 may include first upper-arm and lower-arm switching elements Sa and S'a connected in series with each other, and second upper-arm and lower-arm switching elements Sb and S'b connected in series with each other.

At this time, the first upper-arm and lower-arm switching elements Sa and S'a and the second upper-arm and lower-arm switching elements Sb and S'b are connected in parallel with each other.

Electric power of a second level LV2 from a first power supply unit 990 may be supplied to the first upper-arm switching element Sa and the second upper-arm switching element Sb.

The second driver 1310 may include third upper-arm and lower-arm switching elements Sc and S'c connected in series with each other.

Electric power of a first level LV1 lower than the second level LV2 from a second power supply unit 990*b* may be supplied to the third upper-arm switching element Sc in order to generate an additional pulse of a low level (which may also be referred to as a sensing pulse).

The first level LV1 may be determined based on the second level LV2. For example, the first level LV1 may be greater than 3% of the second level LV2. For example, the first level LV1 may be smaller than 20% of the second level LV2. For example, when the second level LV2 is 70V, the first level LV1 may be a voltage between 2.1V and 21V. At this time, when the first level LV1 is smaller than 3% of the second level LV2, a charge amount accumulated by the sensing pulse is too small, and thus it may be difficult to accurately measure the curvature of the interface 130. In addition, when the first level LV1 is greater than 20% of the second level LV2, a voltage of the sensing pulse affects a driving voltage of the liquid lens 28, and accordingly, the driving voltage of the liquid lens 28 may be different from the target voltage, and thus the interface of the liquid lens 28 may be largely departed from the target curvature. Therefore, in an embodiment, the first level LV1 may be between 3% and 20% of the second level LV2.

The second power supply unit 990b converts intensity of an input voltage into a voltage within the above-described range and outputs it to the second driver 1310. At this time, the input voltage may be supplied from a battery (not shown). For example, the input voltage may be a voltage of a battery in a mobile terminal to which the camera module of the embodiment is applied. For example, the input voltage may be 12V, but the embodiment is not limited thereto.

Meanwhile, a voltage may be applied to the common electrode 132 via a node between the first upper-arm switching element Sa and the first lower-arm switching element S'a or a node between the third upper-arm switching element Sc and the third lower-arm switching element S'c, and a voltage may be applied to the first electrode LA (134a) via a node between the second upper-arm switching element Sb and the second lower-arm switching element S'b.

At this time, in the embodiment, a capacitance corresponding to the curvature of the interface 130 may be sensed by using a sensing pulse supplied via the second driver 1310. Meanwhile, the sensing pulse may be supplied at a specific timing. For example, the sensing pulse may be supplied at a time at which a voltage is not supplied to the common electrode COM and the plurality of individual electrodes LA to LD. For example, the sensing pulse may be supplied at a time at which all the first upper-arm and lower-arm switching elements Sa and S'a and the second upper-arm and lower-arm switching elements Sb and S'b constituting the first driver 961 operate in an open state. That is, a ground of the sensor unit 962, a ground of the first driver 961, and a ground of the power supply unit 990 are all connected. At this time, when a switching operation of the switching element included in the first driver 961 or the power supply unit 990 is performed during an operation of the sensor unit 962, thereby noise is generated in the ground. Also, the sensor unit 962 may have difficulty in accurate sensing of capacitance due to the generated noise. Therefore, the sensing pulse in the embodiment may be supplied at a time at which the switching element of the first driver 961 or the power supply unit 990 does not perform the switching operation, for example, in a period of a state in which all the switching elements are opened. It will be described in more detail below.

Figure 11:
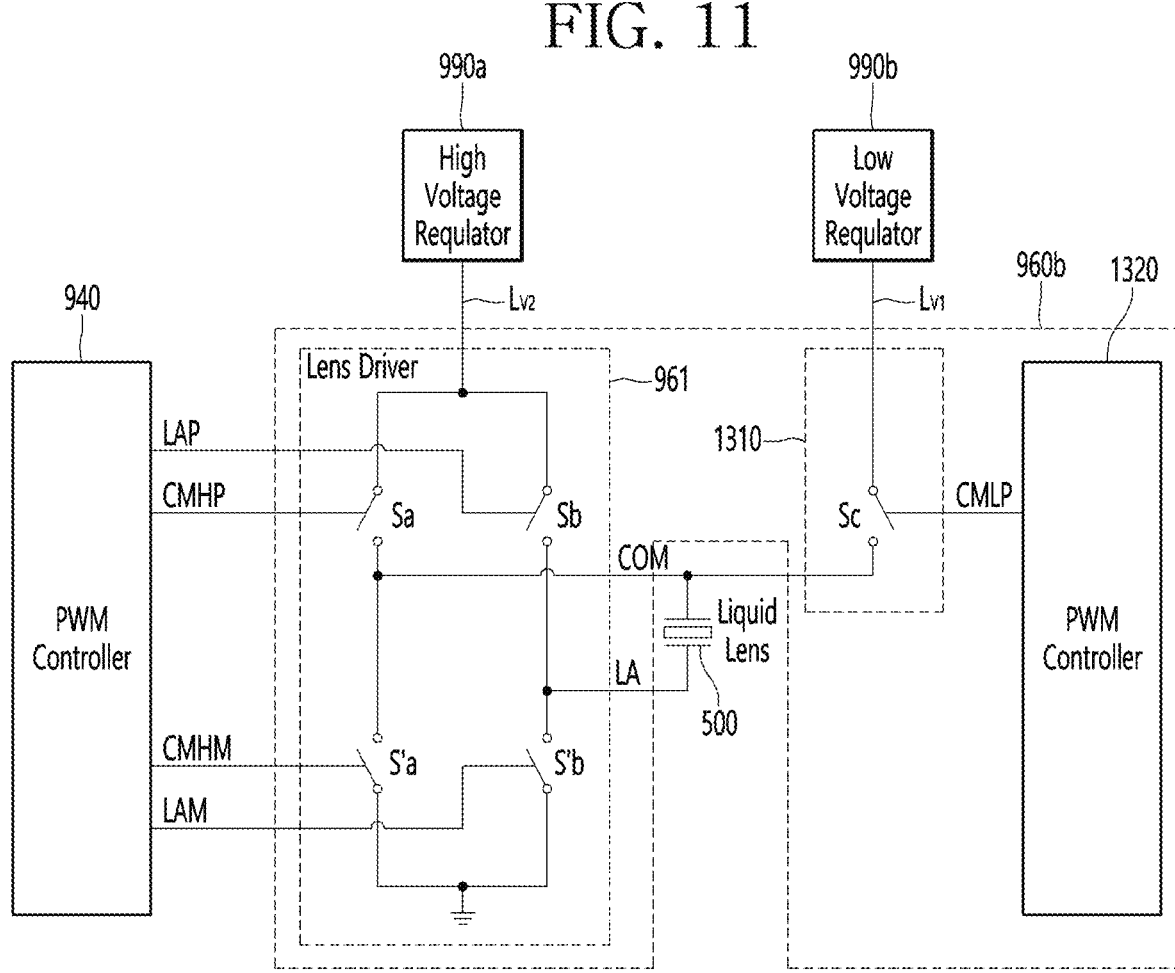
FIG. 11 is a modified example of the lens driver in FIG. 10.

FIG. 11 is a modified example of the lens driver in FIG. 10.

Referring to the drawing, a lens driver 960b of FIG. 11 may include a first driver 961 driving a lens and a second driver 1310 driving a sensor.

Meanwhile, the lens driver 960b may further include a pulse width variable controller 1320 that outputs a pulse width variable signal to the second driver 1310. Meanwhile, the pulse width variable controller 1320 may be included in the pulse width variable controller 940 of FIG. 8.

The first driver 961 may include first upper-arm and lower-arm switching elements Sa and S'a connected in series with each other, and second upper-arm and lower-arm switching elements Sb and S'b connected in series with each other.

At this time, the first upper-arm and lower-arm switching elements Sa and S'a and the second upper-arm and lower-arm switching elements Sb and S'b are connected in parallel with each other.

Electric power of a second level LV2 from a first power supply unit 990 may be supplied to the first upper-arm switching element Sa and the second upper-arm switching element Sb.

Meanwhile, the second driver 1310 in FIG. 10 had a half-bridge structure including the third upper-arm and lower-arm switching elements Sc and S'c connected in series with each other.

Alternatively, the second driver 1310 in FIG. 11 may include a single switching element, and accordingly, a sensing pulse may be provided to a common electrode COM by using a voltage supplied from a second power supply unit 990b in an ON period, and an output of the sensing pulse to the common electrode COM may be blocked in an OFF period.

To this end, the second driver 1310 may include only the third upper-arm switching element Sc, which may provide the sensing pulse to the common electrode COM.

Figure 12:
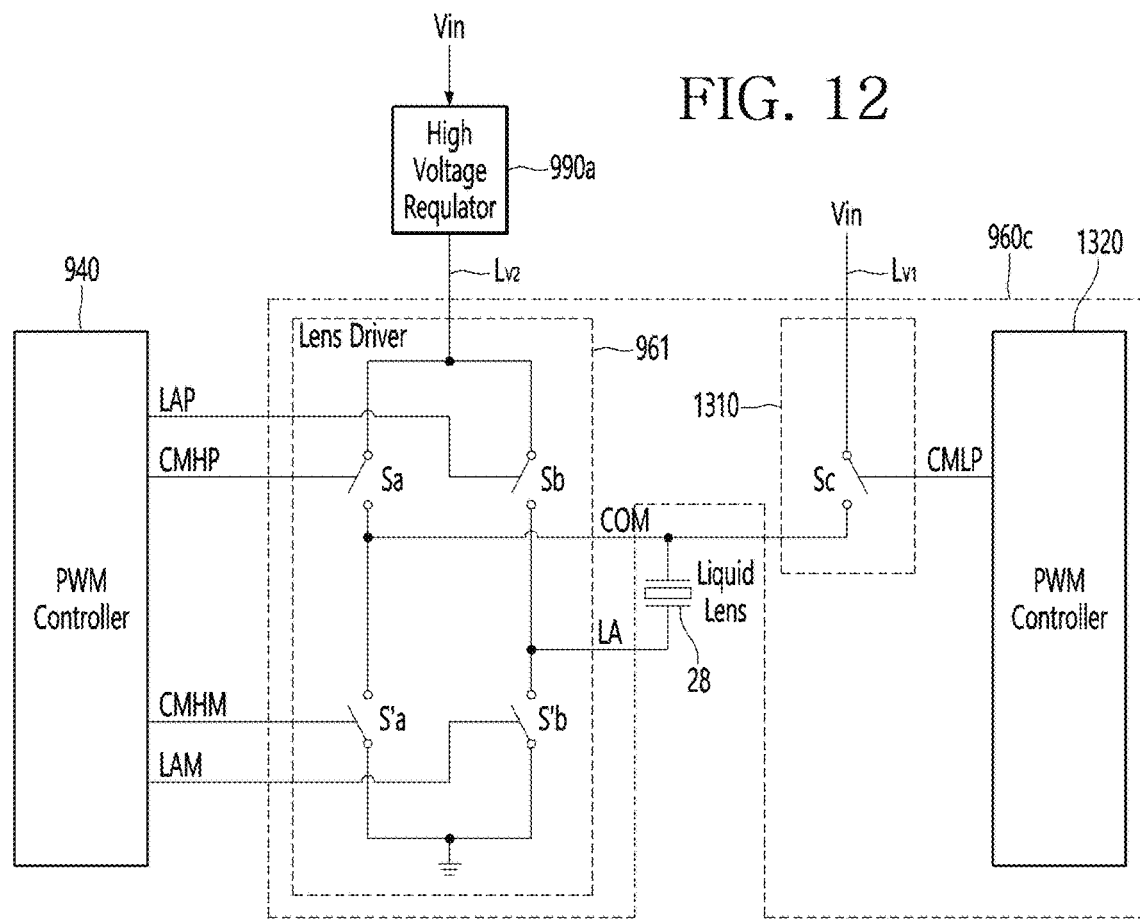
FIG. 12 is another modified example of the lens driver in FIG. 10.

FIG. 12 is another modified example of the lens driver in FIG. 10.

Referring to the drawing, a lens driver 960c of FIG. 12 may include a first driver 961 driving a lens and a second driver 1310 driving a sensor.

Meanwhile, the lens driver 960c may further include a pulse width variable controller 1320 that outputs a pulse width variable signal to the second driver 1310. Meanwhile, the pulse width variable controller 1320 may be included in the pulse width variable controller 940 of FIG. 8.

The first driver 961 may include first upper-arm and lower-arm switching elements Sa and S'a connected in series with each other, and second upper-arm and lower-arm switching elements Sb and S'b connected in series with each other.

At this time, the first upper-arm and lower-arm switching elements Sa and S'a and the second upper-arm and lower-arm switching elements Sb and S'b are connected in parallel with each other.

Electric power of a second level LV2 from a first power supply unit 990a may be supplied to the first upper-arm switching element Sa and the second upper-arm switching element Sb.

The second driver 1310 may include a single switching element, and accordingly, a sensing pulse may be provided to a common electrode COM by using a voltage supplied from a second power supply unit 990b in an ON period, and an output of the sensing pulse to the common electrode COM may be blocked in an OFF period.

To this end, the second driver 1310 may include only the third upper-arm switching element Sc, which may provide the sensing pulse to the common electrode COM.

Meanwhile, the power supply unit 990 of FIG. 12 may include only a first power supply unit 990a. That is, the second power supply unit 990b in FIGS. 10 and 11 may be omitted. Accordingly, the second driver 1310 may generate the sensing pulse by an input power Vin, and may provide the sensing pulse to the common electrode COM. At this time, the input power Vin may be a battery power. For example, the input power Vin may be 12V. Therefore, the first level LV1 of the sensing pulse may be 12V.

At this time, the input power Vin is also supplied to the first power supply unit 990a. That is, the first power supply unit 990a is a booster converter that boosts the input power Vin, and accordingly, it is possible to convert into a voltage of the second level LV2 by boosting a voltage strength of the input power Vin. In addition, the second driver 1310 may output the input power Vin as it is through a control of the switching element without a conversion process to supply the sensing pulse.

Hereinafter, an output timing of the sensing pulse and an operation of the sensor unit 962 thereto will be described.

Figure 13A:
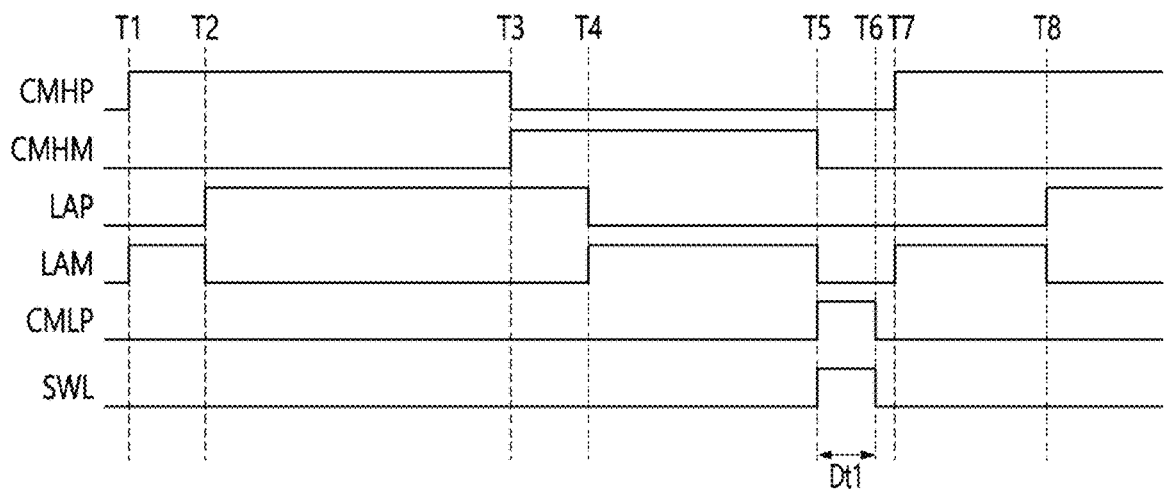
FIG. 13A is an example of a waveform diagram for describing an operation of the lens driver of FIG. 10.
Figure 13B:
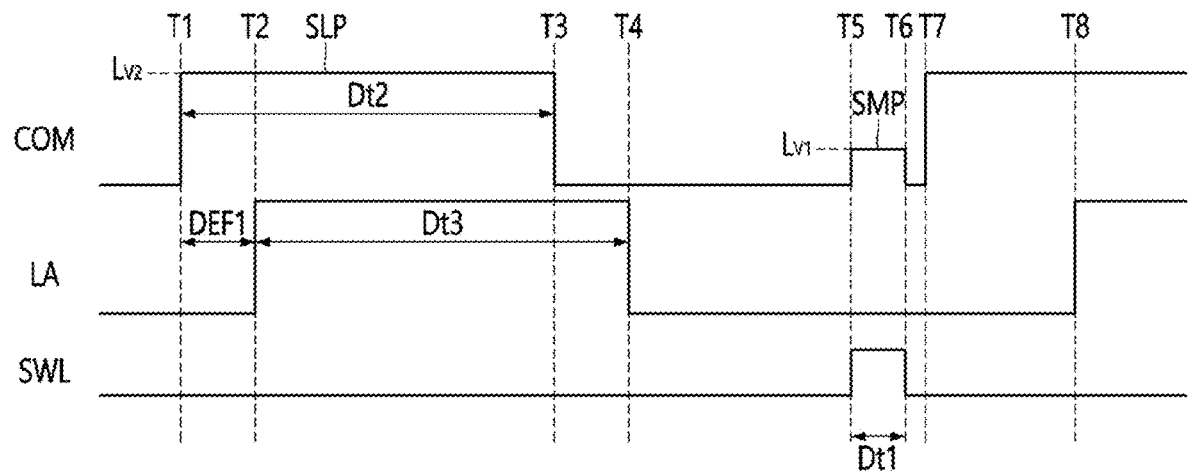
FIG. 13B is a view referred to for describing an operation of a sensor unit of FIG. 10.

FIG. 13A is an example of a waveform diagram for describing an operation of the lens driver 960a of FIG. 10, and FIG. 13B is a view referred to for describing an operation of the sensor unit of FIG. 10.

A first cycle of the waveform diagram from FIG. 13A refers to from a time T1 to a time T7. The time T7 may refer to an end time of the first cycle, and may also refer to a start time of a second cycle after the first cycle.

In the embodiment, the sensing pulse SMP is applied during a part of the period between the time T1 and the time T7 corresponding to the first cycle, and the capacitance of the charge accumulated by the applied sensing pulse SMP is sensed so as to trace the curvature of the interface 130.

First, a high-level control signal CMHP is applied to the Sa switching element at the time T1 which is a start time of the first cycle, and a high-level control signal LAP is applied to the Sb switching element at a time T2.

Meanwhile, a low-level control signal CMHP may be applied to the Sa switching element at a time T3, and at this time, a high-level control signal CMHM is applied to the S'a switching element.

In addition, a low-level control signal LAP may be applied to the Sb switching element at a time T4, and at this time, a high-level control signal LAM may be applied to the S'b switching element.

At this time, the Sb switching element and the S'b switching element may be turned on complementarily, but all of them are floated during a period in which the switching element SWL is turned on.

Meanwhile, in the embodiment, the second driver 1310 may be driven during a period in which low-level control signals CMHP and LAP are applied to both the Sa switching element and the Sb switching element. That is, when the low-level control signals CMHP and LAP are applied to the Sa switching element and the Sb switching element, a high voltage or a ground voltage corresponding to a driving voltage are not applied to the common electrode, and accordingly, the common electrode may be floated. In addition, the sensing pulse SMP may be applied in a state in which the common electrode is floated.

That is, in the embodiment, the sensing pulse SMP may be applied during a period between a time T4 and the time T7. That is, in the period between the time T4 and the time T7, both the common electrode COM and the first individual electrode LA are connected to the ground. At this time, no voltage is supplied to the common electrode COM and the first individual electrode LA. It refers that the switching state of the first driver 961 is not changed in the period between the time T4 and the time T7. Therefore, in the embodiment, in order to minimize noise according to the switching operation that occurs during sensing operation of the capacitance, the sensing pulse SMP may be applied in the period between the time T4 and the time T7 as described above, and the capacitance of the charge accumulated between the common electrode COM and the individual electrodes LA to LD by the sensing pulse SMP may be sensed.

In the embodiment, the sensing pulse SMP is supplied during a part of the period from the time T4 to the time T7.

To this end, in the embodiment, the second driver 1310 is driven at a time T5 so that the sensing pulse SMP is supplied.

At this time, the low-level control signal CMHM may be supplied to the S'a switching element at the time T5. In addition, a high-level control signal CMLP may be supplied to a Sc switching element at the time T5, and accordingly, the sensing pulse SMP having a first level LV1 may be supplied to the common electrode COM. Further, a low-level control signal CMLP may be supplied to the Sc switching element at the time T7, which is a predetermined time before the time T7 at which the first cycle ends.

Therefore, the sensing pulse SMP may be supplied to the common electrode COM during a period between the time T5 and a time T6.

Meanwhile, the switching element SWL of the sensor unit 962 may be turned on during the period between the time T5 and the time T6 at which the second driver 1310 operates. In addition, the charge accumulated by the sensing pulse SMP is provided to the sensor unit 962 by turning on the switching element SWL, and accordingly, the sensing operation of the capacitance may be performed.

At this time, a time at which the sensing operation of the capacitance by the sensor unit 962 is completed may be later than the time T6 at which the supply of the sensing pulse SMP is stopped. That is, the sensing operation by the sensor unit 962 may not be completed during a period in which the sensing pulse SMP is supplied. Therefore, the switching element SWL of the sensor unit 962 may be turned off at a time later than the time T6 and earlier than the time T7.

Accordingly, the sensor unit 962 may sense a capacitance corresponding to a size or change of an area of a boundary region Ac0 between the insulating layer on the individual electrode in the liquid lens 28 and the first liquid 122 during a period Dt1 between the time T5 and the time T6 at which the switching element SWL is turned on.

Specifically, a voltage SLP having a pulse width of Dt2 and a second level greater than the first level may be applied to the common electrode COM at the time T1.

Then, a voltage having a pulse width of Dt3 may be applied to the first individual electrode LA at the time T2.

At this time, the curvature formed at the interface 130 in the liquid lens 28 may be varied by a time difference DFF1 between the voltage applied to the common electrode COM and the voltage applied to the first individual electrode LA.

For example, as the time difference DFF1 of the voltage is smaller, the size of the area of the boundary region Ac0 between the electrode and the first liquid 122 may be increased, and accordingly, the capacitance may be increased, and consequently, the curvature may be decreased.

Meanwhile, as described above, the period in which the sensing pulse SMP is supplied may be set in a period in which a voltage is not applied to the common electrode COM and the individual electrodes LA to LD. At this time, voltages having different time differences may be applied to the plurality of individual electrodes LA to LD with reference to the voltage applied to the common electrode COM.

Accordingly, in the embodiment, a voltage having a largest time difference as compared with the voltage applied to the common electrode COM among the voltages applied to the individual electrodes LA to LD is set as a reference. For example, when the voltage applied to the first individual electrode LA among the plurality of individual electrodes LA to LD has the greatest time difference as compared with the voltage applied to the common electrode COM, a period between the time at which the voltage is not supplied to the first individual electrode LA and the time at which the first cycle ends is determined as the period in which the sensing pulse SMP is supplied.

In addition, the maximum value of the driving voltage that may be supplied to the liquid lens 28 is decreased during the period in which the sensing pulse SMP is supplied. That is, the driving voltage of the liquid lens 28 increases as the time difference between the voltage applied to the common electrode COM and the voltage applied to the individual electrodes LA to LD increases. At this time, the voltage is not supplied to the individual electrodes LA to LD during the period in which the sensing pulse SMP is supplied, and as a result, the voltage supplied to the individual electrodes LA to LD may not be delayed as compared with the voltage supplied to the common electrode COM during the period in which the sensing pulse SMP is supplied. Therefore, when the period in which the sensing pulse SMP is supplied is too large, the maximum value of the driving voltage that may be supplied to the liquid lens 28 is decreased, and when the period in which the sensing pulse SMP is supplied is too small, the sensing operation of the capacitance may not be performed normally. Accordingly, in the embodiment, an optimal supply period of the sensing pulse SMP that may solve the above problems is set.

For the reasons described above, the sensing pulse SMP is separated from the end time of the first cycle by a predetermined time, and is generated in a period as close as possible to the end time of the first cycle. At this time, the period in which the sensing pulse SMP is generated is set to be 1% or more as compared with the period of the first cycle. That is, when the period in which the sensing pulse SMP is generated is less than 1% of the entire period of the first cycle, a charge amount accumulated by the sensing pulse SMP is small, and thus accurate sensing of the capacitance may not be performed. In addition, that is, when the period in which the sensing pulse SMP is generated is less than 1% of the entire period of the first cycle, sufficient time required to sense the capacitance at the sensor unit 962 is not secured, and thus accurate sensing of the capacitance may not be performed. At this time, the period in which the sensing pulse SMP is generated is set to be 10% or less compared to the entire period of the first cycle. That is, when the period in which the sensing pulse SMP is generated exceeds 10% of the entire period of the first cycle, the maximum driving voltage that may be supplied to the liquid lens 28 decreases, and accordingly, the interface of the liquid lens 28 may not be formed to have a desired curvature. Preferably, the period in which the sensing pulse SMP is generated is set to have a range between 3% and 6% of the entire period of the first cycle. More preferably, the period in which the sensing pulse SMP is generated is set to be 5% of the entire period of the first cycle.

Hereinafter, an operation of the sensor unit 962 at the time at which the switching element SWL of the sensor unit 962 is turned on according to generation of the sensing pulse SMP will be described.

Figure 14:
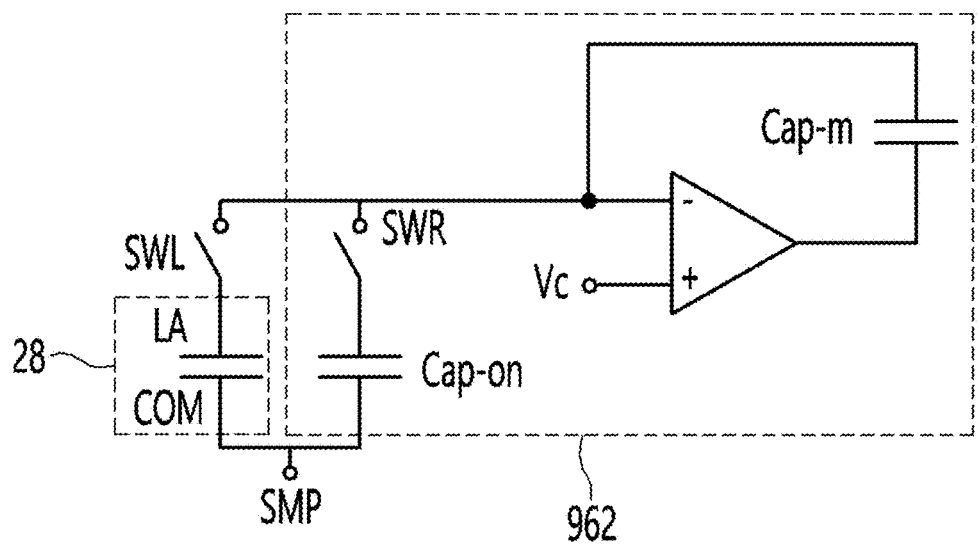
FIG. 14 shows an example of a circuit constituting a sensor unit.
Figure 15:
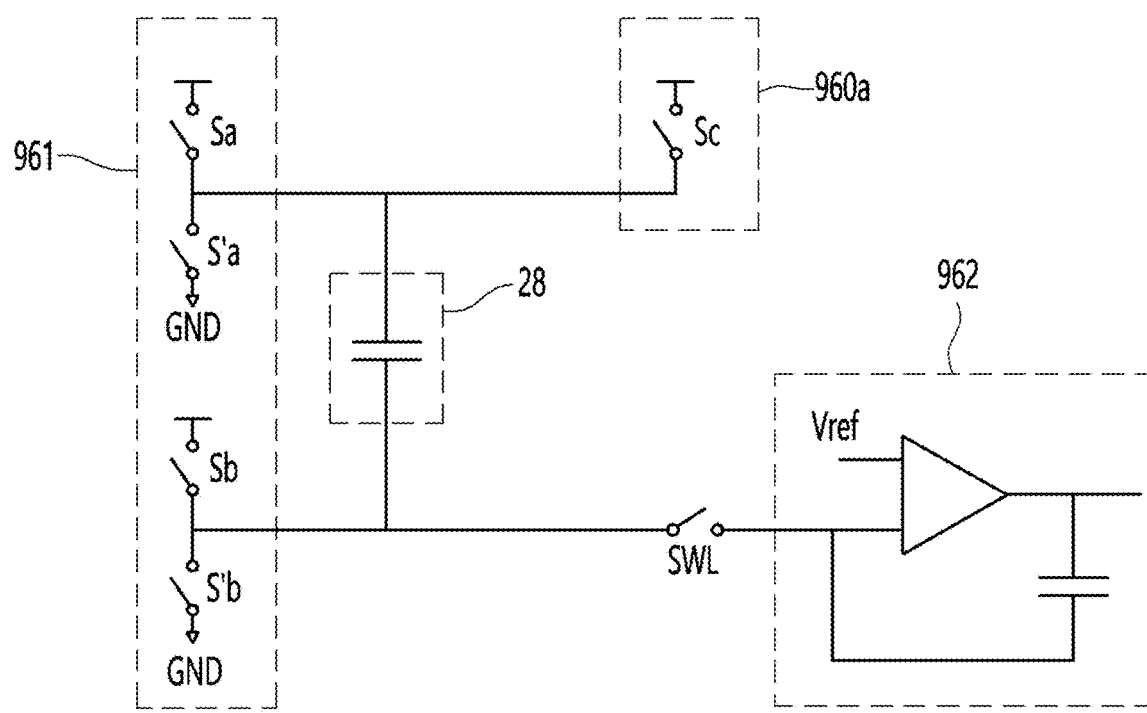
FIG. 15 shows one example of a lens driver.

FIG. 14 shows an example of a circuit constituting a sensor unit. FIG. 15 shows one example of a lens driver.

A sensor unit 962 illustrated in FIGS. 14 and 15 presents one example of a capacitance measuring circuit for measuring a capacitance, and may include various components according to an embodiment.

As shown in the drawings, when the sensing pulse SMP supplied from the second driver 1310 is applied to the common electrode COM disposed in the liquid lens, the sensor unit 962 connected to any one individual electrode LA among the plurality of individual electrodes LA to LD may measure a capacitance between the two electrodes LA and COM to recognize a state of the interface 130.

When the sensing pulse SMP is applied, and accordingly, the switching element SWL of the sensor unit 962 is turned on, an amount of a charge Q accumulated by the sensing pulse SMP may be equal to an amount of change in voltage multiplied by a capacitance C of the interface 130. At this time, when the switching element SWL of the sensor unit 962 is turned on, the accumulated charge Q may move to a reference capacitor Cap-m.

Thereafter, when the switching element SWL is turned off and a reference switching element SWR is turned on at a falling edge at which the supply of the sensing pulse SMP is stopped, a charge transferred to the reference capacitor Cap-m may move to an on-chip capacitor Cap-on. At this time, an amount of the charge Q moving to the on-chip capacitor Cap-on may be equal to an amount of change in voltage multiplied by a capacitance of the on-chip capacitor Cap-on.

A ratio of a number of couplings by the capacitance C of the interface 30 and a number of couplings by the on-chip capacitor Cap-on is adjusted so that the total amount of charges accumulated in the reference capacitor (Cap-m) is 0, and a ratio of the two capacitances is calculated from the ratio. Since the capacitance of the on-chip capacitor Cap-on is a known value, a capacitance of the capacitance C of the interface 130 may be measured.

The above-described configuration of the sensor unit 962 may be changed depending on an embodiment, and an operation and control method may differ according thereto. Here, the sensor unit 962 may be designed so as to measure a change of several pF to 200 pF.

A configuration of a circuit for measuring the capacitance may be variously implemented depending on an embodiment. For example, a circuit that calculates the capacitance based on a resonance frequency by using LC series resonance may be used at the individual electrodes LA to LD. However, when LC series resonance is used, it may take time to calculate the capacitance because it is necessary to apply a waveform for each frequency in order to search for the resonance frequency, and accordingly, the interface of the liquid lens may be affected. However, the sensor unit 962 described above is a capacitance measuring circuit using a switched capacitor. The switched capacitor may include two switches and one capacitor, and is a device that controls an average current flowing using them, and an average resistance may be inversely proportional to a capacitance of the capacitor and an operating frequency of the switch. When the capacitance of the liquid lens is measured using the switched capacitor, the capacitance may be measured at a very fast speed (e.g., several tens of ns).

In addition, as a circuit for measuring a capacitance, a switched capacitor circuit that may be configured with only capacitors and switches has a high degree of integration than an LC series resonance circuit that should include all resistors, inductors, and capacitors, and thus it may be easily applied to a mobile device and the like. One end of the switching element SWL may be electrically connected to the liquid lens and the lens driver 960.

Hereinafter, with reference to FIG. 15, for convenience of description, one LA of a plurality of individual electrodes will be described as an example.

As shown in the drawing, the second driver 1310 may include the lens driver 960 and the sensor unit 962, and may be connected to the liquid lens 28. The first driver 651 may selectively supply the voltage of the second level LV2 or a ground voltage GND to the individual electrode LA and the common electrode COM included in the liquid lens 28.

The sensor unit 962 may be connected to the individual electrode LA. When the sensor unit 962 turns on the switching element SWL described later in order to measure the capacitance of the liquid lens 28, the charge amount accumulated by the sensing pulse SMP may be transferred to the sensor unit 962. The sensor unit 962 may further include components such as a capacitor in addition to a comparator, and thus it is possible to measure the charge amount transferred from the liquid lens 28.

The switching element SWL may be disposed between the sensor unit 962 and the individual electrode LA.

At this time, the ground voltage GND is applied to the individual electrode LA before measuring the capacitance of the liquid lens 28. Thereafter, when the switching element SWL is turned on (ON), the S'b switching element of the first driver 961 is turned off (OFF) so that the individual electrode LA is in a floating state. The S'b switching element is a switch for applying the ground voltage GND to the individual electrode LA. Thereafter, when the switching element SWL is connected and the sensing pulse SMP is applied to the common electrode COM to be measured, the charge may be accumulated by the sensing pulse SMP, and the accumulated charge may be moved to the sensor unit 962.

Figure 16:
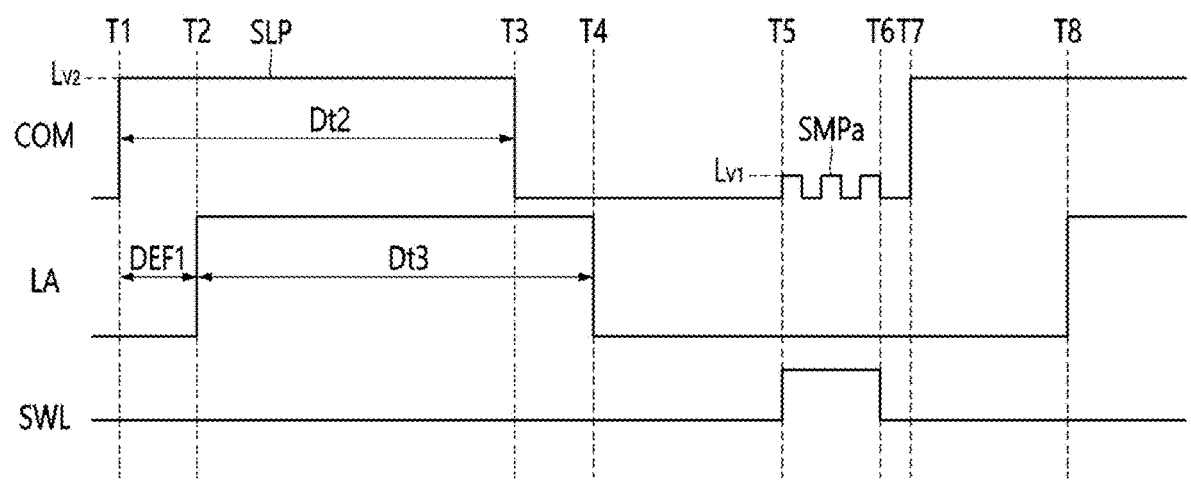
FIG. 16 is another view referred to for describing an operation of a sensor unit.

FIG. 16 is another view referred to for describing an operation of a sensor unit.

FIG. 16 is similar to the operation description of FIG. 13B, but in a period in which a sensing pulse SMP is supplied, there is a difference in that the control signal CMLP for the operation of the switching element Sc has a plurality of pulses instead of a single pulse. That is, in FIG. 13B, one sensing pulse SMP is generated within the corresponding period, but in FIG. 16, a plurality of sensing pulses SMPa may be applied within the corresponding period.

That is, as shown in FIG. 16, the plurality of sensing pulses SMPa are applied to the common electrode COM during a period from a time T5 to a time T6.

Accordingly, the sensor unit 962 may sense a capacitance corresponding to a size or change of the area of the boundary region Ac0 between the insulating layer on the individual electrode in the liquid lens 28 and the first liquid 122 during a period Dt1 between the time T5 and the time T6.

Specifically, during the period from the time T5 and the time T6, a plurality of pulse signals are applied to the common electrode COM, and accordingly a charge may be accumulated between the common electrode COM and the individual electrode LA. In addition, the accumulated charges may be moved to the sensor unit 962 by turning on the switching element SWL. Further, the sensor unit 962 may measure a capacitance corresponding to the moving charge to sense the curvature of the interface 130 corresponding thereto.

Figure 17:
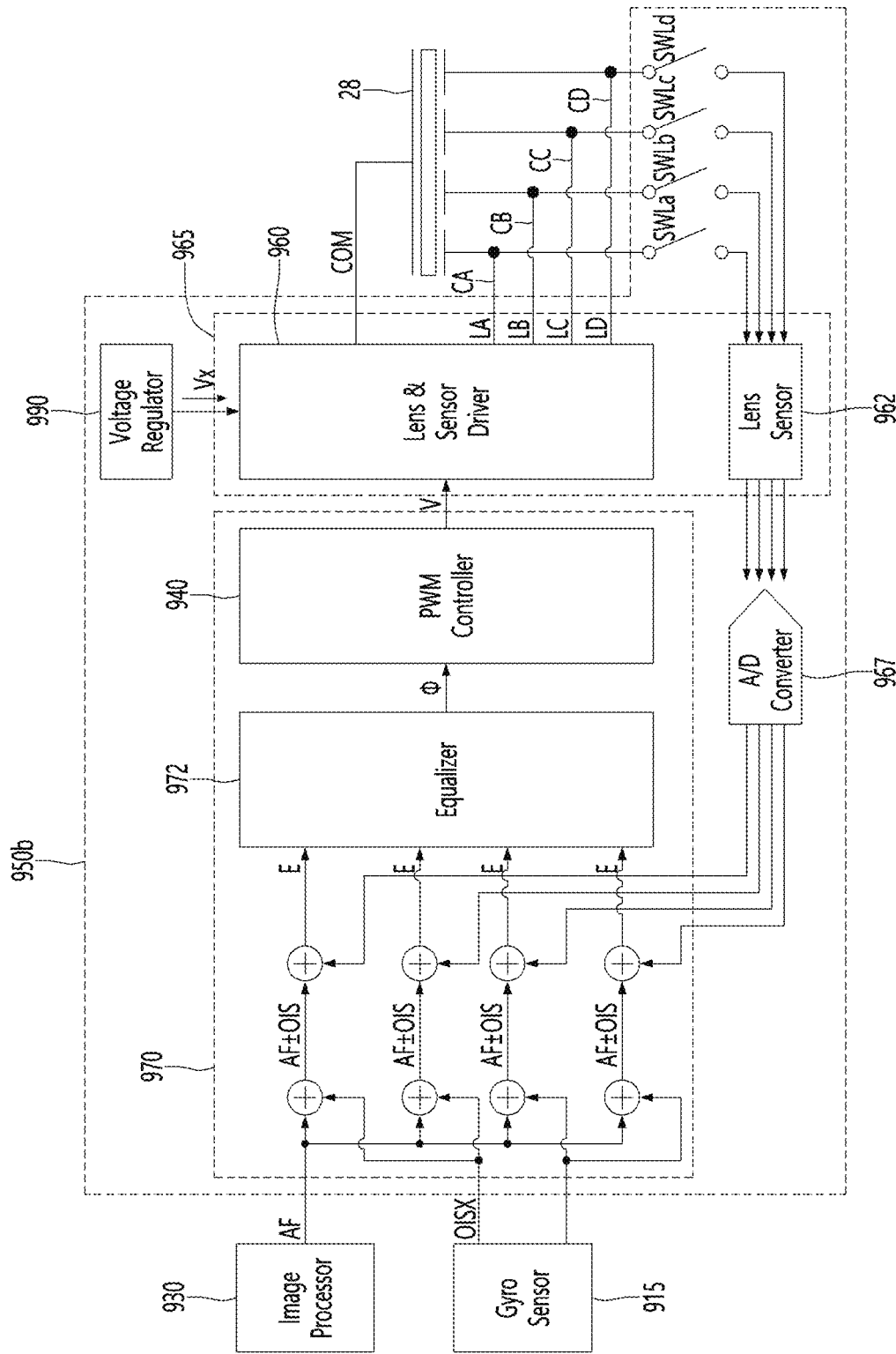
FIG. 17 is an example of an internal block diagram of a camera module according to another embodiment of the present invention.

FIG. 17 is one example of an internal block diagram of a camera module according to another embodiment of the present invention.

Referring to the drawing, a lens curvature variation apparatus of FIG. 17 is similar to the camera module and lens curvature variation apparatus of FIG. 8, but there is a difference in that a sensor unit 962 senses capacitances of ends of a plurality of interfaces 130 corresponding to a plurality of individual electrodes LA to LD (134a to 134d), respectively.

To this end, a sensing pulse SMP is applied to the common electrode COM 132, and based on this, a capacitance accumulated by the applied sensing pulse SMP may be sensed at the plurality of individual electrodes LA to LD (134a to 134d).

Meanwhile, for an operation of the sensor unit 820, it is preferable that a plurality of switching elements SWLa to SWLd are included between conductive lines CA to CD that are connected between the plurality of individual electrodes LA to LD (134a to 134d) and the liquid lens 28 and the sensor unit 962.

The sensor unit 962 may sense the capacitance of the boundary region between the insulating layer on the plurality of individual electrodes LA to LD (134a to 134d) and the first liquid 122 during a period in which the plurality of switching elements SWLa to SWLd are turned on, based on the sensing pulse SMP applied to the common electrode COM, and may transmit it to the controller 970.

Accordingly, it is possible to sense the capacitance of a plurality of boundary regions of the liquid lens 28.

Further, in the camera module of FIG. 17, an asymmetric curvature may be formed by varying the voltage applied to the plurality of individual electrodes LA to LD (134a to 134d) in response to camera shake correction, and thus the camera shake correction may be performed quickly and accurately.

Meanwhile, the lens curvature variation apparatus 900 described in FIGS. 8 to 17 may be adopted in various electronic devices such as mobile terminals.

Figure 18:
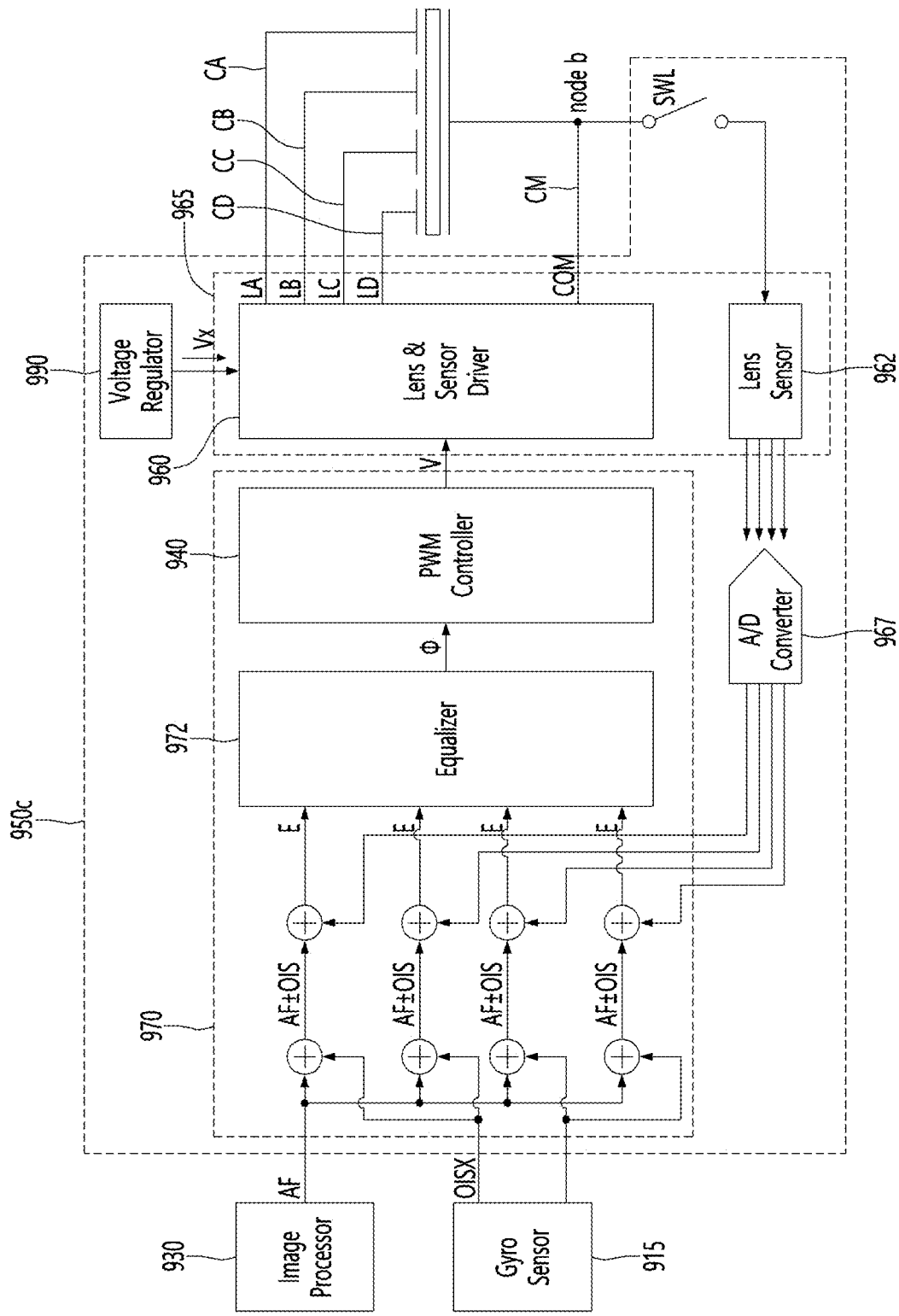
FIG. 18 is an example of an internal block diagram of a camera module according to still another embodiment of the present invention.

FIG. 18 is one example of an internal block diagram of a camera module according to still another embodiment of the present invention.

Referring to the drawing, a camera module and a lens curvature variation apparatus of FIG. 18 is similar to the camera module and lens curvature variation apparatus of FIG. 8, but there is a difference in that a sensor unit 962 senses capacitances of ends of the interfaces 130 corresponding to a plurality of electrodes LA to LD (134a to 134d). That is, FIG. 18 shows that the sensor unit 962 is connected to the common electrode COM instead of being connected to the individual electrodes LA to LD as in the previous embodiment.

To this end, a sensing pulse SMP is applied to the plurality of individual electrodes LA to LD (134a to 134d).

Meanwhile, for an operation of the sensor unit 820, it is preferable that a switching element SWL is included between a conductive line CM and the sensor unit 962 that are connected between the common electrode COM and the liquid lens 28 instead of the conductive lines CA to CD that are connected between the plurality of individual electrodes LA to LD (134a to 134d) and the liquid lens 28.

The sensor unit 962 may sense the capacitance of the boundary region between the insulating layer on the electrode and the first liquid 122 during a period in which the switching element SWL is turned on, based on the sensing pulse SMP applied to the individual electrodes LA to LD, and may transmit it to the controller 970.

Accordingly, it is possible to sense the capacitance of a boundary region of the liquid lens 28.

To this end, the second driver 1310 may be connected to the plurality of individual electrodes LA to LD (134a to 134d), respectively, and may supply the sensing pulse to the plurality of individual electrodes LA to LD (134a to 134d), respectively.

At this time, the sensing pulses respectively supplied to the plurality of individual electrodes LA to LD (134a to 134d) may be supplied so as not to be overlapped with each other within the same cycle. That is, when the sensing pulses supplied to the plurality of individual electrodes LA to LD (134a to 134d) are supplied at the same time, it is difficult to measure accurately the capacitance corresponding to each individual electrode at the sensor unit, and accordingly, the sensing pulses supplied to the plurality of individual electrodes LA to LD (134a to 134d) may be supplied so as not to be overlapped with each other within the same cycle.

Alternatively, the plurality of individual electrodes LA to LD (134a to 134d) may be sequentially supplied with sensing pulses within different cycles. For example, in a first cycle, the sensing pulse may be supplied to a first individual electrode to sense the capacitance formed between the common electrode and the first individual electrode. In addition, in a second cycle after the first cycle, the sensing pulse may be supplied to a second individual electrode to sense the capacitance formed between the common electrode and the second individual electrode. Further, in a third cycle after the second cycle, the sensing pulse may be supplied to a third individual electrode to sense the capacitance formed between the common electrode and the third individual electrode. Furthermore, in a fourth cycle after the third cycle, the sensing pulse may be supplied to a fourth individual electrode to detect the capacitance formed between the common electrode and the fourth individual electrode.

Meanwhile, alternatively, the sensing pulses respectively supplied to the plurality of individual electrodes LA to LD (134a to 134d) may overlap at least partially within the same cycle. Accordingly, the sensor unit may sense the entire capacitance formed between the plurality of individual electrodes LA to LD (134a to 134d) and the common electrode COM.

Figure 19:
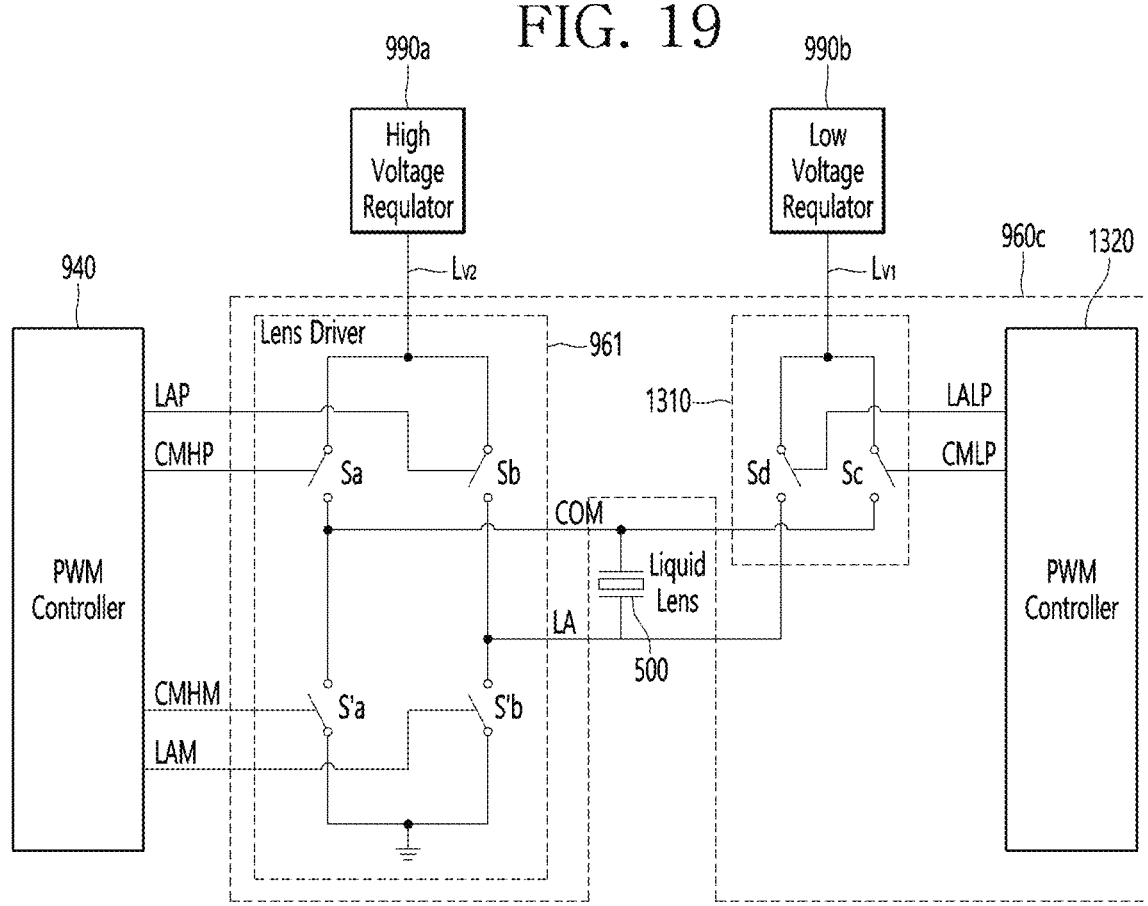
FIG. 19 is a diagram showing a lens driver according to another embodiment of the present invention.

FIG. 19 is a diagram showing a lens driver according to another embodiment of the present invention.

Referring to the drawings, the lens driver of FIG. 19 is similar to the lens driver of FIG. 12, but there is a difference in that a second driver 1310 includes a Sc switching element connected to the common electrode COM and a Sd switching element connected to the individual electrodes LA to LD. That is, FIG. 19 shows that the second driver 1310 not only generates a pulse of a first level only for the common electrode COM, but also generates a pulse for the individual electrodes LA to LD so as to correspond to the pulse supplied to the common electrode COM.

Referring to the drawing, a lens driver 960d of FIG. 19 may include a first driver 961 driving a lens and a second driver 1310 driving a sensor.

Meanwhile, the lens driver 960d may further include a pulse width variable controller 1320 that outputs a pulse width variable signal to the second driver 1310. Meanwhile, the pulse width variable controller 1320 may be included in the pulse width variable controller 940 of FIG. 8.

The first driver 961 may include first upper-arm and lower-arm switching elements Sa and S'a connected in series with each other, and second upper-arm and lower-arm switching elements Sb and S'b connected in series with each other.

At this time, the first upper-arm and lower-arm switching elements Sa and S'a and the second upper-arm and lower-arm switching elements Sb and S'b are connected in parallel with each other.

Electric power of a second level LV2 from the first power supply unit 990 may be supplied to the first upper-arm switching element Sa and the second upper-arm switching element Sb.

The second driver 1310 may include a third upper-arm switching element Sc and a fourth upper-arm switching element Sd for generating pulses on the common electrode COM and the individual electrodes LA to LD, respectively.

The third upper-arm switching element Sc supplies a sensing pulse SMP for sensing the curvature of the interface 130 to the common electrode COM.

The fourth upper-arm switching element Sd inhibits the curvature of the liquid lens 28 from changing due to the sensing pulse SMP supplied to the individual electrodes LA to LD.

That is, in the previous embodiment, the sensing pulse SMP was supplied only to any one of the common electrode COM and the individual electrodes LA to LD.

At this time, the liquid lens 28 should be controlled based on a voltage of an AC component, but applying the pulse to only one electrode as described above may be the same as applying a voltage of a DC component to the liquid lens 28. Here, the first level of the pulse belongs to a range of 3% to 20% as compared with the second level corresponding to the driving voltage of the liquid lens, and thus it does not significantly affect the curvature of the liquid lens 28. However, when the pulse is periodically supplied continuously, the common electrode COM to which the sensing pulse SMP is applied is driven by offsetting the voltage corresponding to the first level of the sensing pulse SMP instead of 0V, and thus it difficult to form an accurate target curvature of the lens. Therefore, in the embodiment, an offset pulse SMP' having the same magnitude as the sensing pulse SMP is supplied to not only the common electrode COM but also the individual electrodes LA to LD to set the offset to zero. In other words, in the embodiment, the sensing pulse SMP is supplied to the common electrode COM, and the offset pulse SMP' having the same level as the sensing pulse SMP is provided to the individual electrodes LA to LD so as to remove the voltage of the DC component. In other words, in the embodiment, the sensing pulse SMP is supplied to the common electrode COM, and the offset pulse SMP' having the same level as the sensing pulse SMP is provided to the individual electrodes LA to LD, and accordingly, it enables the sensing pulse SMP to be offset. At this time, the operation of the sensor unit 962 may be the same as that of the previous embodiment.

Figure 20:
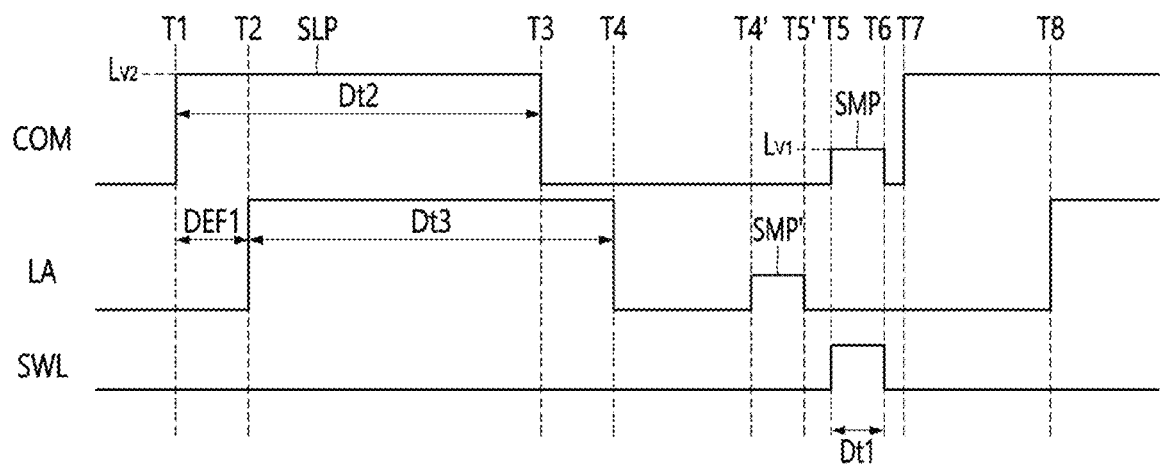
FIG. 20 is a view referred to for describing an operation of the sensor unit of FIG. 19.

FIG. 20 is a view referred to for describing an operation of the sensor unit of FIG. 19.

A first cycle of a waveform diagram from FIG. 20 refers to from a time T1 to a time T7. The time T7 may refer to an end time of the first cycle, and may also refer to a start time of a second cycle after the first cycle.

In an embodiment, the sensing pulse SMP is applied to the common electrode COM during a part of a period between the time T1 and the time T7 corresponding to the first cycle, and the capacitance of the charge accumulated by the applied sensing pulse SMP is sensed so as to trace the curvature of the interface 130. At this time, the offset pulse SMP' corresponding to the sensing pulse SMP is also provided to the individual electrodes LA to LD so as to offset the sensing pulse SMP.

In the embodiment, the second driver 1310 may be driven during a period in which low-level control signals CMHP and LAP are applied to both the Sa switching element and the Sb switching element.

That is, in the embodiment, the sensing pulse SMP and the offset pulse SMP' may be applied during a period between a time T4 and the time T7. At this time, it is shown in the drawing that the offset pulse SMP' is supplied before the sensing pulse SMP, but it is merely one example, and the sensing pulse SMP may be supplied before the offset pulse SMP' is supplied.

That is, in the period between the time T4 and the time T7, both the common electrode COM and the first individual electrode LA are connected to the ground. At this time, no voltage is supplied to the common electrode COM and the first individual electrode LA. It refers that the switching state of the first driver 961 is not changed in the period between the time T4 and the time T7. Therefore, in the embodiment, in order to minimize noise according to the switching operation that occurs during sensing operation of the capacitance, the sensing pulse SMP may be applied in the period between the time T4 and the time T7 as described above, and the capacitance of the charge accumulated between the common electrode COM and the individual electrodes LA to LD by the sensing pulse SMP may be sensed.

In the embodiment, the sensing pulse SMP and the offset pulse SMP' are supplied during a part of the period from the time T4 to the time T7.

To this end, in the embodiment, the fourth upper-arm switching element Sd of the second driver 1310 is turned on at a time T4' so that the sensing pulse SMP is supplied to the individual electrodes LA to LD. At this time, the low-level control signal CMHM may be supplied to the S'a switching element at the time T4'. In addition, a high-level control signal LALP may be supplied to the Sd switching element at the time T4', and accordingly, the offset pulse SMP' having a first level LV1 may be supplied to the individual electrodes LA to LD. The offset pulse SMP' may be supplied from the time T4' to a time T5'. Thereafter, the supply of the offset pulse SMP' may be stopped, and the sensing pulse SMP may be supplied to the common electrode COM.

To this end, the fourth upper-arm switching element Sd is turned off before turning on the third upper-arm switching element Sc, and when the supply of the offset pulse SMP' is stopped by turning off the fourth upper-arm switching element Sd, the third upper-arm switching element Sc is turned on so that the sensing pulse SMP is supplied.

In addition, a low-level control signal CMLP may be supplied to the third upper-arm switching element Sc at the time T7, which is a predetermined time before T7 at which the first cycle ends.

Therefore, the sensing pulse SMP may be supplied to the common electrode COM during a period between a time T5 and a time T6.

Meanwhile, the switching element SWL of the sensor unit 962 may be turned on during the period between the time T5 and the time T6 at which the second driver 1310 operates. In addition, the charge accumulated by the sensing pulse SMP is provided to the sensor unit 962 by turning on the switching element SWL, and accordingly, the sensing operation of the capacitance may be performed.

At this time, in order to accurately sense the capacitance by the sensing pulse SMP, the period in which the sensing pulse SMP is supplied and the period in which the offset pulse SMP' is supplied are not overlapped with each other.

Figure 21:
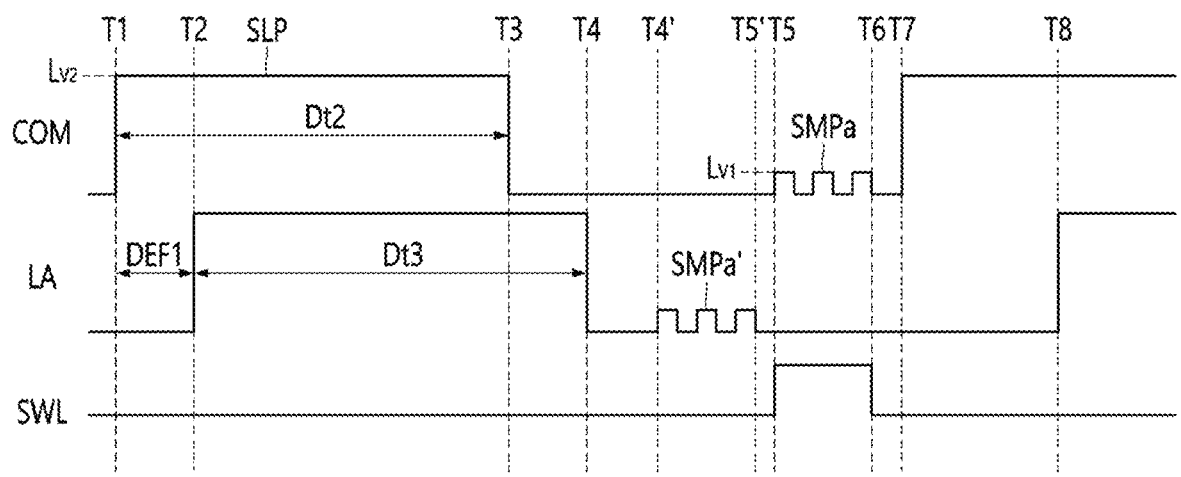
FIG. 21 is a view referred to for describing an operation of a sensor unit.

FIG. 21 is still another view referred to for describing an operation of a sensor unit.

FIG. 21 is similar to the operation description of FIG. 20, but in a period in which a sensing pulse SMPa and an offset pulse SMPa' are supplied, there is a difference in that the control signals CMLP and LALP for the operation of the third upper-arm switching element Sc and the fourth upper-arm switching element Sd have a plurality of pulses instead of a single pulse. That is, in FIG. 20, one sensing pulse SMP and one offset pulse SMP' are generated within the corresponding period, but in FIG. 21, a plurality of sensing pulses SMPa and a plurality of offset pulses SMPa' may be applied within the corresponding period.

That is, as shown in FIG. 21, the plurality of offset pulses SMPa' are applied to the individual electrodes LA to LD during a period from a time T4' to a time T5'. In addition, the plurality of sensing pulses SMPa are applied to the common electrode COM during a period from a time T5 to a time T6 that are not overlapped with the time T5'.

Accordingly, the sensor unit 962 may sense a capacitance corresponding to a size or change of the area of the boundary region Ac0 between the insulating layer on the individual electrode in the liquid lens 28 and the first liquid 122 during a period Dt1 between the time T5 and the time T6.

Specifically, during the period from the time T5 and the time T6, a plurality of pulse signals are applied to the common electrode COM, and accordingly a charge may be accumulated between the common electrode COM and the individual electrode LA. In addition, the accumulated charges may be moved to the sensor unit 962 by turning on the switching element SWL. Further, the sensor unit 962 may measure a capacitance corresponding to the moving charge to sense the curvature of the interface 130 corresponding thereto.

In addition, the plurality of sensing pulses SMPa are offset by the plurality of offset pulses SMPa' supplied to the individual electrodes LA to LD so as to correspond thereto, and accordingly, the interface of the liquid lens 28 is not affected.

Figure 22:
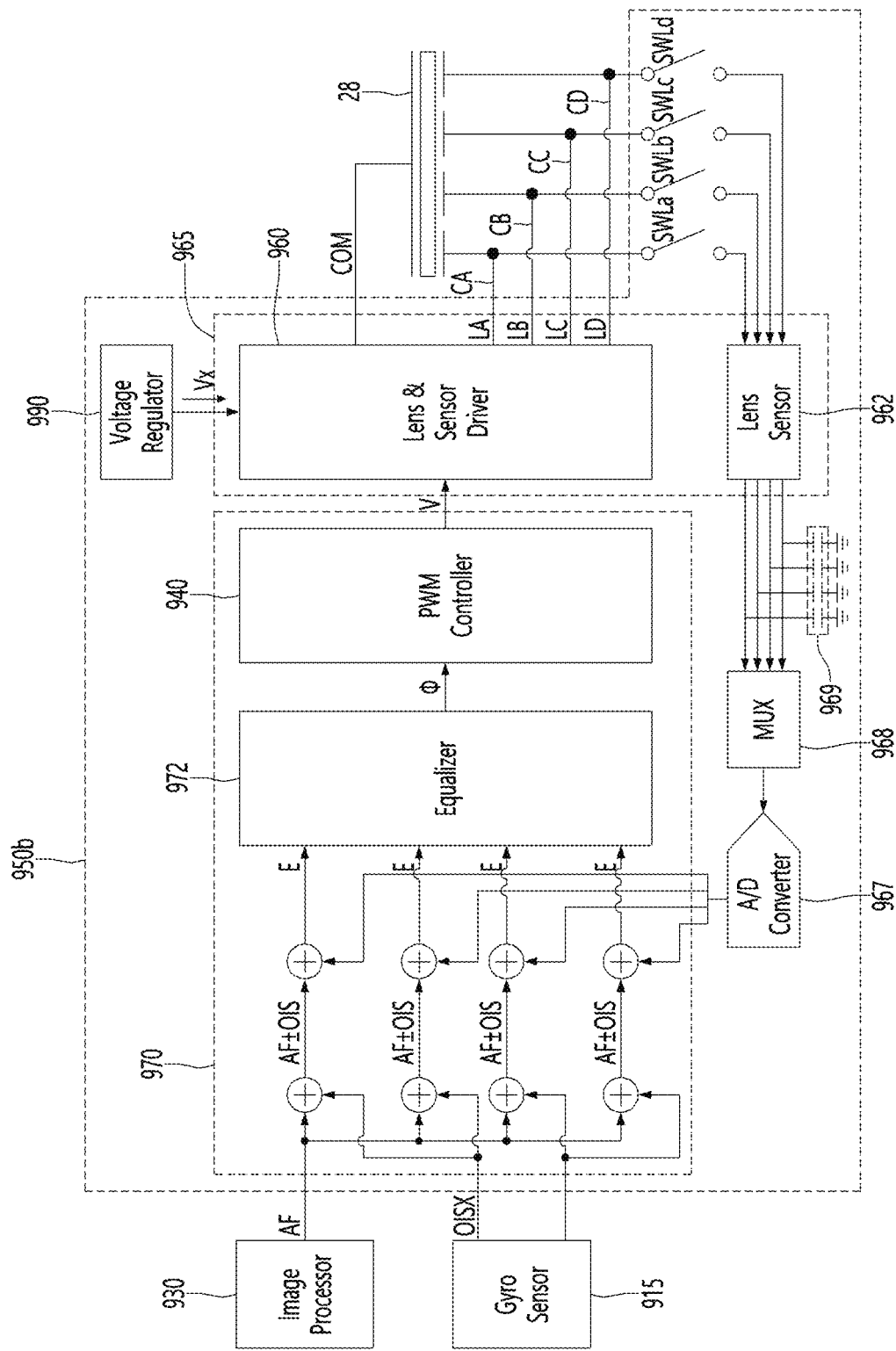
FIG. 22 is one example of an internal block diagram of a camera module according to still another embodiment of the present invention.

FIG. 22 is one example of an internal block diagram of a camera module according to still another embodiment of the present invention.

Referring to the drawing, a lens curvature variation apparatus of FIG. 22 is similar to the camera module and lens curvature variation apparatus of FIG. 8, but there is a difference in that a sensor unit 962 senses capacitances of ends of a plurality of interfaces 130 corresponding to a plurality of individual electrodes LA to LD (134a to 134d), respectively.

To this end, a sensing pulse SMP is applied to the common electrode COM 132, and based on this, a capacitance accumulated by the applied sensing pulse SMP may be sensed at the plurality of individual electrodes LA to LD (134a to 134d).

Meanwhile, for an operation of the sensor unit 820, it is preferable that a plurality of switching elements SWLa to SWLd are included between conductive lines CA to CD that are connected between the plurality of individual electrodes LA to LD (134a to 134d) and the liquid lens 28 and the sensor unit 962.

The sensor unit 962 may sense the capacitance of the boundary region between the insulating layer on the plurality of individual electrodes LA to LD (134a to 134d) and the first liquid 122 during a period in which the plurality of switching elements SWLa to SWLd are turned on, based on the sensing pulse SMP applied to the common electrode COM, and may transmit it to the controller 970.

Accordingly, it is possible to sense the capacitance of a plurality of boundary regions of the liquid lens 28.

Meanwhile, the sensor unit 962 is connected to the plurality of switching elements SWLa to SWLd, respectively, and accordingly, is configured in plural so as to sense the capacitance corresponding to each of the plurality of individual electrodes LA to LD.

Further, the AD converter 967 in FIG. 17 is configured in plural in order to convert analog signals related to capacitances sensed by the plurality of sensor units 962 into digital signals. In other words, in FIG. 17, the plurality of AD converters 967 and the plurality of sensor units 962 are connected on a one-to-one basis, and accordingly, an analog signal related to the capacitance corresponding to each of the individual electrodes LA to LD was sensed and converted into a digital signal.

Meanwhile, recently, a number of the individual electrodes LA to LD tends to increase to 4 or more, and it may be implemented to 8 or more. In such a case, a number of the lens driver 960 and the AD converter 967 are increased so as to correspond to the number of individual electrodes LA to LD, and accordingly, there is a problem that the product cost increases as the entire volume of the camera module increases.

Accordingly, in the embodiment, the analog signal related to the capacitance sensed at the plurality of sensor units 962 may be converted into the digital signal by using one AD converter 967.

To this end, the camera module may include a multiplexer (MUX) 968 and a capacitance holding unit 969.

An input terminal of the MUX 968 is connected to each of the plurality of sensor units 962. In addition, an output terminal of the MUX 968 is connected to one AD converter 967. In addition, the MUX 968 supplies one of the analog signals provided via the plurality of sensor units 962 according to a control signal of the controller 970 to the AD converter 967.

For example, the sensor unit 962 may include a first sensor unit connected to the first individual electrode, a second sensor unit connected to the second individual electrode, a third sensor unit connected to the third individual electrode, and a fourth sensor unit connected to the fourth individual electrode. In addition, the MUX 968 may select an analog signal sensed at the first sensor unit according to a control signal of the controller 970, and may transmit it to the AD converter 967. After the analog signal of the first sensor unit is transmitted to the AD converter 967, the MUX 968 may select an analog signal sensed at the second sensor unit according to the control signal of the controller 970, and may transmit it to the AD converter 967. In addition, after the analog signal of the second sensor unit is transmitted to the AD converter 967, the MUX 968 may select an analog signal sensed at the third sensor unit according to the control signal of the controller 970, and may transmit it to the AD converter 967. After the analog signal of the third sensor unit is transmitted to the AD converter 967, the MUX 968 may select an analog signal sensed at the fourth sensor unit according to the control signal of the controller 970, and may transmit it to the AD converter 967. That is, the MUX 968 may sequentially select the analog signals sensed by the first to fourth sensor units, and may sequentially provide the analog signals to the AD converter 967. Accordingly, the analog signal sensed at each of the plurality of sensor units 962 may be processed by only one AD converter 967, thereby reducing the product cost and reducing the product volume.

Meanwhile, when the MUX 968 selects and outputs any one of the plurality of analog signals sensed by the plurality of sensor units 962, it is possible to wait until digital conversion of the output analog signals is completed. At this time, an analog signal not selected by the MUX 968 may change during a waiting time. For example, the sensed signal of the sensor unit 962 not selected by the MUX 968 may be reduced. Accordingly, the capacitance holding unit 969 is disposed between the MUX 968 and the plurality of sensor units 962. The capacitance holding unit 969 may store analog signals sensed by the plurality of sensor units 962, and may supply the analog signals to the MUX 968.

Accordingly, it is possible to accurately sense the capacitance sensed at the plurality of sensor units 962 by using only one AD converter 967.

Figure 23:
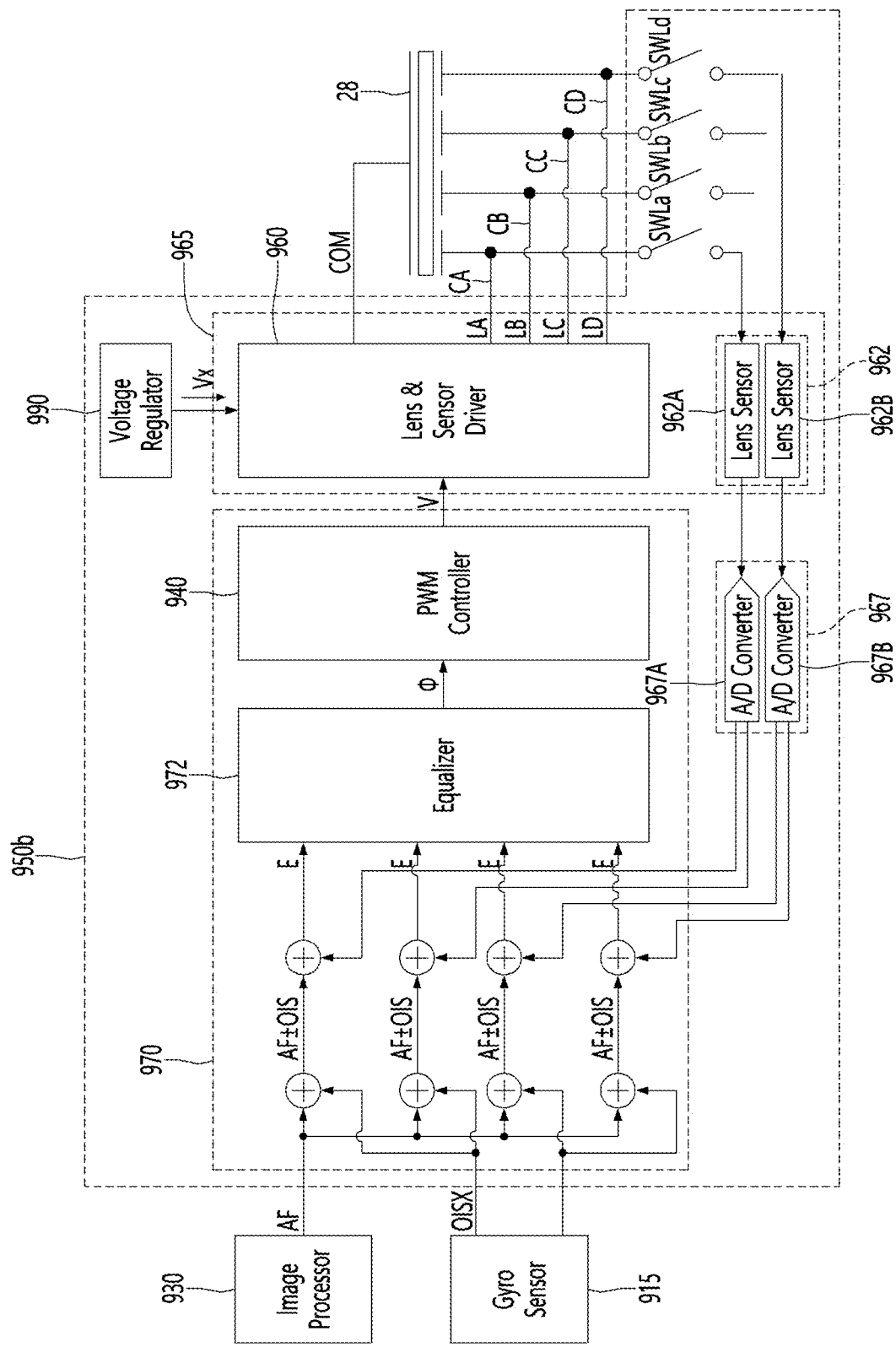
FIG. 23 is one example of an internal block diagram of a camera module according to still another embodiment of the present invention.

FIG. 23 is one example of an internal block diagram of a camera module according to still another embodiment of the present invention.

Referring to the drawings, a lens curvature variable device of FIG. 23 is similar to the camera module and the lens curvature variable device of FIG. 8, but there is a difference in that the sensor unit 962 senses capacitances of ends of the plurality of interface 130 corresponding to the plurality of electrodes LA to LD 134a to 134d, respectively.

To this end, the sensing pulse SMP is applied to the common electrode COM 132, and based on this, the capacitance accumulated in the plurality of electrodes LA to LD 134a to 134d may be sensed by the applied sensing pulse SMP.

On the other hand, conductive lines CA to CD connected between the plurality of individual electrodes LA to LD 134a to 134d and the liquid lens 28 and a plurality of switching elements SWLa to SWLd between the sensor unit 962 is preferably provided for the operation of the sensor unit 9620.

The sensor unit 962 may detect a capacitance of a boundary region between the insulating layer on the plurality of individual electrodes LA to LD 134a to 134d and the first liquid 122 based on the sensing pulse SMP applied to the common electrode COM during the period in which the plurality of switching elements SWLa to SWLd are turned on, and transmit it to the controller 970.

Accordingly, it is possible to sense the capacitance of the plurality of boundary regions of the liquid lens 28.

On the other hand, the sensor unit 962 is connected to any one of the plurality of switching elements SWLa to SWLd, and allows the capacitance to be sensed in response to the individual electrodes LA to LD corresponding to the connected switching elements SWLa to SWLd.

That is, the sensor unit 962 in FIG. 17 is respectively connected to the plurality of switching elements SWLa to SWLd, and thereby, a plurality of sensor units are provided to sense capacitance corresponding to each of the plurality of individual electrodes LA to LD. For example, when the plurality of individual electrodes LA to LD is four, the sensor unit 962 is also constituted by four.

Alternatively, in FIG. 23, the number of the sensor units 962 is smaller than the number of the plurality of individual electrodes LA to LD. For example, the number of the sensor units 962 may be ½ of the number of the individual electrodes LA to LD.

This is possible because the respective capacitances of the plurality of individual electrodes LA to LD have a symmetric relationship based on a vibration angle calculated based on the gyro data.

In other words, during OIS correction, the effective voltage Vrms applied to the plurality of individual electrodes LA to LD and the ADC value corresponding to the capacitance of the plurality of individual electrodes LA to LD has a symmetric relationship based on the vibration axis. Hereinafter, the symmetric relationship will be described in detail.

Figure 24:
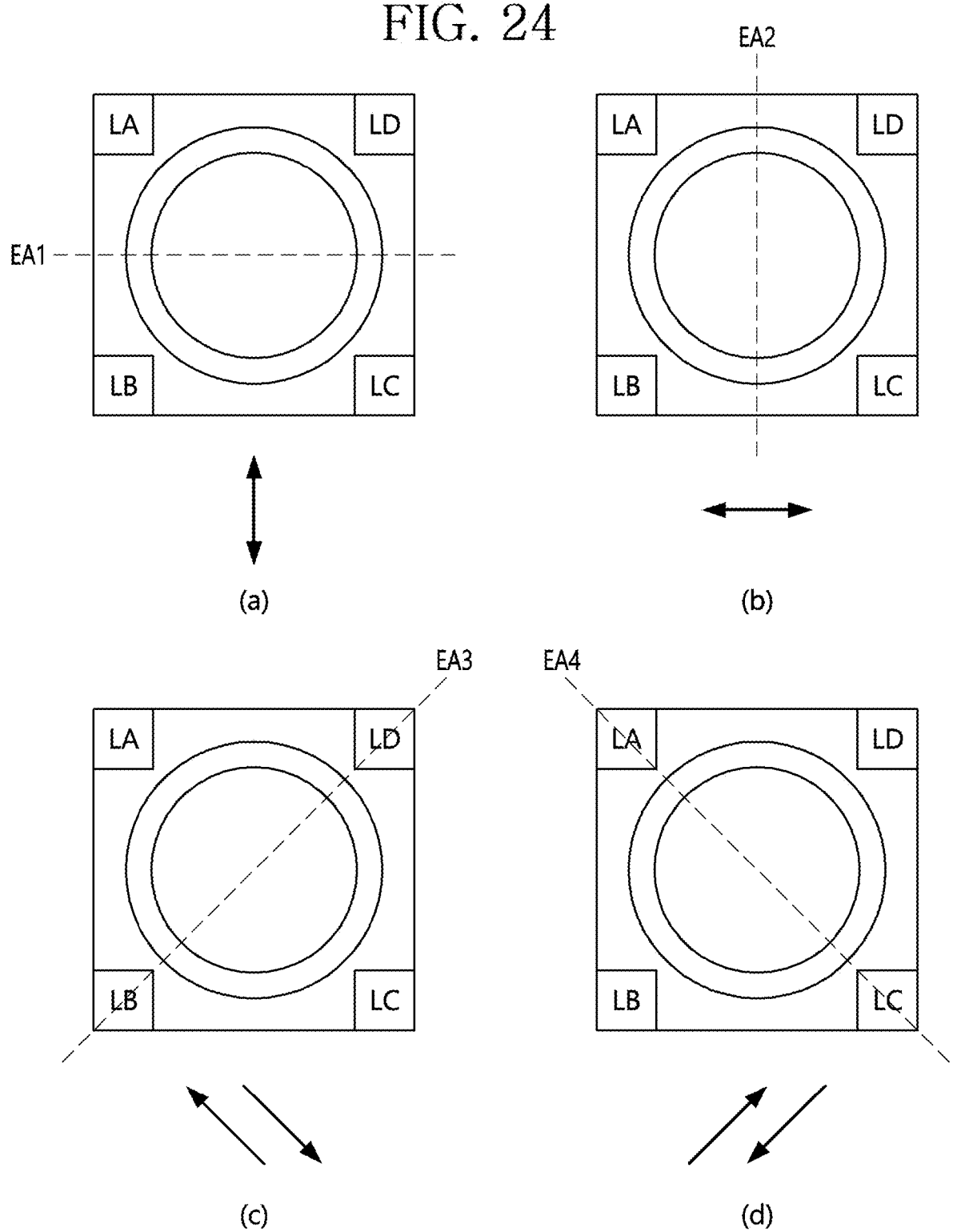
FIG. 24 is a view for explaining a vibration axis of a camera module according to an embodiment.

FIG. 24 is a view for explaining a vibration axis of a camera module according to an embodiment.

Referring to FIG. 24, the camera module may rotate with four main vibration axes.

Referring to (a) of FIG. 24, the camera module may vibrate about a first vibration axis EA1. Here, the first vibration axis EA1 may be an axis connecting a point between the first individual electrode LA and the second individual electrode LB and a point between the third individual electrode LC and the fourth individual electrode LD based on the center of the liquid lens. That is, the camera module may perform up-down vibration based on the first vibration axis EA1.

Referring to (b) of FIG. 24, the camera module may vibrate about a second vibration axis EA2. Here, the second vibration axis EA2 may be an axis connecting a point between the first individual electrode LA and the fourth individual electrode LD and a point between the second individual electrode LB and the third individual electrode LC based on the center of the liquid lens That is, the camera module may perform left-right vibration based on the second vibration axis EA2.

Referring to (c) of FIG. 24, the camera module may vibrate about a third vibration axis EA3. Here, the third vibration axis EA3 may be an axis connecting the second individual electrode LB and the fourth individual electrode LD with respect to the center of the liquid lens. That is, the camera module may perform up left-down right vibration based on the third vibration axis EA3.

Referring to (d) of FIG. 24, the camera module may vibrate about a fourth vibration axis EA4. Here, the fourth vibration axis EA4 may be an axis connecting the first individual electrode LA and the third individual electrode LC with respect to the center of the liquid lens. That is, the camera module may perform up right-down left vibration based on the fourth vibration axis EA3.

FIG. 25 is a view for explaining an effective voltage applied to individual electrodes during OIS correction.

FIG. 25 (a) shows a state of the liquid lens in a stationary state (non-vibration state). Referring to (a) of FIG. 25, the interfaces of the liquid lenses may be horizontal to each other in the stationary state. Here, the horizontal state may mean a state in which the effective voltages Vrms applied to the plurality of individual electrodes LA to LD of the liquid lens are all the same.

FIG. 25 (b) shows the state of the liquid lens in the up left-down right vibration state. Referring to (b) of FIG. 25, the interface of the liquid lens in the up left-down right vibration state may change based on a point where the second individual electrode LB is positioned and a point where the fourth individual electrode LD is positioned. For example, in the up left-down right vibration state, the amount of change (+ΔVrms) of the effective voltage applied to the second individual electrode LB may be γ, and the amount of change (−ΔVrms) of the effective voltage applied to the fourth individual electrode LD may be δ. In this case, the amount of change of the effective voltage applied to the first individual electrode LA and the third individual electrode LC may be zero. On the other hand, the amount of change (+ΔVrms) of the effective voltage applied to the second individual electrode LB and the amount of change (−ΔVrms) of the effective voltage applied to the fourth individual electrode LD have a symmetric relationship with each other in the up left-down right vibration state as described above. In other words, an absolute value (γ) of the amount (+ΔVrms) of change of the effective voltage applied to the second individual electrode LB and an absolute value (|δ|) of the amount of change (−ΔVrms) of the effective voltage applied to the fourth individual electrode LD may be equal to each other.

FIG. 25 (c) shows the state of the liquid lens in the up right-down left vibration state. Referring to (c) of FIG. 25, the interface of the liquid lens may change based on a point at which the first individual electrode LA is positioned and a point at which the third individual electrode LC is positioned, in the up right-down left vibration state. For example, in the up right-down left vibration state, the amount of change (+ΔVrms) of the effective voltage applied to the first individual electrode LA may be α, and the amount of change (−ΔVrms) of the effective voltage applied to the third individual electrode LC may be β. In this case, the amount of change of each of effective voltages applied to the second individual electrode LB and the fourth individual electrode LD may be zero. On the other hand, the amount of change (+ΔVrms) of the effective voltage applied to the first individual electrode LA and the amount of change (−ΔVrms) of the effective voltage applied to the third individual electrode LC may have a symmetric relationship with each other in the up right-down left vibration state as described above. In other words, an absolute value (|α|) of the amount of change (+ΔVrms) of the effective voltage applied to the first individual electrode LA and an absolute value (|β|) of the amount of change (−ΔVrms) of the effective voltage applied to the third individual electrode LC may be equal to each other.

According to this principle, in the embodiment, only the ADC value for one of them is obtained with respect to the electrodes in a symmetrical relationship among the four electrodes, and the it is possible to obtain ADC values for other electrodes that are symmetrical thereto.

FIGS. 26A to 26D illustrate a symmetric relationship between ADC values according to a vibration state according to an embodiment.

That is, the plurality of individual electrodes in the embodiment may be divided into a plurality of groups having a symmetrical relationship with each other about the vibration axis. In other words, the plurality of individual electrodes may include a plurality of groups each including two or more individual electrodes. That is, when the number of the plurality of individual electrodes is four, the four individual electrodes may include a first group and a second group in which interface information, capacitance, or ADC values have a symmetric relationship with each other about the vibration axis. Here, having the symmetric relationship does not mean that the individual electrodes of the first group and the individual electrodes of the second group have a symmetric relationship with each other, and this means that the plurality of individual electrodes in the first group have a symmetrical relationship with each other, and the plurality of individual electrodes in the second group have a symmetrical relationship with each other.

FIG. 26A is a view showing a symmetric relationship between ADC values in an up-down vibration state.

Referring to FIG. 26A, when the camera module is the up-down vibration state, ADC values may have a symmetrical relationship as follows.

Similarly, the ADC value ADC1 for the effective voltage applied to the first individual electrode LA and the capacitance of the first individual electrode LA may have a symmetric relationship with the ADC value ADC2 for the effective voltage applied to the second individual electrode LB and the capacitance of the second individual electrode LB in the up-down vibration state. Alternatively, the ADC value ADC1 for the effective voltage applied to the first individual electrode LA and the capacitance of the first individual electrode LA may have a symmetric relationship with the ADC value ADC3 for the effective voltage applied to the third individual electrode LC and the capacitance of the third individual electrode LC in the up-down vibration state. In addition, the ADC value ADC4 for the effective voltage applied to the fourth individual electrode LD and the capacitance of the fourth individual electrode LD may have a symmetric relationship with the ADC value ADC2 for the effective voltage applied to the second individual electrode LB and the capacitance of the second individual electrode LB in the up-down vibration state. Alternatively, the ADC value ADC4 for the effective voltage applied to the fourth individual electrode LD and the capacitance of the fourth individual electrode LD may have a symmetric relationship with the ADC value ADC3 for the effective voltage applied to the third individual electrode LC and the capacitance of the third individual electrode LC in the up-down vibration state.

FIG. 26B is a view showing a symmetric relationship between ADC values in a left-right vibration state.

Referring to FIG. 26B, when the camera module is the left-right vibration state, ADC values may have a symmetrical relationship as follows.

The ADC value ADC1 for the effective voltage applied to the first individual electrode LA and the capacitance of the first individual electrode LA may have a symmetric relationship with the ADC value ADC3 for the effective voltage applied to the third individual electrode LC and the capacitance of the third individual electrode LC in the left-right vibration state. Alternatively, the ADC value ADC1 for the effective voltage applied to the first individual electrode LA and the capacitance of the first individual electrode LA may have a symmetric relationship with the ADC value ADC4 for the effective voltage applied to the fourth individual electrode LD and the capacitance of the fourth individual electrode LD in the left-right vibration state. In addition, the ADC value ADC2 for the effective voltage applied to the second individual electrode LB and the capacitance of the second individual electrode LB may have a symmetric relationship with the ADC value ADC3 for the effective voltage applied to the third individual electrode LC and the capacitance of the third individual electrode LC in the left-right vibration state. In addition, the ADC value ADC2 for the effective voltage applied to the second individual electrode LB and the capacitance of the second individual electrode LB may have a symmetric relationship with the ADC value ADC4 for the effective voltage applied to the fourth individual electrode LD and the capacitance of the fourth individual electrode LD in the left-right vibration state.

FIG. 26C is a view showing a symmetric relationship between ADC values in an up right-down left vibration state.

Referring to FIG. 26C, when the camera module is the up right-down left vibration state, ADC values may have a symmetrical relationship as follows.

The ADC value ADC2 for the effective voltage applied to the second individual electrode LB and the capacitance of the second individual electrode LB may have a symmetric relationship with the ADC value ADC4 for the effective voltage applied to the fourth individual electrode LD and the capacitance of the fourth individual electrode LD in the up right-down left vibration state. In addition, the ADC value ADC1 for the effective voltage applied to the first individual electrode LA and the capacitance of the first individual electrode LA may have a symmetric relationship with the ADC value ADC3 for the effective voltage applied to the third individual electrode LC and the capacitance of the third individual electrode LC in the up right-down left vibration state.

In this case, the amount of change between the ADC value ADC2 of the capacitance of the second individual electrode LB and the ADC value ADC4 of the capacitance of the fourth individual electrode LD should be zero. However, fine vibration may occur depending on the environment of the camera module. Due to this, it was confirmed that the ADC value ADC2 of the capacitance of the second individual electrode LB and the ADC value ADC4 of the capacitance of the fourth individual electrode LD have a certain difference within the error range. That is, the difference between the ADC value ADC2 of the capacitance of the second individual electrode LB and the ADC value ADC4 of the capacitance of the fourth individual electrode LD in the drawing is a negligible value, and it was confirmed that the difference value in the drawing was also very small.

FIG. 26D is a view showing a symmetric relationship between ADC values in an up left-down right vibration state.

Referring to FIG. 26D, when the camera module is the up left-down right vibration state, ADC values may have a symmetrical relationship as follows.

The ADC value ADC1 for the effective voltage applied to the first individual electrode LA and the capacitance of the first individual electrode LA may have a symmetric relationship with the ADC value ADC3 for the effective voltage applied to the third individual electrode LC and the capacitance of the third individual electrode LC in the up left-down right vibration state. In addition, the ADC value ADC2 for the effective voltage applied to the second individual electrode LB and the capacitance of the second individual electrode LB may have a symmetric relationship with the ADC value ADC4 for the effective voltage applied to the fourth individual electrode LD and the capacitance of the fourth individual electrode LD in the up left-down right vibration state.

In this case, the amount of change between the ADC value ADC1 of the capacitance of the first individual electrode LA and the ADC value ADC3 of the capacitance of the third individual electrode LC should be zero. However, fine vibration may occur depending on the environment of the camera module. Due to this, it was confirmed that the ADC value ADC1 of the capacitance of the first individual electrode LA and the ADC value ADC3 of the capacitance of the third individual electrode LC have a certain difference within the error range. That is, the difference between the ADC value ADC1 of the capacitance of the first individual electrode LA and the ADC value ADC3 of the capacitance of the third individual electrode LC in the drawing is a negligible value, and it was confirmed that the difference value in the drawing was also very small.

Accordingly, in the embodiment, by using the symmetric relationship as described above, the capacitance is obtained only for half the number of individual electrodes among the plurality of individual electrodes, and the capacitance of the other individual electrodes can be obtained.

For example, in the case of the up left-down right vibration state, the sensor unit 962 includes a first sensor unit 962A connected to the first individual electrode LA and a second sensor unit 926B connected to the second individual electrode LB.

That is, when the number of individual electrodes is four as described above, the sensor unit 962 may include a first sensor unit 962A and a second sensor unit 962B. In addition, the sensor unit 962 may be configured to sense capacitance by being respectively connected to different individual electrodes according to the vibration state.

Also, a plurality of AD converters 967 may be configured to convert analog signals related to capacitances detected by the plurality of sensor units 962 into digital signals. For example, the AD converter 967 may include a first AD converter 967A connected to the first sensor unit 962A, and a second AD converter 967B connected to the second sensor unit 962B.

In addition, the controller 970 may acquire ADC values for the four individual electrodes and a capacitance corresponding thereto using the two ADC values obtained through the first AD converter 967A and the second AD converter 967B.

In this case, the AD converter 967 may be composed of two as described above, or alternatively, may be composed of only one AD converter 967.

That is, as shown in FIG. 23, an analog signal related to the capacitance sensed by the two sensor units 962 may be sequentially converted into a digital signal by one AD converter.

To this end, the camera module may further include a multiplexer (MUX) 968 and a capacitance holding unit 969.

The mux 968 and the capacitance holding unit 969 have already been described with reference to FIG. 22, a detailed description thereof will be omitted.

In this embodiment, when the OIS is driven, the driving voltage applied to each individual electrode is controlled using the gyro data output from the gyro sensor as a control factor. In this case, during OIS correction, the effective voltage Vrms applied to each electrode and the ADC sensing value have a symmetrical relationship based on the vibration axis. Accordingly, in the embodiment, the capacitance of all individual electrodes can be calculated with a sensing circuit of ½ compared to the number of individual electrodes. According to this, the liquid lens control circuit in the embodiment can secure SFR (Spatial Frequency Response) and OIS suppression ratio for OIS control using only ½ of the ADC sensing circuit of the prior art. Further, in this embodiment, since the ADC sensing circuit is reduced by 50% compared to the conventional one, the chip size can also be drastically reduced, and thus the overall chip size can be reduced by about 20% compared to the prior art.

Meanwhile, the controller 970 may control the switching elements SWLa to SWLd so that a specific individual electrode among the plurality of individual electrodes LA to LD and the sensor unit 962 are connected. In this case, the controller 970 may control the on/off of the switching elements SWLa to SWLd based on the vibration state of the camera module, that is, the vibration axis.

For example, the controller 970 may cause any one of the first switching element SWLa and the second switching element SWLb to be connected to the first sensor unit 962A in the up-down vibration state. Also, the controller 970 may cause any one of the third switching element SWLc and the fourth switching element SWLd to be connected to the second sensor unit 962B in the up-down vibration state.

In addition, the controller 970 may cause any one of the first switching element SWLa and the fourth switching element SWLd to be connected to the first sensor unit 962A in the left-right vibration state. Also, the controller 970 may cause any one of the second switching element SWLb and the third switching element SWLc to be connected to the second sensor unit 962B in the left-right vibration state.

In addition, the controller 970 may cause any one of the first switching element SWLa and the third switching element SWLc to be connected to the first sensor unit 962A in the up left-down right vibration state. In addition, the controller 970 may cause any one of the second switching element SWLb and the fourth switching element SWLd to be connected to the second sensor unit 962B in the up left-down right vibration state.

In addition, the controller 970 may cause any one of the first switching element SWLa and the third switching element SWLc to be connected to the first sensor unit 962A in the up right-down left vibration state. In addition, the controller 970 may cause any one of the second switching element SWLb and the fourth switching element SWLd to be connected to the second sensor unit 962B in the up right-down left vibration state.

Figure 27:
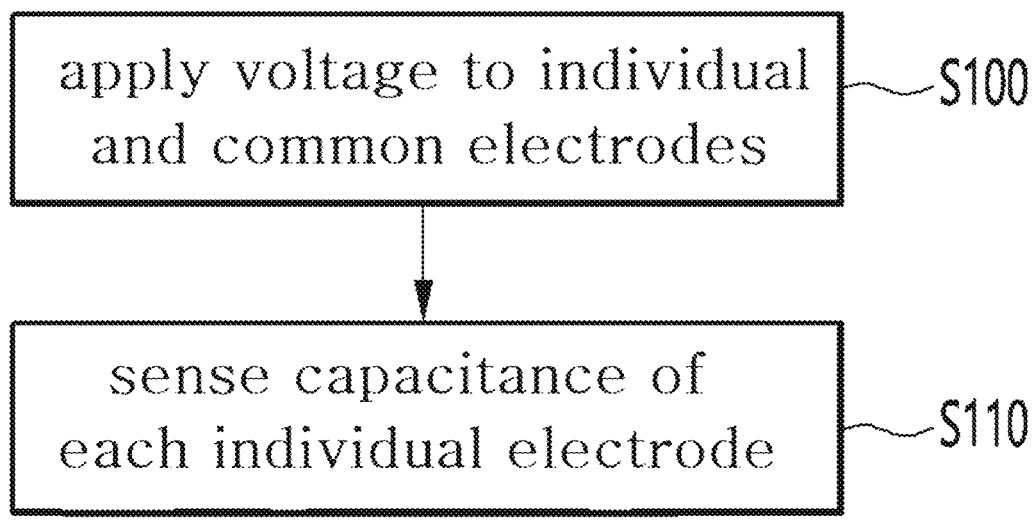
FIG. 27 is a flowchart for describing a control method of a liquid lens according to an embodiment step by step.

FIG. 27 is a flowchart for describing a control method of a liquid lens according to an embodiment step by step.

As described above, the control method of the liquid lens may include a step in which the individual electrodes LA to LD of the liquid lens are connected to the ground, and the sensing pulse SMP is applied to the common electrode COM of the liquid lens so that a charge is accumulated between the common electrode and the individual electrodes (S100), a step in which the switching element SWL disposed between the sensor unit 962 and the liquid lens 28 is turned on (ON), and a step of measuring a voltage across a reference capacitor of the sensor unit 962 (S110). Thereafter, the capacitance between the common electrode and the individual electrodes may be calculated by using the measured value of the voltage across the reference capacitor.

The liquid lens described above may be included in the camera module. The camera module may include a lens assembly including a liquid lens mounted in a housing and at least one solid lens that may be disposed in front of or behind the liquid lens, an image sensor that converts an optical signal transmitted via the lens assembly into an electrical signal. and a control circuit for supplying a driving voltage to the liquid lens.

Figure 28:
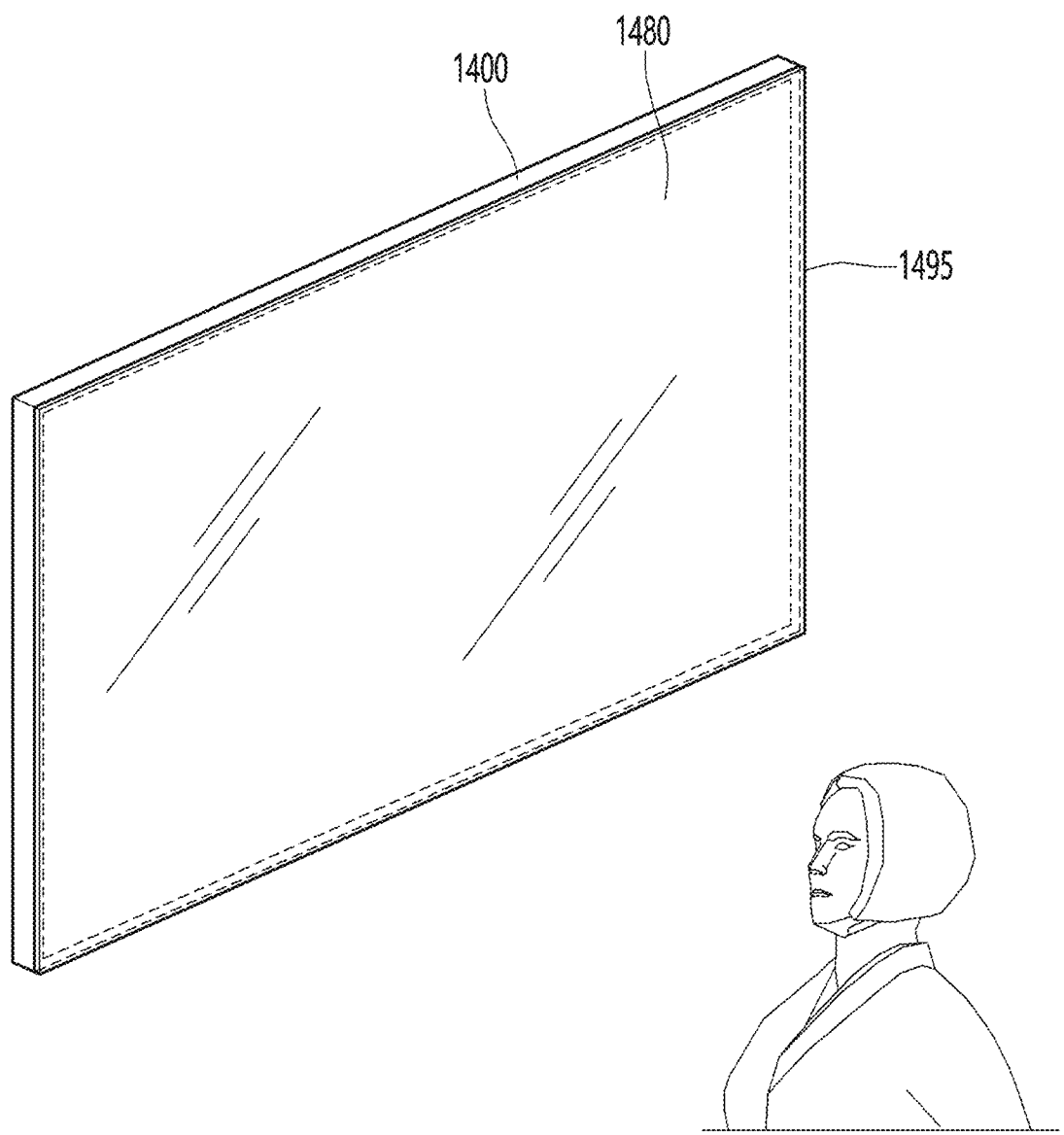
FIG. 28 is a view showing an external appearance of a video display device according to one embodiment of the present invention.
Figure 29:
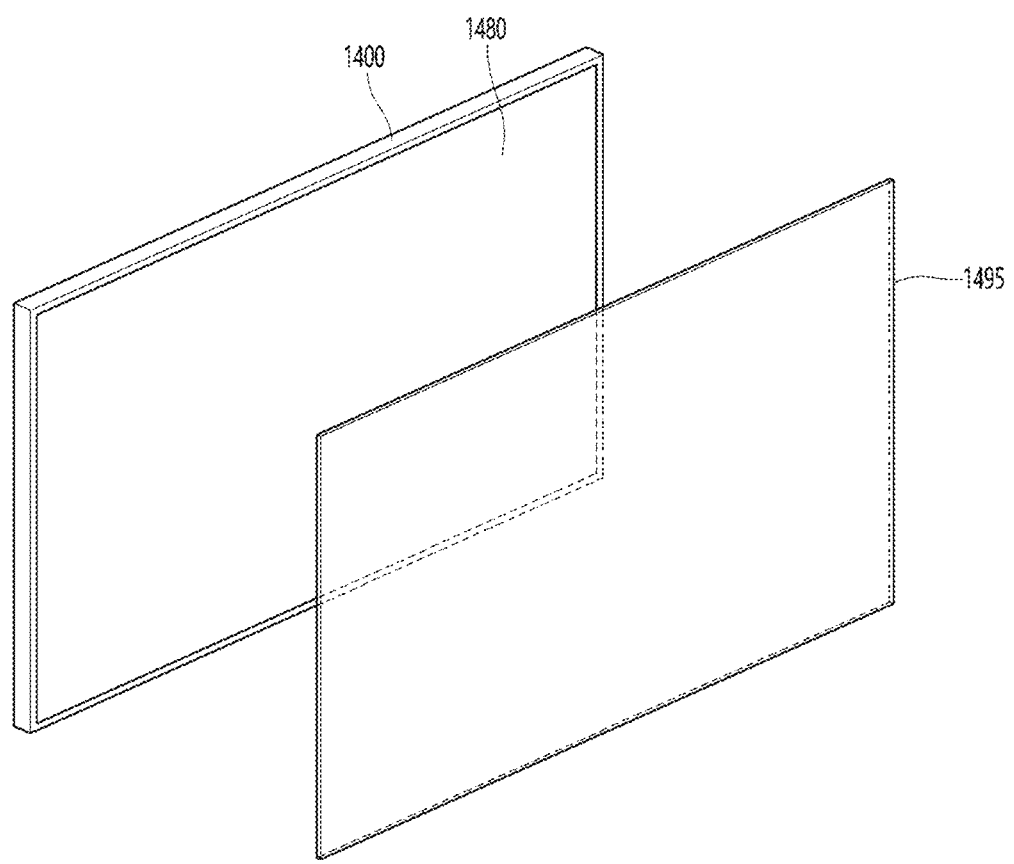
FIG. 29 is a view showing an optical unit and a display of the video display device of FIG. 28 separately.

FIG. 28 is a view showing an external appearance of a video display device according to one embodiment of the present invention, and FIG. 29 is a view showing an optical unit and a display of the video display device of FIG. 25 separately.

Referring to the drawings, a video display device 1400 may include a display 1480.

The display 1480 may display an input image, and an optical unit 1495 may be spaced apart from the display 1480 at a predetermined distance, and may be disposed in a user direction. FIG. 16B illustrates separating the distance between the display 1480 and the optical unit 1495.

The optical unit 1495 may be configured to be able to change a traveling direction of light according to the applied power.

For example, the optical unit 1495 may include the liquid lens control circuit including the liquid lens described in FIG. 8 to FIG. 23.

Accordingly, the traveling direction of the light output from the video display device 1400 may be changed by the varied curvature of the lens, thereby improving visibility when watching a video.

What is claimed is:

1. A lens curvature variation apparatus comprising:
   a liquid lens including a common electrode and a plurality of individual electrodes;
   a lens driver configured to apply a voltage to the common electrode and the plurality of individual electrodes;
   a sensor unit
   connected to at least one individual electrode among the plurality of individual electrodes and configured to output a sensing signal for sensing an interface of the liquid lens; and
   a controller configured to control the lens driver based the sensing signal of the sensor unit,
   wherein a number of the sensor unit is less than a number of the plurality of individual electrodes, wherein the plurality of individual electrodes includes a first individual electrode connected to the sensor unit and a second individual electrode not connected to the sensor unit, and wherein the controller is configured to obtain a sensing signal of the second individual electrode by using a sensing signal of the first individual electrode sensed through the sensor unit.

2. The lens curvature variation apparatus of claim 1, comprising:

a gyro sensor configured to obtain gyro data;

wherein the controller is configured to calculate a vibration angle using the gyro data obtained through the gyro sensor, and group the plurality of individual electrodes into first and second groups based on the calculated vibration angle.

3. The lens curvature variation apparatus of claim 2, wherein the individual electrodes having a symmetrical relationship with each other are changed according to the vibration angle, and wherein the controller is configured to group individual electrodes having a symmetrical relationship with each other into a same group based on the vibration angle.

4. The lens curvature variation apparatus of claim 1, wherein the sensor unit is configured to sense a capacitance corresponding to a size or change of an area of a boundary region between an insulating layer on the plurality of individual electrodes in the liquid lens and a conductive liquid.

5. The lens curvature variation apparatus of claim 4, wherein the sensor unit is configured to sense a capacitance corresponding to the first individual electrode among the plurality of individual electrodes; and wherein the controller is configured to sense a capacitance corresponding to the second individual electrode by using the capacitance corresponding to the first individual electrode sensed through the sensor unit.

6. The lens curvature variation apparatus of claim 1, wherein the controller is configured to obtain the sensing signal of the second individual electrode by using the sensing signal sensed in a state in which the sensor unit and the second individual electrode are not connected.

7. The lens curvature variation apparatus of claim 1, wherein the plurality of individual electrodes includes:

first and second individual electrodes of a first group; and
first and second individual electrodes of a second group; and wherein the sensor unit includes:

a first sensor unit connected to the first individual electrode of the first group; and
a second sensor unit connected to the first individual electrode of the second group.

8. The lens curvature variation apparatus of claim 7, comprising:

an AD converter connected to the first and second sensor units;

wherein the AD converter is configured to output a first digital signal corresponding to a sensing signal of the first individual electrode of the first group, and output a second digital signal corresponding to a sensing signal of the first individual electrode of the second group.

9. The lens curvature variation apparatus of claim 8, wherein the AD converter includes:

a first AD converter connected to the first sensor unit and configured to output a first digital signal corresponding to the sensing signal of the first individual electrode of the first group; and a second AD converter connected to the second sensor unit and configured to output a second digital signal corresponding to the sensing signal of the first individual electrode of the second group.

10. The lens curvature variation apparatus of claim 8, comprising:

a multiplexer (MUX) sequentially connected to the first and second sensor units, and wherein the AD converter is configured to sequentially receive the sensing signal of the first individual electrode of the first group and the sensing signal of the first individual electrode of the second group through the mux, and sequentially output the first and second digital signals corresponding to the received sensing signals.

11. The lens curvature variation apparatus of claim 8, wherein the controller is configured to obtain a third digital signal of the second individual electrode of the first group by using the first digital signal of the first individual electrode of the first group, and obtain a fourth digital signal of the second individual electrode of the second group by using the second digital signal of the first individual electrode of the second group.

12. The lens curvature variation apparatus of claim 11, wherein the first digital signal has a symmetric relationship with the third digital signal; and wherein the controller is configured to receive the first digital signal and obtain the third digital signal symmetrical with the first digital signal.

13. The lens curvature variation apparatus of claim 11, wherein the second digital signal has a symmetric relationship with the fourth digital signal; and wherein the controller is configured to receive the second digital signal and obtain the fourth digital signal symmetrical with the second digital signal.

14. The lens curvature variation apparatus of claim 11, wherein the first and second individual electrodes included in each of the first group and the second group change based on a vibration state.

15. A camera module comprising:

a lens assembly;
an image sensor aligned with the lens assembly in an optical axis; and
a control circuit configured to control the lens assembly;
wherein the lens assembly includes a liquid lens including a common electrode and a plurality of individual electrodes;

wherein the control circuit includes:

a lens driver configured to apply a voltage to the common electrode and the plurality of individual electrodes;
a sensor unit connected to at least one individual electrode among the plurality of individual electrodes and outputting a sensing signal for sensing an interface of the liquid lens; and;
a controller configured to control the lens driver based on the sensing signal of the sensor unit, wherein a number of the sensor unit is less than a number of the plurality of individual electrodes, wherein the plurality of individual electrodes includes a first individual electrode connected to the sensor unit and a second individual electrode not connected to the sensor unit, and wherein the controller is configured to obtain a sensing signal of the second individual electrode by using a sensing signal of the first individual electrode sensed through the sensor unit.

16. The camera module of claim 15, wherein the control circuit comprises:
an AD converter connected to the sensor unit;
wherein the plurality of individual electrodes includes:
first and second individual electrodes of a first group; and
first and second individual electrodes of a second group; and
wherein the sensor unit includes:
a first sensor unit connected to the first individual electrode of the first group; and
a second sensor unit connected to the first individual electrode of the second group, and
wherein the AD converter is configured to output a first digital signal corresponding to a sensing signal of the first individual electrode of the first group, and output a second digital signal corresponding to a sensing signal of the first individual electrode of the second group.

17. The camera module of claim 16, wherein the controller is configured to obtain a third digital signal of the second individual electrode of the first group by using the first digital signal of the first individual electrode of the first group, and obtain a fourth digital signal of the second individual electrode of the second group by using the second digital signal of the first individual electrode of the second group.

18. The camera module of claim 17, wherein the first digital signal has a symmetric relationship with the third digital signal;
wherein the second digital signal has a symmetric relationship with the fourth digital signal; and
wherein the controller is configured to obtain the third digital signal symmetrical to the first digital signal by using the first digital signal and obtain the fourth digital signal symmetrical with the second digital signal by using the second digital signal.

19. The camera module of claim 16, wherein the first and second individual electrodes included in each of the first group and the second group change based on a vibration state, and
wherein the controller is configured to group the plurality of individual electrodes into the first and second groups based on the vibration state.

20. The camera module of claim 16, wherein the control circuit comprises:
a gyro sensor configured to obtain gyro data;
wherein the controller is configured to calculate a vibration angle using the gyro data obtained through the gyro sensor, and group the plurality of individual electrodes into the first and second groups based on the calculated vibration angle.

* * * * *